(12) United States Patent
Ouyang et al.

(10) Patent No.: US 12,445,221 B2
(45) Date of Patent: Oct. 14, 2025

(54) TUNABLE OPTICAL ADD/DROP MULTIPLEXER

(71) Applicant: HUAWEI TECHNOLOGIES CO., LTD., Guangdong (CN)

(72) Inventors: Kui Ouyang, Wuhan (CN); Tenghao Li, Shenzhen (CN); Luo Han, Dongguan (CN); Xiaoshi Dong, Shenzhen (CN); Fengpei Sun, Shenzhen (CN); Zhiwu Chang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 257 days.

(21) Appl. No.: 18/125,930

(22) Filed: Mar. 24, 2023

(65) Prior Publication Data

US 2023/0231642 A1 Jul. 20, 2023

Related U.S. Application Data

(63) Continuation of application No. PCT/CN2021/111571, filed on Aug. 9, 2021.

(30) Foreign Application Priority Data

Sep. 25, 2020 (CN) .......................... 202011027812.7

(51) Int. Cl.
*H04J 14/02* (2006.01)
*H04Q 11/00* (2006.01)

(52) U.S. Cl.
CPC ...... *H04J 14/0205* (2013.01); *H04J 14/0283* (2013.01); *H04J 14/0307* (2023.08); *H04Q 2011/003* (2013.01)

(58) Field of Classification Search
None
See application file for complete search history.

(56) References Cited

U.S. PATENT DOCUMENTS 6,362,904 B1 * 3/2002 Cormack ........... G02B 6/29395
                     385/24
7,262,904 B1 * 8/2007 He ..................... G02B 6/29395
                     359/337.2

(Continued)

FOREIGN PATENT DOCUMENTS

CN    1874195 A   12/2006

*Primary Examiner* — Darren E Wolf
(74) *Attorney, Agent, or Firm* — WOMBLE BOND DICKINSON (US) LLP

(57) ABSTRACT

This application provides a tunable optical add/drop multiplexer T-OADM. A beam adjustment apparatus changes an incident angle at which an incident beam is emitted onto an optical filter. After the optical filter splits the incident beam into a transmitted beam and a reflected beam, the beam adjustment apparatus further adjusts a transmission direction of the transmitted beam emergent from the optical filter and a transmission direction of the reflected beam emergent from the optical filter, so that the transmitted beam and the reflected beam are output to corresponding ports, so as to implement a flexible and controllable T-OADM apparatus. This application may be applied to the optical communication field, for example, may be used to implement add/drop multiplexing of tributary signals in an optical domain in fields such as a long-haul backbone and a metropolitan area network.

20 Claims, 17 Drawing Sheets

(56) References Cited

U.S. PATENT DOCUMENTS

| | | | | |
|---|---|---|---|---|
| 8,639,069 B1* | 1/2014 | Helkey | ............. | H04Q 11/0005 |
| | | | | 398/43 |
| 2003/0202741 A1* | 10/2003 | Abushagur | ........ | G02B 6/29365 |
| | | | | 385/24 |
| 2005/0047711 A1* | 3/2005 | Ide | .................... | H04Q 11/0005 |
| | | | | 385/18 |
| 2011/0170164 A1 | 7/2011 | Wang et al. | | |

\* cited by examiner

3300

| Receive an instruction, where the instruction indicates a wavelength of a first signal dropped by a T-OADM | ~3310 |

| Determine, based on the wavelength of the first signal, a first deflection angle of a first beam adjustment apparatus for an input beam, a second deflection angle of a second beam adjustment apparatus for a first transmitted beam, and a third deflection angle of the first beam adjustment apparatus for a first reflected beam | ~3320 |

| Control, based on the first deflection angle, the first beam adjustment apparatus to adjust a transmission direction of the input beam, so that the input beam is emitted to a first optical filter at a first incident angle, where the first incident angle corresponds to the wavelength of the first signal | ~3330 |

| Control, based on the second deflection angle, the second beam adjustment apparatus to adjust a transmission direction of the first transmitted beam, so that the first transmitted beam is output to a second port | ~3340 |

| Control, based on the third deflection angle, the first beam adjustment apparatus to adjust a transmission direction of the first reflected beam, so that the first reflected beam is output to a third port | ~3350 |

FIG. 33

TUNABLE OPTICAL ADD/DROP MULTIPLEXER

CROSS-REFERENCE TO RELATED APPLICATIONS

This application is a continuation of International Application No. PCT/CN2021/111571, filed on Aug. 9, 2021, which claims priority to Chinese Patent Application No. 202011027812.7, filed on Sep. 25, 2020. The disclosures of the aforementioned applications are hereby incorporated by reference in their entireties.

TECHNICAL FIELD

This application relates to the communication field, and more specifically, to a tunable optical add/drop multiplexer.

BACKGROUND

With development of optical communication networks, one of objectives of a future optical communication network is to implement an intelligent all-optical network to reduce or avoid optical-electrical-optical conversion. An intelligent all-optical network can reduce latency, achieve ultra-high bandwidth, and reduce costs. In addition, intelligent control over the entire optical communication network can be implemented to optimize resources of the optical communication network.

An optical communication network includes many passive devices, such as optical cross-connects, wavelength selective switches, multiplexers, and demultiplexers. An optical add/drop multiplexer (OADM) based on a wavelength division multiplexing (WDM) technology is a device that implements add/drop multiplexing of tributary signals in an optical domain. The OADM device has important applications in a long-haul backbone and a metropolitan area network, and can implement a direct cross-connection networking function of transmitted signals at an optical layer. There are mainly two types of OADMs: fixed type and reconfigurable type. A fixed OADM can only add or drop signals of one or more fixed wavelengths, and therefore has high reliability but low flexibility. To add or drop signals of different wavelengths, a plurality of types of devices need to be manufactured. To add or drop signals of a plurality of wavelengths, a plurality of types of devices need to be combined. In addition, devices need to be manually installed and replaced, making it difficult to implement intelligent operation and maintenance. A reconfigurable OADM, which may also be referred to as a tunable OADM (T-OADM), can dynamically adjust wavelengths of signals that need to be added/dropped, support switching of wavelength-level services, have a flexible network structure, simple operation and maintenance, and implement intelligent control, and therefore is an important development direction of OADMs.

In some T-OADM structures, an incident angle at which an incident beam is incident onto an optical filter may be dynamically changed, to dynamically adjust a filtering center wavelength of an optical filter, thereby dynamically adjusting wavelengths of signals that need to be added or dropped. In such a T-OADM structure, how to implement a flexible and controllable T-OADM is an urgent problem to be resolved.

SUMMARY

This application provides a tunable optical add/drop multiplexer, so that an incident angle at which an incident beam is incident onto an optical filter can be changed by using a beam adjustment apparatus, and a transmitted beam or a reflected beam can be coupled to a corresponding port by using the beam adjustment apparatus, so as to implement a flexible and controllable T-OADM apparatus.

According to a first aspect, a tunable optical add/drop multiplexer T-OADM is provided, including: a first port, a first beam adjustment apparatus, a first optical filter, a second beam adjustment apparatus, a second port, and a third port, where the first port is configured to input an input beam including at least two wavelengths;

the first beam adjustment apparatus is configured to adjust a transmission direction of the input beam based on the first signal dropped (or added) by the T-OADM, so that the input beam is incident onto the first optical filter at a first incident angle, where the first incident angle corresponds to a wavelength of the first signal;

the first optical filter is configured to: receive a beam that is incident at the first incident angle, and split the incident beam into a first transmitted beam and a first reflected beam, where a wavelength of a beam included in the first transmitted beam is different from a wavelength of a beam included in the first reflected beam;

the second beam adjustment apparatus is configured to adjust a transmission direction of the first transmitted beam based on the first incident angle;

the second port is configured to output the first transmitted beam;

the first beam adjustment apparatus is further configured to adjust a transmission direction of the first reflected beam based on the first incident angle; and the third port is configured to output the first reflected beam.

Therefore, in an embodiment of the application, the beam adjustment apparatus adjusts, based on the first signal that needs to be dropped (or added) by the T-OADM, the first incident angle at which the incident beam is incident onto the optical filter; and after the optical filter splits the incident beam into the transmitted beam and the reflected beam, the beam adjustment apparatus further adjusts, based on the first incident angle, the transmission direction of the transmitted beam emergent from the optical filter, and adjusts, based on the first incident angle, the transmission direction of the reflected beam emergent from the optical filter, so that the transmitted beam and the reflected beam are output to corresponding ports, thereby implementing a more flexible and controllable T-OADM apparatus.

When the wavelength of the optical signal dropped (or added) by the T-OADM needs to be adjusted, that is, the filtering center wavelength of the first optical filter (or the wavelength of the first transmitted beam) needs to be adjusted, because the first optical filter is fixedly disposed, and in this case, the adjustment may be implemented by adjusting the transmission direction of the incident beam by using the first beam adjustment apparatus. Correspondingly, to couple the transmitted beam and the reflected beam to the corresponding ports, the first beam adjustment apparatus also needs to adjust the transmission direction of the reflected beam based on the adjustment of the incident beam, and the second beam adjustment apparatus further adjusts the transmission direction of the transmitted beam based on the adjustment of the incident beam.

In some optional embodiments, in the T-OADM, for example, the first port may be further connected to a polarization beam splitter, to split a beam into two beams with the same polarization; and the third port and the second port may be further connected to a polarization beam combiner, to combine two beams with the same polarization into one beam.

For example, the first beam adjustment apparatus and the second beam adjustment apparatus may be implemented by a MEMS micro-mirror or an LCOS. This is not limited in an embodiment of the application.

For example, the first optical filter may be a band-pass optical filter or a band-stop optical filter, and a filtering wavelength of the first optical filter is related to the first incident angle.

When the first optical filter is a band-pass optical filter, the first optical filter may split the incident beam into the first transmitted beam including a first wavelength and the first reflected beam including at least one wavelength. In this case, the first wavelength is a wavelength of a beam selected by the first optical filter when the beam is incident onto the first optical filter at the first incident angle. Correspondingly, a signal output by the second port is a signal dropped by the T-OADM apparatus, and a signal output by the third port is a signal transparently transmitted by the T-OADM apparatus.

When the first filter is a band-stop optical filter, the first optical filter may split the incident beam into the first reflected beam including a first wavelength and the first transmitted beam including at least one wavelength. In this case, the first wavelength is a wavelength of a beam selected by the first optical filter when the beam is incident onto the first optical filter at the first incident angle. Correspondingly, a signal output by the third port is a signal dropped by the T-OADM apparatus, and a signal output by the second port is a signal transparently transmitted by the T-OADM apparatus.

For example, in this application, the output transmitted beam may include all or a part of the output transmitted beams. This is not limited. The output reflected beam may include all or a part of the output reflected beams. This is not limited.

With reference to the first aspect, in an embodiment of the first aspect, the T-OADM further includes a control unit, where the control unit is configured to:
  receive an instruction, where the instruction indicates the wavelength of the first signal dropped (or added) by the T-OADM;
  determine, based on the wavelength of the first signal, a first deflection angle of the first beam adjustment apparatus for the input beam, a second deflection angle of the second beam adjustment apparatus for the first transmitted beam, and a third deflection angle of the first beam adjustment apparatus for the first reflected beam;
  control, based on the first deflection angle, the first beam adjustment apparatus to adjust a transmission direction of the input beam;
  control, based on the second deflection angle, the second beam adjustment apparatus to adjust the transmission direction of the first transmitted beam; and
  control, based on the third deflection angle, the first beam adjustment apparatus to adjust the transmission direction of the first reflected beam.

Therefore, in an embodiment of the application, the control unit can receive the wavelength of the first signal that needs to be dropped (or added) by the T-OADM apparatus, and control, based on the wavelength of the first signal, a deflection angle of each beam adjustment apparatus for a beam, so that the wavelength of the signal that is dropped or added by the T-OADM apparatus can be flexibly controlled according to an actual requirement, thereby implementing a more flexible and controllable T-OADM apparatus.

In an embodiment, the control unit may be preconfigured to store a plurality of wavelengths of signals that can be dropped or added by the T-OADM apparatus, and deflection angles that are of the beam adjustment apparatus for the incident beam, the transmitted beam, and the reflected beam and that correspond to each wavelength. When obtaining the wavelength of the signal that needs to be dropped or added by the T-OADM apparatus, the control unit may determine, based on the preconfiguration, deflection angles that are of the beam adjustment apparatus for the incident beam, the transmitted beam, and the reflected beam and that correspond to the wavelength.

In an embodiment, the control unit may prestore a correspondence between a wavelength of a signal that can be dropped or added by the T-OADM apparatus and deflection angles of the beam adjustment apparatus for the incident beam, the transmitted beam, and the reflected beam. When obtaining the wavelength of the signal that needs to be dropped or added by the T-OADM apparatus, the control unit may determine, based on the correspondence, the angles by which the beam adjustment apparatus deflects the incident beam, the transmitted beam, and the reflected beam and that correspond to the wavelength.

With reference to the first aspect, in an embodiment of the first aspect, the first beam adjustment apparatus includes an incident beam adjustment apparatus and a reflected beam adjustment apparatus, where the incident beam adjustment apparatus is configured to adjust the transmission direction of the input beam; and the reflected beam adjustment apparatus is configured to adjust the transmission direction of the first reflected beam.

Therefore, in an embodiment of the application, the transmission direction of the input beam can be adjusted by using the incident beam adjustment apparatus, and the transmission direction of the first reflected beam can be adjusted by using the reflected beam adjustment apparatus, so that an optical path can be set more flexibly.

For example, the incident beam adjustment apparatus and the reflected beam adjustment apparatus each may be a MEMS micro-mirror or an LCOS. This is not limited in an embodiment of the application.

In an embodiment, when the incident beam adjustment apparatus, the reflected beam adjustment apparatus, and the second beam adjustment apparatus each are a MEMS micro-mirror, the control unit may be preconfigured to store a plurality of wavelengths of signals that can be dropped or added by the T-OADM apparatus, and deflection angles that are of the three MEMS micro-mirrors and that correspond to each wavelength (for example, the wavelengths and deflection angles that are of each reflector and that correspond to each wavelength may be stored in a table form). That is, the control unit sets the three MEMS micro-mirrors to angles, so as to control the T-OADM apparatus to drop or add a signal of a wavelength.

In an embodiment, when the incident beam adjustment apparatus, the reflected beam adjustment apparatus, and the second beam adjustment apparatus each are an LCOS, the control unit may be preconfigured to store a plurality of wavelengths of signals that can be dropped or added by the T-OADM apparatus, and values of voltages that are applied to the three LCOSs and that correspond to each wavelength. That is, the T-OADM apparatus may be controlled to drop or add a signal of a wavelength by applying a voltage to the three LCOS settings by the control unit.

In some other embodiments, the first beam adjustment apparatus may include a dual-reflective-surface MEMS micro-mirror, and one reflective-surface MEMS micro-mirror in the dual-reflective-surface MEMS micro-mirror is configured to adjust the transmission direction of the input beam, so that the input beam is incident onto the first optical filter at the foregoing first incident angle, and the other reflective-surface micro-mirror in the dual-reflective-surface MEMS micro-mirror is configured to adjust a transmission direction of the first reflected beam, so that the reflected beam is coupled to a corresponding port.

In an embodiment, when the first beam adjustment apparatus includes one dual-reflective-surface MEMS micro-mirror, and the second beam adjustment apparatus is a MEMS, the control unit may be preconfigured to store a plurality of wavelengths of signals that can be dropped or added by the T-OADM apparatus, a deflection angle that is of the dual-reflective-surface MEMS micro-mirror and that corresponds to each wavelength, and a deflection angle of the MEMS micro-mirror, where the two reflective surfaces of the dual-reflective-surface MEMS micro-mirror may perform same deflection based on one set of control apparatus. In other words, the control unit sets the dual-reflective-surface MEMS micro-mirror and the MEMS micro-mirror to an angle, so that a wavelength of a corresponding dropped or added signal can be obtained.

With reference to the first aspect, in an embodiment of the first aspect, the T-OADM further includes a first optical apparatus, where the incident beam adjustment apparatus, the first optical apparatus, the first optical filter, and the second beam adjustment apparatus are sequentially located on a first optical axis.

The first optical apparatus is configured to converge the beam emergent from the incident beam adjustment apparatus onto the second beam adjustment apparatus, where an included angle between the beam emergent from the incident beam adjustment apparatus and the first optical axis one-to-one corresponds to an included angle between the beam emergent from the first optical apparatus and the first optical axis.

Therefore, by using the first optical apparatus in an embodiment of the application, a magnitude of the first incident angle at which an input beam is incident onto the first optical filter can be controlled by using the incident beam adjustment apparatus, so that the wavelength of the signal that is dropped or added by the T-OADM can be controlled. In addition, the beams emergent from the incident beam adjustment apparatus are converged by using the first optical apparatus, so that a structure of the T-OADM can be more compact, and a volume of the T-OADM apparatus can be reduced.

It should be noted that, when the first incident angle is different, the included angle between the beam emergent from the incident beam adjustment apparatus and the first optical axis is also different.

In an embodiment, the first optical apparatus may be configured to converge the beam emergent from the incident beam adjustment apparatus onto an intersection point between the first optical axis and the second beam adjustment apparatus. This is not limited in this application.

With reference to the first aspect, in an embodiment of the first aspect, the first optical apparatus includes a first optical 4f system, where the incident beam adjustment apparatus is located at a front focus of a front lens of the first optical 4f system, and the second beam adjustment apparatus is located at a rear focus of an optical path that is transmitted by the first optical filter and that is of a rear lens of the first optical 4f system, and the reflected beam adjustment apparatus is located at a rear focus of an optical path that is reflected by the first optical filter and that is of the rear lens of the first optical 4f system. In this way, the beam emergent from the incident beam adjustment apparatus can be converged.

In some optional embodiments, when focal lengths of the front lens and the rear lens in the first optical 4f system are the same, an included angle between the beam emergent from the incident beam adjustment apparatus and the first optical axis is equal to an included angle between the beam emergent from the first optical apparatus and the first optical axis.

In some optional embodiments, when the focal lengths of the front lens and the rear lens in the first optical 4f system are different, the correspondence between the included angle between the beam emergent from the incident beam adjustment apparatus and the first optical axis and the included angle between the beam emergent from the first optical apparatus and the first optical axis is determined based on the focal lengths of the two lenses in the first optical 4f system.

With reference to the first aspect, in an embodiment of the first aspect, the first optical apparatus includes a first lens, where the incident beam adjustment apparatus is located at a 2× focal length on a first side of the first lens, the second beam adjustment apparatus is located at a 2× focal length of an optical path that is transmitted by the first optical filter and that is on a second side of the first lens, and the reflected beam adjustment apparatus is located at a 2× focal length of an optical path that is reflected by the first optical filter and that is of the first lens. In this way, the beam emergent from the incident beam adjustment apparatus can be converged. In this case, the included angle between the beam emergent from the incident beam adjustment apparatus and the first optical axis is equal to the included angle between the beam emergent from the first optical apparatus and the first optical axis.

With reference to the first aspect, in an embodiment of the first aspect, the T-OADM further includes a spherical reflector, where the spherical reflector is configured to converge the beam emergent from the incident beam adjustment apparatus onto the second beam adjustment apparatus, where the included angle between the beam emergent from the incident beam adjustment apparatus and the optical axis one-to-one corresponds to the included angle between the beam emergent from the spherical reflector and the optical axis.

For example, the incident beam adjustment apparatus may be disposed at a 2× focal length on a first side of the spherical reflector, and the second beam adjustment apparatus may be disposed at a 2× focal length of an optical path that is transmitted by the first optical filter and that is on a second side of the spherical reflector, and the reflected beam adjustment apparatus is disposed at a 2× focal length of an optical path that is reflected by the first optical filter and that is of the spherical reflector. In this way, the beam emergent from the incident beam adjustment apparatus can be converged. In this case, the included angle between the beam emergent from the incident beam adjustment apparatus and the optical axis is equal to the included angle between the beam emergent from the spherical reflector and the optical axis.

In an embodiment, the spherical reflector is configured to converge the beam emergent from the incident beam adjustment apparatus onto an intersection point between the optical axis and the second beam adjustment apparatus. This is not limited in this application.

With reference to the first aspect, in an embodiment of the first aspect, the T-OADM further includes a second optical apparatus and a third optical apparatus, where the input beam adjustment apparatus, the first optical filter, the second optical apparatus, and the second beam adjustment apparatus are sequentially disposed on a second optical axis, where an included angle between a normal line of the first optical filter and the second optical axis is α;

the second optical apparatus is configured to converge the first transmitted beam emergent from the first optical filter onto the second beam adjustment apparatus, where an included angle between the beam emergent from the incident beam adjustment apparatus and the second optical axis one-to-one corresponds to an included angle between the beam emergent from the second optical apparatus and the second optical axis;

the first optical filter, the third optical apparatus, and the reflected beam adjustment apparatus are separately disposed on a third optical axis, and an included angle between the second optical axis and the third optical axis is 2α; and the third optical apparatus is configured to converge the first reflected beam emergent from the first optical filter onto the reflected beam adjustment apparatus, where an included angle between the beam emergent from the incident beam adjustment apparatus and the second optical axis one-to-one corresponds to an included angle between the beam emergent from the third optical apparatus and the third optical axis.

Therefore, in an embodiment of the application, by using the second optical apparatus and the third optical apparatus, a magnitude of the first incident angle at which an input beam is incident onto the first optical filter can be controlled by using the incident beam adjustment apparatus, so that the wavelength of the signal that is dropped or added by the T-OADM can be controlled. In addition, the beam emergent from the incident beam adjustment apparatus is converged by using the second optical apparatus and the third optical apparatus, so that a structure of the T-OADM can be more compact, and a volume of the T-OADM apparatus can be reduced.

It should be noted that, when the first incident angle is different, the included angle between the first transmitted beam and the second optical axis is also different, and the included angle between the first reflected beam and the third optical axis is also different.

In an embodiment, the second optical apparatus may be configured to converge a first transmitted beam emergent from the first optical filter onto an intersection point between the third optical axis and the second beam adjustment apparatus, and the third optical apparatus may be configured to converge a first reflected beam emergent from the first optical filter onto an intersection point between a fourth optical axis and the reflected beam adjustment apparatus. This is not limited in this application.

With reference to the first aspect, in an embodiment of the first aspect, the second optical apparatus includes a second optical 4f system, where the incident beam adjustment apparatus is located at a front focus of a front lens of the second optical 4f system, and the second beam adjustment apparatus is located at a rear focus of a rear lens of the second optical 4f system; or the second optical apparatus includes a second lens, where the incident beam adjustment apparatus is located at a 2× focal length on a first side of the second lens, and the second beam adjustment apparatus is located at a 2× focal length on a second side of the second lens. In this way, the transmitted beam emergent from the first optical filter can be converged by using the second optical apparatus.

When the second optical apparatus includes the second optical 4f system or the second lens, for a mapping relationship between the included angle between the beam emergent from the incident beam adjustment apparatus and the second optical axis and the included angle between the beam emergent from the second optical apparatus and the second optical axis, refer to the description about the first optical apparatus. Details are not described again.

With reference to the first aspect, in an embodiment of the first aspect, the third optical apparatus includes a third optical 4f system, where the incident beam adjustment apparatus is located at a front focus of an optical path that is reflected by the first optical filter and that is of a front lens of the third optical 4f system, and the reflected beam adjustment apparatus is located at a rear focus of a rear lens of the third optical 4f system; or the third optical apparatus includes a third lens, where the incident beam adjustment apparatus is located at a 2× focal length of an optical path that is reflected by the first optical filter and that is on a first side of the third lens, and the reflected beam adjustment apparatus is located at a 2× focal length on a second side of the third lens. In this way, the reflected beam emergent from the first optical filter can be converged by using the third optical apparatus.

When the third optical apparatus includes the third optical 4f system or the third lens, for a correspondence between the included angle between the beam emergent from the incident beam adjustment apparatus and the third optical axis and the included angle between the beam emergent from the third optical apparatus and the third optical axis, refer to the description about the first optical apparatus. Details are not described again.

With reference to the first aspect, in an embodiment of the first aspect, the T-OADM further includes a fourth optical apparatus, a fifth optical apparatus, and a sixth optical apparatus, where the incident beam adjustment apparatus, the fourth optical apparatus, the first optical filter, the fifth optical apparatus, and the second beam adjustment apparatus are sequentially disposed on a fourth optical axis, where an included angle between a normal line of the first optical filter and the fourth optical axis is α;

the first optical filter, the sixth optical apparatus, and the reflected beam adjustment apparatus are sequentially disposed on a fifth optical axis, and an angle between the fifth optical axis and the fourth optical axis is 2a;

the fourth optical apparatus is configured to converge the beam emergent from the incident beam adjustment apparatus onto the first optical filter, where an included angle between the beam emergent from the incident beam adjustment apparatus and the fourth optical axis one-to-one corresponds to an included angle between the beam emergent from the fourth optical apparatus and the fourth optical axis;

the fifth optical apparatus is configured to converge the first transmitted beam emergent from the first optical filter onto the second beam adjustment apparatus, where an included angle between the first transmitted beam emergent from the first optical filter and the fourth optical axis one-to-one corresponds to an included angle between the beam emergent from the fifth optical apparatus and the fourth optical axis; and the sixth optical apparatus is configured to converge the first reflected beam emergent from the first optical filter onto the reflected beam adjustment apparatus, where an included angle between the first reflected beam emergent from the first optical filter and the fifth optical axis one-to-one corresponds to an included angle between the beam emergent from the sixth optical apparatus and the fifth optical axis.

Therefore, in an embodiment of the application, by using the incident beam adjustment apparatus, a magnitude of the first incident angle at which an input beam is incident onto the first optical filter can be controlled by using the fourth optical apparatus, the fifth optical apparatus, and the sixth optical apparatus, so that the wavelength of the signal dropped or added by the T-OADM can be controlled. In addition, the fourth optical apparatus is configured to converge the beam emergent from the incident beam adjustment apparatus onto the first optical filter, which can reduce a spot size of an input beam incident onto the first optical filter, and further reduce an area of the first optical filter.

It should be noted that, when the first incident angle is different, the included angle between the beam emergent from the incident beam adjustment apparatus and the fourth optical axis is different, the included angle between the first transmitted beam and the fourth optical axis is also different, and the included angle between the first reflected beam and the fifth optical axis is also different.

In some possible implementations, the fourth optical apparatus may be configured to converge the beam emergent from the incident beam adjustment apparatus onto an intersection point between the fourth optical axis and the first optical filter; the fifth optical apparatus may be configured to converge the first transmitted beam emergent from the first optical filter onto an intersection point between the fourth optical axis and the second beam adjustment apparatus; and the sixth optical apparatus may be configured to converge the first reflected beam emergent from the first optical filter onto an intersection point between the fifth optical axis and the reflected beam adjustment apparatus. This is not limited in this application.

With reference to the first aspect, in an embodiment of the first aspect, the fourth optical apparatus includes a fourth optical 4f system, where the incident beam adjustment apparatus is located at a front focus of a front lens of the fourth optical 4f system, and the first optical filter is located at a rear focus of a rear lens of the fourth optical 4f system; or the fourth optical apparatus includes a fourth lens, where the incident beam adjustment apparatus is located at a 2× focal length on a first side of the fourth lens, and the first optical filter is located at a 2× focal length on a second side of the fourth lens. In this way, the beam emergent from the incident beam adjustment apparatus can be converged by using the fourth beam adjustment apparatus.

When the fourth optical apparatus includes the fourth optical 4f system or the fourth lens, for a correspondence between the included angle between the beam emergent from the incident beam adjustment apparatus and the fourth optical axis and the included angle between the beam emergent from the fourth optical apparatus and the fourth optical axis, refer to the description about the first optical apparatus. Details are not described again.

With reference to the first aspect, in an embodiment of the first aspect, the fifth optical apparatus includes a fifth optical 4f system, where the first optical filter is located at a front focus of a front lens of the fifth optical 4f system, and the second beam adjustment apparatus is located at a rear focus of a rear lens of the fifth optical 4f system; or the fifth optical apparatus includes a fifth lens, where the first optical filter is located at a 2× focal length on a first side of the fifth lens, and the second beam adjustment apparatus is located at a 2× focal length on a second side of the fifth lens. In this way, the transmitted beam emergent from the first optical filter can be converged by using the fifth beam adjustment apparatus.

When the fifth optical apparatus includes the fifth optical 4f system or the fifth lens, for a correspondence between the included angle between the transmitted beam emergent from the first optical filter and the fourth optical axis and the included angle between the beam emergent from the fifth optical apparatus and the fourth optical axis, refer to the description about the first optical apparatus. Details are not described again.

With reference to the first aspect, in an embodiment of the first aspect, the sixth optical apparatus includes a sixth optical 4f system, where the first optical filter is located at a front focus of a front lens of the sixth optical 4f system, and the reflected beam adjustment apparatus is located at a rear focus of a rear lens of the sixth optical 4f system; or the sixth optical apparatus includes a sixth lens, where the first optical filter is located at a 2× focal length on a first side of the sixth lens, and the reflected beam adjustment apparatus is located at a 2× focal length on a second side of the sixth lens. In this way, the reflected beam emergent from the first optical filter can be converged by using the sixth beam adjustment apparatus.

When the sixth optical apparatus includes the sixth optical 4f system or the sixth lens, for a correspondence between the included angle between the reflected beam emergent from the first optical filter and the fifth optical axis and the included angle between the beam emergent from the sixth optical apparatus and the fifth optical axis, refer to the description about the first optical apparatus. Details are not described again.

With reference to the first aspect, in an embodiment of the first aspect, the first beam adjustment apparatus includes a dual-reflective-surface MEMS micro-mirror, where one MEMS micro-mirror in the dual-reflective-surface MEMS micro-mirror is configured to reflect an incident beam, and the other MEMS micro-mirror is configured to reflect the reflected beam.

The T-OADM further includes a spherical reflector, configured to converge the beam emergent from a dual-reflective-surface MEMS micro-mirror onto the second beam adjustment apparatus, where the included angle between the beam emergent from the dual-reflective MEMS micro-mirror and the optical axis one-to-one corresponds to the included angle between the beam emergent from the spherical reflector and the optical axis.

For example, the first beam adjustment apparatus may be disposed at a 2× focal length on a first side of the spherical reflector, where the first beam adjustment apparatus is also at a 2× focal length on an optical path that is reflected by the first optical filter and that is of the spherical reflector; and the second beam adjustment apparatus is disposed at a 2× focal length of the optical path that is transmitted by the first optical filter and that is on a second side of the spherical reflector. In this way, the input beam emergent from the first beam adjustment apparatus can be converged. In this case, the included angle between the beam emergent from the incident beam adjustment apparatus and the optical axis is equal to the included angle between the beam emergent from the spherical reflector and the optical axis.

In some possible implementations, the spherical reflector is configured to converge the beam emergent from the dual-reflective-surface MEMS micro-mirror onto an intersection point between the optical axis and the second beam adjustment apparatus. This is not limited in this application.

With reference to the first aspect, in an embodiment of the first aspect, a reflector, configured to adjust a transmission direction of the reflected beam emergent from the spherical reflector, so that the reflected beam is output to the third port. In this way, the optical path of the reflected beam can be folded, so that a structure of the T-OADM can be more compact, and a volume of the T-OADM apparatus can be reduced.

With reference to the first aspect, in an embodiment of the first aspect, in an example in which the first optical filter is a band-pass optical filter and a third port outputs a first reflected beam, the first beam adjustment apparatus is configured to adjust a transmission direction of the first reflected beam, so that the first reflected beam is output to the third port; and the third port is configured to output the first reflected beam. In this way, the T-OADM can implement dropping of the beam of the first wavelength.

With reference to the first aspect, in an embodiment of the first aspect, in an example in which the first optical filter is a band-pass optical filter and the third port outputs some of the first reflected beams, in this case, the T-OADM further includes a second optical filter, a third beam adjustment apparatus, a fourth beam adjustment apparatus, and a fourth port, where the first beam adjustment apparatus is configured to adjust a transmission direction of the first reflected beam based on a second signal dropped (or added) by the T-OADM, so that the first reflected beam is incident onto the second optical filter at a second incident angle, where the second incident angle corresponds to a wavelength of the second signal;
  the second optical filter is configured to: receive a beam that is incident at the second incident angle, and split the beam incident onto the second optical filter into a second transmitted beam and a second reflected beam, where a wavelength of a beam included in the second transmitted beam is different from a wavelength of a beam included in the second reflected beam;
  the third beam adjustment apparatus is configured to adjust a transmission direction of the second transmitted beam based on the second incident angle;
  the fourth port is configured to output the second transmitted beam;
  the fourth beam adjustment apparatus is configured to adjust a transmission direction of the second reflected beam based on the second incident angle; and
  the third port is configured to output the second reflected beam.

Therefore, in an embodiment of the application, the beam adjustment apparatus adjusts, based on the wavelength of the second signal that needs to be dropped (or added) by the T-OADM, the transmission direction of the first reflected beam emergent from the first optical filter, so that the first reflected beam is incident onto the second optical filter at the second incident angle. The beam adjustment apparatus may further adjust, based on the second incident angle, transmission directions of the transmitted beam and the reflected beam that are emergent from the second optical filter, so that the transmitted beam and the reflected beam that are emergent from the optical filter are output to corresponding ports, and the T-OADM apparatus can drop (or add) signals of two wavelengths simultaneously, for example, the T-OADM apparatus can drop (or add) a signal of the second wavelength while dropping (or adding) a signal of the first wavelength.

In some embodiments, when the first optical filter is a band-pass optical filter, the second optical filter is also a band-pass optical filter; or when the first optical filter is a band-stop optical filter, the second optical filter is also a band-stop optical filter. This is not limited in an embodiment of the application.

With reference to the first aspect, in an embodiment of the first aspect, in an example in which the first optical filter is a band-pass optical filter, the second port is further configured to input an input beam of the first wavelength, and the input beam is transmitted by the first optical filter and output to the first port; and the first port is further configured to output the beam transmitted by the first optical filter. In this way, the signal of the first wavelength can be added.

With reference to the first aspect, in an embodiment of the first aspect, in an example in which the first optical filter is a band-pass optical filter, the third port is further configured to input a beam output from the fifth port, and the beam is reflected by the first optical filter and output to the first port; and the first port is further configured to output the beam reflected by the first optical filter. In this way, a signal can be transparently transmitted.

In some embodiments, the first port may also be referred to as an input/output port, the second port may also be referred to as a first transmission input/output port, the third port may also be referred to as a first reflection input/output port, the fourth port may also be referred to as a second transmission input/output port, and the fifth port may also be referred to as a second reflection input/output port. This is not limited in an embodiment of the application.

With reference to the first aspect, in an embodiment of the first aspect, the first optical filter includes at least two regions, and the at least two regions have different filter bandwidths; and
  the apparatus further includes a driving component, where the driving component is connected to the first optical filter, and is configured to drive the first optical filter to move, so that the input beam is incident onto a first region in the at least two regions, where a filtering wavelength of the first region is the same as the wavelength of the first signal.

Therefore, in an embodiment of the application, the first optical filter is disposed to include at least two regions that have different filter bandwidths, and the filtering center wavelength of the first optical filter can be dynamically adjusted by adjusting an incident position of the beam on the first optical filter, so that the T-OADM apparatus can dynamically adjust the wavelength of the dropped (or added) signal.

According to a second aspect, a tunable optical add/drop multiplexer is provided, including: a first port, a rotating component, an optical filter, a reflector, a transmission port, and a reflection port, where the rotating component is connected to both the optical filter and the reflector, the optical filter is connected to the reflector, and there is a fixed included angle between the optical filter and a reflective surface of the reflector;
  the first port is configured to input an input beam including at least two wavelengths;
  the rotating component is configured to rotate to adjust tilt angles of the optical filter and the reflector, so that the input beam is incident onto the optical filter at a first incident angle;
  the optical filter is configured to receive the beam that is incident at the first incident angle, and split the incident beam into a transmitted beam and a reflected beam, where a wavelength of a beam included in the transmitted beam is different from a wavelength of a beam included in the reflected beam;

the reflector is configured to reflect the reflected beam, so that the reflected beam is output to the reflection port;

the transmission port is configured to output the transmitted beam; and the reflection port is configured to output the reflected beam.

Therefore, in an embodiment of the application, the optical filter and the reflector are disposed to be connected to the rotating component, a fixed angle is maintained between the optical filter and the rotating component, and the rotating component rotates to change the tilt angle of the optical filter, so as to change an incident angle at which an incident beam is incident onto the optical filter. In addition, after the optical filter splits the incident beam into the transmitted beam and the reflected beam, the emergent reflected beam is further reflected to the reflection port by using the reflector that has a fixed angle from the optical filter. In an embodiment of the application, a fixed angle is set between the optical filter and the reflector, so that the reflected beam can be coupled to the reflection port by using the reflector. Therefore, complexity of the T-OADM apparatus can be reduced in an embodiment of the application.

When the wavelength of the optical signal dropped (or added) by the T-OADM needs to be adjusted, that is, the filtering center wavelength (or the wavelength of the first transmitted beam) of the optical filter needs to be adjusted, the adjustment may be implemented by controlling the rotating component to rotate. In this case, because the set fixed angle can still be maintained between the optical filter and the reflector, the transmitted beam and the reflected beam can be coupled to a corresponding port.

In an embodiment, the T-OADM further includes a control unit, where the control unit is configured to control the rotating component to rotate, to adjust the first incident angle at which the beam is incident onto the first optical filter, so as to adjust the wavelength of the signal that needs to be dropped (or added) by the T-OADM apparatus.

For example, the rotating component may be a motor or a MEMS rotating component. This is not limited in an embodiment of the application.

For example, the optical filter may be a band-pass optical filter or a band-stop optical filter, and a filtering wavelength of the optical filter is related to the first incident angle.

When the optical filter is a band-pass optical filter, the optical filter may split an incident beam into a transmitted beam including a first wavelength and a reflected beam including at least one wavelength, where the first wavelength is a wavelength of a beam selected by the optical filter when the beam is incident onto the optical filter at the first incident angle. Correspondingly, a signal output by the transmission port is a signal dropped by the T-OADM apparatus, and a signal output by the reflection port is a signal transparently transmitted by the T-OADM apparatus.

When the optical filter is a band-stop optical filter, the optical filter may split an incident beam into a reflected beam including a first wavelength and a transmitted beam including at least one wavelength, where the first wavelength is a wavelength of a beam selected by the optical filter when the beam is incident onto the optical filter at the first incident angle. Correspondingly, a signal output by the reflection port is a signal dropped by the T-OADM apparatus, and a signal output by the transmission port is a signal transparently transmitted by the T-OADM apparatus.

In an example, the angle between the optical filter and the reflective surface of the reflector may be set within a range of 40° to 120°. This is not limited in this application.

In an example, an optical path length between a position of a beam spot formed by the beam on the optical filter and a position of a beam spot formed by the beam on the reflective surface of the reflector may be controlled to be less than or equal to 80 mm. This is not limited in this application.

With reference to the second aspect, in an embodiment of the second aspect, the reflective surface of the reflector is disposed perpendicular to the optical filter. In this case, the input beam incident onto the optical filter is parallel to the reflected beam emergent from the reflector, so that a volume of the T-OADM apparatus can be reduced.

With reference to the second aspect, in an embodiment of the second aspect, the T-OADM further includes a dual-fiber collimator and a first prism, where the dual-fiber collimator and the first prism are located between the first port and the optical filter, and are located between the reflection port and the reflector; and the input beam is incident onto the optical filter sequentially through the dual-fiber collimator and the first prism, and the reflected beam emergent from the reflector is incident onto the reflection port sequentially through the first prism and the dual-fiber collimator, where the input beam incident onto the optical filter is parallel to the reflected beam emergent from the reflector.

In this way, in an embodiment of the application, the first port and the reflection input/output port can be connected by using a dual-fiber collimator, to further reduce the volume of the T-OADM apparatus.

For example, the first prism may be a roof prism. This is not limited in this application.

With reference to the second aspect, in an embodiment of the second aspect, the T-OADM further includes a second prism and a third prism, where the second prism is located between the optical filter and the transmission port, and is configured to reduce a displacement of the transmitted beam, so as to reduce impact of the displacement on coupling of the transmitted beam to a corresponding port; and the third prism is located between the reflector and the reflection port, and is configured to reduce a displacement of the reflected beam, so as to reduce impact of the displacement on coupling of the reflected beam to a corresponding port.

With reference to the second aspect, in an embodiment of the second aspect, in an example in which the optical filter is a band-pass optical filter, the transmission port is further configured to input an input beam of the first wavelength, and the input beam is transmitted through the optical filter, and is output to the first port; and the first port is further configured to output the beam transmitted through the optical filter. In this way, the signal of the first wavelength can be added. In some embodiments, the transmission port may also be referred to as a transmission input/output port.

With reference to the second aspect, in an embodiment of the second aspect, in an example in which the optical filter is a band-pass optical filter, the reflection port is further configured to input a beam output from a fifth port, and the beam is reflected by the optical filter and output to the first port; and the first port is further configured to output the beam reflected by the optical filter. In this way, a signal can be transparently transmitted. In some embodiments, the reflection port may also be referred to as a reflection input/output port.

With reference to the second aspect, in an embodiment of the second aspect, the optical filter includes at least two regions, and the at least two regions have different filter bandwidths;
  the apparatus further includes a driving component, where the driving component is connected to the optical filter, and is configured to drive the optical filter to move, so that the input beam is incident onto a first region in the at least two regions; and
  the optical filter is configured to receive an incident beam through the first region.

Therefore, in an embodiment of the application, the optical filter is disposed to include at least two regions that have different filter bandwidths, and the filtering center wavelength of the optical filter can be dynamically adjusted by adjusting an incident position of a beam on the optical filter, so that the T-OADM apparatus can dynamically adjust the wavelength of the dropped (or added) signal.

According to a third aspect, a tunable optical add/drop multiplexer is provided, including: a first port, a first beam adjustment apparatus, an optical filter, a second beam adjustment apparatus, a third beam adjustment apparatus, a transmission port, and a reflection port, where
  the first port is configured to input an input beam including at least two wavelengths;
  the first beam adjustment apparatus is configured to adjust a transmission direction of the input beam based on a first signal dropped by a T-OADM, so that the input beam is incident onto the optical filter at a first incident angle, where the first incident angle corresponds to a wavelength of the first signal;
  the optical filter is configured to receive the beam that is incident at the first incident angle, and split the incident beam into a transmitted beam and a reflected beam, where a wavelength of a beam included in the transmitted beam is different from a wavelength of a beam included in the reflected beam;
  the second beam adjustment apparatus is configured to adjust a transmission direction of the transmitted beam, so that the transmitted beam is output to the transmission port through the optical filter and the first beam adjustment apparatus;
  the transmission port is configured to output the transmitted beam;
  the third beam adjustment apparatus is further configured to adjust a transmission direction of the reflected beam, so that the reflected beam is output to the reflection port through the optical filter and the first beam adjustment apparatus; and
  the reflection port is configured to output the reflected beam.

Therefore, in an embodiment of the application, the first beam adjustment apparatus changes the incident angle of the incident beam to the optical filter; after the optical filter splits the incident beam into the transmitted beam and the reflected beam, the second beam adjustment apparatus reflects the transmitted beam emergent from the optical filter to the optical filter, and then the first beam adjustment apparatus outputs the transmitted beam to the transmission port; in addition, the third beam adjustment apparatus reflects the reflected beam emergent from the optical filter to the optical filter, and then the first beam adjustment apparatus outputs the reflected beam to the reflection port.

In an embodiment, a control unit may further be included, where the control unit is configured to control the first beam adjustment apparatus to adjust a deflection direction and a deflection angle of the incident beam, to adjust the first incident angle at which the beam is incident onto a first optical filter, so as to adjust the wavelength of the signal that needs to be dropped (or added) by the T-OADM apparatus.

For example, the optical filter may be a band-pass optical filter or a band-stop optical filter, and a filtering wavelength of the optical filter is related to the first incident angle.

When the optical filter is a band-pass optical filter, the optical filter may split an incident beam into a transmitted beam including a first wavelength and a reflected beam including at least one wavelength, where the first wavelength is a wavelength of a beam selected by the optical filter when the beam is incident onto the optical filter at the first incident angle. Correspondingly, a signal output by the transmission port is a signal dropped by the T-OADM apparatus, and a signal output by the reflection port is a signal transparently transmitted by the T-OADM apparatus.

When the optical filter is a band-pass optical filter, the optical filter may split an incident beam into a reflected beam including a first wavelength and a transmitted beam including at least one wavelength, and the first wavelength is a wavelength of a beam selected by the optical filter when the incident beam is incident onto the optical filter at the first incident angle. Correspondingly, the signal output by the reflection port is a signal dropped by the T-OADM apparatus, and the signal output by the transmission port is a signal transparently transmitted by the T-OADM apparatus.

With reference to the third aspect, in an embodiment of the third aspect, the second beam adjustment apparatus includes a seventh lens and a first reflector, and the seventh lens is disposed in a yz plane of a first space rectangular coordinate system xyz; and a direction of an x axis in the first space rectangular coordinate system xyz is a direction of an optical axis of the first lens, and a direction of a z axis in the first space rectangular coordinate system xyz is a direction of the transmission port relative to the first port;
  the first optical filter is located on a first side of the seventh lens, the first reflector is located at a focus on a second side of the seventh lens, and the first optical filter is parallel to the z axis and has an included angle with the yz plane, and the first reflector is parallel to a y axis in the first space rectangular coordinate system xyz and has an included angle α1 with the yz plane;
  the seventh lens is configured to collimate a transmitted beam emergent from the optical filter, so that the transmitted beam is incident onto the first reflector along the x-axis direction; and
  the first reflector is configured to reflect the transmitted beam to the transmission port through the seventh lens, the optical filter, and the first beam adjustment apparatus and at a first lateral offset $h_1$ in the z-axis direction.

Therefore, the first reflector is disposed parallel to the y axis in the space rectangular coordinate system xyz and has an included angle α1 with the yz plane, and a distance between the transmission port and the first port in the z-axis direction is set to $h_1$, so that the transmitted beam can be output to the transmission port, so as to implement signal dropping.

With reference to the third aspect, in an embodiment of the third aspect, the optical filter is located at a focus on the first side of the seventh lens.

With reference to the third aspect, in an embodiment of the third aspect, the optical filter is located between the first beam adjustment apparatus and the seventh lens, and the first beam adjustment apparatus is disposed at a focus on the first side of the seventh lens.

With reference to the third aspect, in an embodiment of the third aspect, the third beam adjustment apparatus includes an eighth lens and a second reflector, and the eighth lens is disposed in a y'z' plane of a second space rectangular coordinate system x'y'z', where a direction of the x' axis in the second space rectangular coordinate system x'y'z' is a direction of an optical axis of the eighth lens, and a direction of a z' axis in the second space rectangular coordinate system x'y'z' is a direction of the reflection port relative to the first port;

the optical filter is located on a first side of the eighth lens, the second reflector is located at a focus on the second side of the eighth lens, the optical filter is parallel to a z' axis and has an included angle with the y'z' plane, and the second reflector is parallel to a y' axis in the second space rectangular coordinate system x'y'z' and has an included angle $\alpha_2$ with the y'z' plane;

the eighth lens is configured to collimate a reflected beam emergent from the optical filter, so that the reflected beam is incident onto the second reflector along the x-axis direction; and the second reflector is configured to reflect the reflected beam to the reflection port through the eighth lens, the optical filter, and the first beam adjustment apparatus and at a second lateral offset $h_2$ in the z-axis direction.

Therefore, the second reflector is disposed parallel to the y' axis in the space rectangular coordinate system x'y'z and has an included angle $\alpha_2$ with the y'z' plane, and further the distance between the reflection port and the first port along the z' axis direction is set to $h_2$, so that the reflected beam can be output to the reflection port, and the beam can be transparently transmitted.

With reference to the third aspect, in an embodiment of the third aspect, the optical filter is located at a focus on the first side of the eighth lens.

With reference to the third aspect, in an embodiment of the third aspect, the optical filter is located between the first beam adjustment apparatus and the eighth lens, and the first beam adjustment apparatus is disposed at a focus of a folded optical path reflected by the optical filter on the first side of the eighth lens.

Therefore, in an embodiment of the application, the beam adjustment apparatus (for example, a lens and a reflector disposed at a focus of the lens) may be used to reflect the beam transmitted through the optical filter, so that the beam is output to the transmission port through the optical filter and at a lateral offset, and the beam is reflected by the optical filter. In this way, the beam is output to the reflection port through the optical filter and at a lateral offset, and the transmitted beam and the reflected beam are coupled to corresponding ports, thereby implementing dynamic adjustment of a wavelength of a signal dropped or added by the T-OADM apparatus. In an embodiment of the application, wavelengths of signals added and dropped by the T-OADM apparatus can be dynamically adjusted, wavelength-level service switching is supported, a network structure is flexible, and operation and maintenance are simple, which facilitates intelligent control of an optical network.

With reference to the third aspect, in an embodiment of the third aspect, in an example in which the optical filter is a band-pass optical filter, the transmission port is further configured to input an input beam of the first wavelength, and the input beam is transmitted through the optical filter, and is output to the first port; and the first port is further configured to output the beam transmitted through the optical filter. In this way, the signal of the first wavelength can be added. In some embodiments, the transmission port may also be referred to as a transmission input/output port.

With reference to the third aspect, in an embodiment of the third aspect, in an example in which the optical filter is a band-pass optical filter, the reflection port is further configured to input a beam, and the beam is reflected by the optical filter and output to the first port; and the first port is further configured to output the beam reflected by the optical filter. In this way, a signal can be transparently transmitted. In some embodiments, the reflection port may also be referred to as a reflection input/output port.

According to a fourth aspect, a tunable optical add/drop multiplexer is provided, including: a first port, a rotating component, an optical filter, a beam adjustment apparatus, a transmission port, and a reflection port, where the first port is configured to input an input beam including at least two wavelengths;

the rotating component is connected to the optical filter, and configured to rotate to adjust a tilt angle of the optical filter, so that the input beam is incident onto the optical filter at a first incident angle;

the optical filter is configured to receive the beam that is incident at the first incident angle, and split the incident beam into a transmitted beam and a reflected beam, where a wavelength of a beam included in the transmitted beam is different from a wavelength of a beam included in the reflected beam;

the beam adjustment apparatus is configured to adjust a transmission direction of the reflected beam, so that the reflected beam is output to the reflection port through the optical filter;

the transmission port is configured to output the transmitted beam; and the reflection port is configured to output the reflected beam.

Therefore, in an embodiment of the application, the rotating component rotates to change the tilt angle of the optical filter, so as to change the incident angle at which the incident beam is incident onto the optical filter. In addition, after the optical filter splits the incident beam into the transmitted beam and the reflected beam, the emergent reflected beam is reflected by the beam adjustment apparatus, and is transmitted to the reflection port through the optical filter.

In an embodiment, the T-OADM further includes a control unit, where the control unit is configured to control the rotating component to rotate, to adjust the first incident angle at which the beam is incident onto the first optical filter, so as to adjust the wavelength of the signal that needs to be dropped (or added) by the T-OADM apparatus.

For example, the optical filter may be a band-pass optical filter or a band-stop optical filter, and a filtering wavelength of the optical filter is related to the first incident angle.

When the optical filter is a band-pass optical filter, the optical filter may split an incident beam into a transmitted beam including a first wavelength and a reflected beam including at least one wavelength, where the first wavelength is a wavelength of a beam selected by the optical filter when the beam is incident onto the optical filter at the first incident angle. Correspondingly, a signal output by the transmission port is a signal dropped by the T-OADM apparatus, and a signal output by the reflection port is a signal transparently transmitted by the T-OADM apparatus.

When the optical filter is a band-stop optical filter, the optical filter may split an incident beam into a reflected beam including a first wavelength and a transmitted beam including at least one wavelength, where the first wavelength is a wavelength of a beam selected by the optical filter when the beam is incident onto the optical filter at the first incident angle. Correspondingly, the signal output by the reflection port is a signal dropped by the T-OADM apparatus, and the signal output by the transmission port is a signal transparently transmitted by the T-OADM apparatus.

With reference to the fourth aspect, in an embodiment of the fourth aspect, both the first port and the reflection port are connected to a circulator;
the beam adjustment apparatus is configured to enable the reflected beam to be reflected back to the circulator through the optical filter; and
the circulator is configured to transmit the reflected beam to the reflection port.

Therefore, in an embodiment of the application, after the optical filter splits the incident beam into the transmitted beam and the reflected beam, the beam reflected by the optical filter is reflected, so that the beam is transmitted to the circulator through the optical filter, and then transmitted to the reflection port by using the circulator. In this way, the beam is transmitted to the reflection port through the optical filter, and the transmitted beam and the reflected beam are coupled to corresponding ports, thereby implementing dynamic adjustment of a wavelength of a signal dropped or added by the T-OADM apparatus. In an embodiment of the application, wavelengths of signals added and dropped by the T-OADM apparatus can be dynamically adjusted, wavelength-level service switching is supported, a network structure is flexible, and operation and maintenance are simple, which facilitates intelligent control of an optical network.

With reference to the fourth aspect, in an embodiment of the fourth aspect, the beam adjustment apparatus is a microelectromechanical system MEMS micro-mirror or a liquid crystal on silicon LCOS.

With reference to the fourth aspect, in an embodiment of the fourth aspect, the beam adjustment apparatus includes a first lens and a second reflector, where the optical filter is located at a focus on a first side of the first lens, the second reflector is located at a focus on a second side of the first lens, and a plane in which the second reflector is located is perpendicular to an optical axis of the first lens;
the first lens is configured to collimate a reflected beam emergent from the optical filter, so that the reflected beam is perpendicular to the second reflector; and
the second reflector is configured to enable the reflected beam to be reflected to the circulator along the z-axis direction through the first lens and the optical filter.

With reference to the fourth aspect, in an embodiment of the fourth aspect, the beam adjustment apparatus includes a second lens and a third reflector, where the second lens is disposed in a y'z' plane of a space rectangular coordinate system x'y'z'; and a direction of an x' axis in the space rectangular coordinate system x'y'z' is a direction of an optical axis of the second lens, and a direction of a z' axis in the space rectangular coordinate system x'y'z' is a direction of the reflection port relative to the first port;
the optical filter is located at a focus on a first side of the second lens, the third reflector is located at a focus on a second side of the second lens, the optical filter is parallel to the z' axis and has an included angle with the y'z' plane, and the third reflector is parallel to a y' axis in the space rectangular coordinate system x'y'z' and has an included angle with the y'z' plane;
the second lens is configured to collimate a reflected beam emergent from the optical filter, so that the reflected beam is incident onto the third reflector along the x-axis direction; and
the third reflector is configured to reflect the reflected beam to the reflection port through the second lens and the optical filter and at a first lateral offset along the z' axis direction.

In this way, the third reflector is disposed parallel to the y' axis in the space rectangular coordinate system x'y'z and has an included angle $\alpha_3$ with the y'z' plane, the distance between the reflection port and the first port along the z' axis direction is $h_3$, so that the reflected beam can be output to the reflection port, so as to implement transparent transmission of the beam.

Therefore, in an embodiment of the application, the rotating component rotates to change the tilt angle of the optical filter, so as to change the incident angle of the incident beam to the optical filter. In addition, after the optical filter splits the incident beam into the transmitted beam and the reflected beam, the beam reflected by the optical filter is reflected, so that the beam is output to the reflection port through the optical filter and at a lateral shift, so as to couple the transmitted beam and the reflected beam to corresponding ports, thereby implementing dynamic adjustment of a wavelength of a signal dropped or added by the T-OADM apparatus. In an embodiment of the application, wavelengths of signals added and dropped by the T-OADM apparatus can be dynamically adjusted, wavelength-level service switching is supported, a network structure is flexible, and operation and maintenance are simple, which facilitates intelligent control of an optical network.

With reference to the fourth aspect, in an embodiment of the fourth aspect, in an example in which the optical filter is a band-pass optical filter, the transmission port is further configured to input an input beam of the first wavelength, and the input beam is transmitted by using the optical filter, and is output to the first port; and the first port is further configured to output the beam transmitted through the optical filter. In this way, the signal of the first wavelength can be added. In some embodiments, the transmission port may also be referred to as a transmission input/output port.

With reference to the fourth aspect, in an embodiment of the fourth aspect, in an example in which the optical filter is a band-pass optical filter, the reflection port is further configured to input a beam, and the beam is reflected by the optical filter and output to the first port; and the first port is further configured to output the beam reflected by the optical filter. In this way, a signal can be transparently transmitted. In some embodiments, the reflection port may also be referred to as a reflection input/output port.

With reference to the fourth aspect, in an embodiment of the fourth aspect, the optical filter includes at least two regions, and the at least two regions have different filter bandwidths;
the apparatus further includes a driving component, where the driving component is connected to the optical filter, and configured to drive the optical filter to move, so that the input beam is incident onto a first region in the at least two regions; and
the optical filter is configured to receive an incident beam through the first region.

Therefore, in an embodiment of the application, the optical filter is disposed to include at least two regions that have different filter bandwidths, and the filtering center wavelength of the optical filter can be dynamically adjusted by adjusting an incident position of a beam on the optical filter, so that the T-OADM apparatus can dynamically adjust the wavelength of the dropped (or added) signal.

According to a fifth aspect, a tunable optical add/drop multiplexer is provided, including: an input port, a driving component, an optical filter, a transmission output port, and a reflection output port, where the input port is configured to input an input beam including at least two wavelengths;

the driving component is connected to the optical filter, and is configured to drive the optical filter so that the input beam is incident onto a first region of at least two regions of the optical filter, where different regions of the at least two regions have different filter bandwidths;

the optical filter is configured to receive an incident beam through the first region, and split the incident beam into a transmitted beam and a reflected beam, where a wavelength of a beam included in the transmitted beam is different from a wavelength of a beam included in the reflected beam;

the transmission output port is configured to output the transmitted beam; and the reflection output port is configured to output the reflected beam.

Therefore, in an embodiment of the application, the optical filter is disposed to include at least two regions that have different filter bandwidths, and the filtering center wavelength of the optical filter can be dynamically adjusted by adjusting an incident position of a beam on the optical filter, so that the T-OADM apparatus can dynamically adjust the wavelength of the dropped (or added) signal.

In an embodiment, the T-OADM may further include a control unit, where the control unit is configured to control the driving component to move, so that a beam is incident onto different regions of the first optical filter, so as to adjust a wavelength of a signal that needs to be dropped (or added) by the T-OADM apparatus.

For example, the optical filter may be a band-pass optical filter or a band-stop optical filter.

When the optical filter is a band-pass optical filter, the first region of the optical filter may split an incident beam into a transmitted beam including a first wavelength and a reflected beam including at least one wavelength, where the first wavelength is a wavelength of a beam selected by the optical filter when the beam is incident onto the optical filter at the first incident angle. Correspondingly, the signal output by the transmission output port is a signal dropped by the T-OADM apparatus, and the signal output by the reflection output port is a signal transparently transmitted by the T-OADM apparatus.

When the optical filter is a band-stop optical filter, the first region of the optical filter may split an incident beam into a reflected beam including a first wavelength and a transmitted beam including at least one wavelength, where the first wavelength is a wavelength of a beam selected by the optical filter when the beam is incident onto the optical filter at the first incident angle. Correspondingly, the signal output by the reflection output port is a signal dropped by the T-OADM apparatus, and the signal output by the transmission output port is a signal transparently transmitted by the T-OADM apparatus.

According to a sixth aspect, a control method is provided, where the method is applied to a tunable optical add/drop multiplexer T-OADM, and the T-OADM includes a first port, a first beam adjustment apparatus, a first optical filter, a second beam adjustment apparatus, a second port, and a third port, where the first port is configured to input an input beam including at least two wavelengths;

the first optical filter is configured to: receive a beam that is incident at the first incident angle, and split the incident beam into a first transmitted beam and a first reflected beam, where a wavelength of a beam included in the first transmitted beam is different from a wavelength of a beam included in the first reflected beam;

the second port is configured to output the first transmitted beam; and the third port is configured to output the first reflected beam.

The method includes:

receiving an instruction, where the instruction indicates a wavelength of a first signal dropped by the T-OADM;

determining, based on the wavelength of the first signal, a first deflection angle of the first beam adjustment apparatus for the input beam, a second deflection angle of the second beam adjustment apparatus for the first transmitted beam, and a third deflection angle of the first beam adjustment apparatus for the first reflected beam;

controlling, based on the first deflection angle, the first beam adjustment apparatus to adjust a transmission direction of the input beam, so that the input beam is incident onto the first optical filter at a first incident angle, where the first incident angle corresponds to the wavelength of the first signal;

controlling, based on the second deflection angle, the second beam adjustment apparatus to adjust a transmission direction of the first transmitted beam, so that the first transmitted beam is output to the second port; and controlling, based on the third deflection angle, the first beam adjustment apparatus to adjust a transmission direction of the first reflected beam, so that the first reflected beam is output to the third port.

Therefore, in an embodiment of the application, the wavelength of the first signal that needs to be dropped (or added) by the T-OADM apparatus is received, and a deflection angle of a beam of each beam adjustment apparatus is controlled based on the wavelength of the first signal, so that the wavelength of the signal that is dropped or added by the T-OADM apparatus can be flexibly controlled according to an actual requirement, thereby implementing a more flexible and controllable T-OADM apparatus.

For example, the control method may be performed by a control unit disposed in the T-OADM apparatus.

For example, the control unit may separately send a control signal to the first beam adjustment apparatus and the second beam adjustment apparatus, so that the first beam adjustment apparatus and the second beam adjustment apparatus may separately adjust a transmission direction of a beam based on the control signal.

In an embodiment, a plurality of wavelengths of signals that can be dropped or added by the T-OADM apparatus can be preconfigured, and deflection angles that are of the beam adjustment apparatus for the incident beam, the transmitted beam, and the reflected beam and that correspond to each wavelength may be preconfigured. When an instruction of a wavelength of a signal that needs to be dropped or added by the T-OADM apparatus is obtained, deflection angles that are of the beam adjustment apparatus for the incident beam, the transmitted beam, and the reflected beam and that correspond to the wavelength may be determined based on the preconfiguration.

In an embodiment, a correspondence between a wavelength of a signal that can be dropped or added by the T-OADM apparatus and deflection angles of the incident beam, the transmitted beam, and the reflected beam may be prestored. When the instruction of the wavelength of the signal that needs to be dropped or added by the T-OADM apparatus is obtained, deflection angles that are of the beam adjustment apparatus for the incident beam, the transmitted beam, and the reflected beam and that correspond to the wavelength may be determined based on the correspondence.

It should be understood that all other implementations of the first aspect may be applied to the sixth aspect.

BRIEF DESCRIPTION OF DRAWINGS

FIG. 33 is a schematic flowchart of a control method according to an embodiment of this application.

DESCRIPTION OF EMBODIMENTS

The following describes technical solutions of this application with reference to accompanying drawings.

First, related concepts and technologies in embodiments of this application are briefly described.

1. Wavelength division multiplexing (WDM): is a technology that converges optical carrier signals (carrying various information) of two or more wavelengths at a transmit end through a multiplexer and couples the signals to a same optical fiber of an optical line for transmission.

2. Micro-electromechanical system (MEMS): may construct complex mechanical structures in a small space, and a system size is measured in microns. The MEMS has been used in airbag sensors (accelerometers), pressure sensors, displays, adaptive light devices, scanners, printers, and data memories. A typical MEMS device consists of electronic circuits and mechanical devices.

Figure 1:
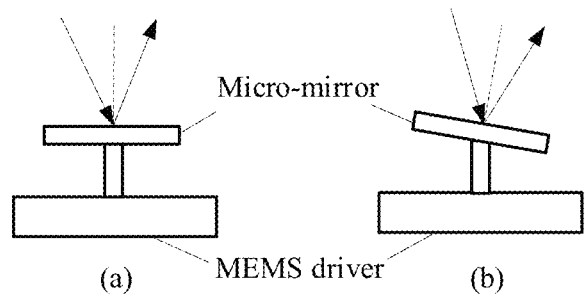
FIG. 1 shows two schematic diagrams of deflecting a beam by a MEMS micro-mirror.

3. MEMS micro-mirror: is an optical device that integrates a micro-mirror and a MEMS driver by using a MEMS technology. The MEMS driver may change a deflection direction of the micro-mirror, and further change an emergent angle of a beam incident onto the micro-mirror. FIG. 1 shows two examples in which a MEMS micro-mirror deflects a beam, where a MEMS driver can accurately control an emergent direction of an emergent beam by controlling deflection of a micro-mirror. The MEMS micro-mirror may be used as a beam adjustment apparatus (or device).

4. Liquid crystal on silicon (LCOS): is a very small matrix liquid crystal display device based on a reflection mode. The matrix is fabricated on a silicon chip by using a complementary metal oxide semiconductor (CMOS) technology. The LCOS may be used as a beam adjustment apparatus (or device).

Figure 2:
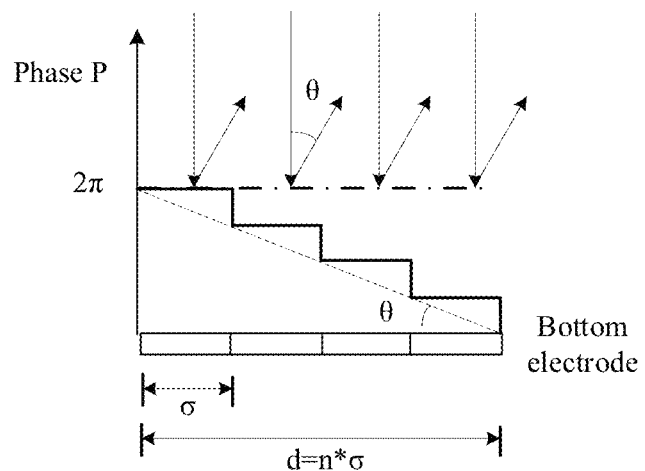
FIG. 2 is a schematic diagram showing a beam deflection principle of an LCOS.

FIG. 2 is a schematic diagram showing a beam deflection principle of an LCOS. COMS drive electrodes are at the bottom of the LCOS, and each electrode represents a pixel. The LCOS shown in FIG. 2 includes four electrodes, and a width of each electrode is $\sigma$. In this case, a width of n (n=4 in FIG. 2) electrodes satisfies d=n*$\sigma$, where n is a positive integer. The electrode controls deflection of liquid crystal molecules by voltage to change a refractive index of the liquid crystal molecules. When a polarized beam is perpendicularly incident onto a surface of the LCOS, a driving voltage of each pixel may be independently controlled to change a refractive index of a liquid crystal molecule, so as to change a phase of a beam emergent from each pixel after the beam passes through the liquid crystal molecule. Therefore, an emergent angle of the beam can be changed by applying a corresponding voltage to the electrode, to deflect the beam by different angles. In FIG. 2, a beam is deflected by an angle $\theta$.

Figure 3:
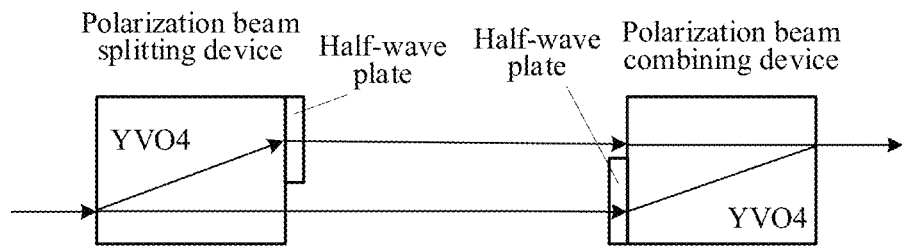
FIG. 3 is a schematic diagram showing an optical path for polarization beam splitting and polarization beam combining.

5. Beam polarization beam splitting (beam combining) device includes a polarization beam splitting (beam combining) crystal and a half-wave plate. The polarization beam splitting (beam combining) crystal is, for example, a neodymium-doped yttrium vanadate (YVO4) crystal or a polarization beam splitting prism such as a PBS crystal. This is not limited. FIG. 3 shows an example of an optical path for polarization beam splitting and polarization beam combining, where an example in which a polarization beam splitting (beam combining) crystal is YVO4 is used for description. As shown in FIG. 3, when a beam is incident onto a polarization beam splitting device, the beam is split into two beams whose polarizations are perpendicular to each other by using a YVO4 crystal, and one of the beams is transformed into a beam with the same polarization as the other beam by using a half-wave plate. After passing through the optical path system, the beam reaches a polarization beam combining device. A polarization state of one beam is changed after the beam passes through the half-wave plate, and the beam becomes a beam whose polarization is perpendicular to a polarization of another beam. The two beams whose polarizations are perpendicular to each other are combined into one beam again by using the YVO4 crystal again, so as to implement the beam polarization and beam combining process.

6. Optical filter: may be of a band-pass type or a band-stop type, and has strong transmission (or reflection) effect on light within a wavelength range; and light within a wavelength range other than the wavelength range has reflection (or transmission) effect and has a filtering characteristic. The T-OADM apparatus can be implemented as a filter device. As an optical filter device, a dielectric thin film filter can be constructed by combining dielectric thin films with different refractive indexes and different thicknesses according to an embodiment.

A band-pass optical filter is used as an example. A filtering center wavelength of the optical filter is related to an incident angle $\theta$ at which a beam is incident onto the optical filter. The following formula (1) is met.

$$\lambda = \lambda_0 \sqrt{1 - a\sin\theta^2} \quad (1)$$

where $\lambda_0$ is the filtering center wavelength of the optical filter corresponding to a case in which the beam is perpendicularly incident, $\lambda$ is the filtering center wavelength of the optical filter corresponding to a case in which the incident angle is $\theta$, and $\alpha$ is a fixed-value parameter. Herein, the filtering center wavelength is a center wavelength of the transmitted beam.

Figure 4:
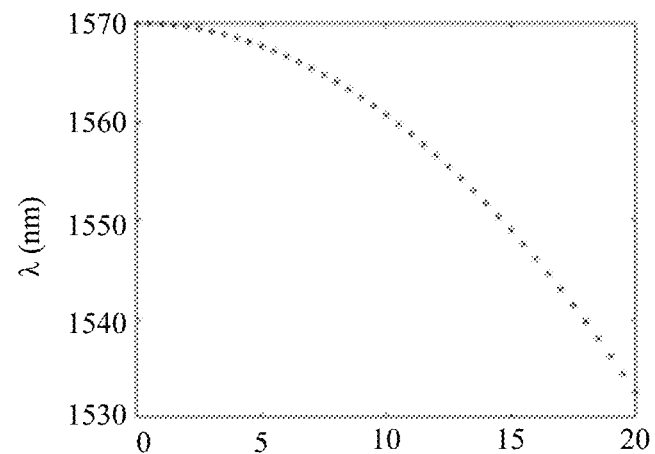
FIG. 4 is a schematic diagram showing a mapping relationship between a filtering center wavelength and an incident angle.

FIG. 4 shows an example of a mapping relationship between a filtering center wavelength and an incident angle that is obtained according to formula (1). In FIG. 4, an example in which $\lambda_0$=1570 nm and $\alpha$=0.38787 is used for description. It can be learned from FIG. 4 that the filtering center wavelength changes accordingly as the incident angle changes.

In some embodiments, the optical filter optically filters incident light in a particular wavelength range and in a particular polarization state. Therefore, before the optical filter filters the beam, one beam may be polarized and split by using the beam polarization beam splitting device to obtain a polarized beam; and after the optical filter filters the beam, the beam may be polarized and combined by using the beam polarization beam combining device.

According to the foregoing relationship between the filtering center wavelength and the incident angle, it can be learned that the incident angle needs to be dynamically changed, so as to dynamically adjust the filtering center wavelength of the optical filter. The incident angle can be changed in two ways: One is to fixedly dispose the filter, and dynamically change the angle of the incident beam, so as to change the filtering center wavelength; and the other is to keep the incident beam unchanged, and use the rotating component to deflect the optical filter to change the incident angle of the incident light, so as to change the filtering center wavelength of the optical filter.

7. OADM: is a device that implements adding/dropping and multiplexing of tributary signals in the optical domain. The device drops optical signals that need to be dropped locally in an optical channel and adds local optical signals to be sent to a user of another node. The device enables an optical network to have superior features such as flexibility, selectivity, and transparency, while improving reliability of the network, reducing node costs, and improving operation efficiency of the network. The T-OADM can dynamically change a wavelength of a dropped or added signal according to a requirement.

Figure 5:
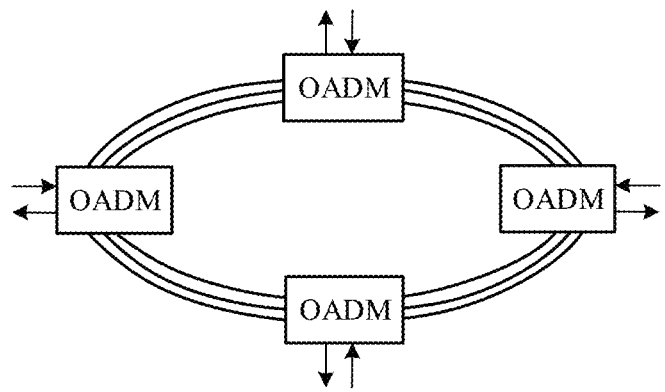
FIG. 5 is a schematic diagram of a WDM ring network.

The OADM is mainly used in a WDM network system. FIG. 5 is a schematic diagram of a WDM ring network. The network includes four OADMs, which are mainly configured to implement adding/dropping of signals in a WDM network node, that is, to drop signals of one or more wavelengths in a plurality of wavelength signals in the WDM ring network to a local node, or add a local signal of one or more wavelengths to an optical network for transmission to another network node. The use of OADM apparatuses in the optical network can make wavelength application and allocation of the optical network more flexible.

In a T-OADM apparatus, an optical filter may be disposed to change an incident angle at which an incident beam is incident onto the optical filter, to dynamically adjust a filtering center wavelength of the optical filter, thereby dynamically adjusting wavelengths of signals that need to be added to or dropped from the T-OADM apparatus.

In some embodiments, the optical filter may be fastened, and an incident angle at which an incident beam is incident onto the optical filter may be changed by using a beam adjustment apparatus (or a beam adjustment apparatus in combination with another apparatus or device), so that wavelengths of a transmitted beam and a reflected beam that are emergent from the optical filter can be dynamically adjusted. In an existing solution in which a transmitted beam and a reflected beam are coupled to corresponding ports, the transmitted beam and the reflected beam may be respectively reflected by a universal retroreflector apparatus, and reflected back to corresponding ports by using the thin film filter. As a result, a structure of this type of OADM apparatus is complex.

Based on this, an embodiment of this application provides an OADM apparatus. In the OADM apparatus, a beam adjustment apparatus changes an incident angle a which an incident beam is incident onto an optical filter. After the optical filter splits the incident beam into a transmitted beam and a reflected beam, the beam adjustment apparatus may further adjust a transmission direction of the transmitted beam emergent from the optical filter and a transmission direction of the reflected beam emergent from the optical filter, so that the transmitted beam and the reflected beam are output to corresponding ports.

In the following embodiments, an example in which the optical filter is a band-pass optical filter is used for description. It may be understood that the filters in the following embodiments may alternatively be band-stop optical filters. This is not limited in embodiments of this application.

Figure 6:
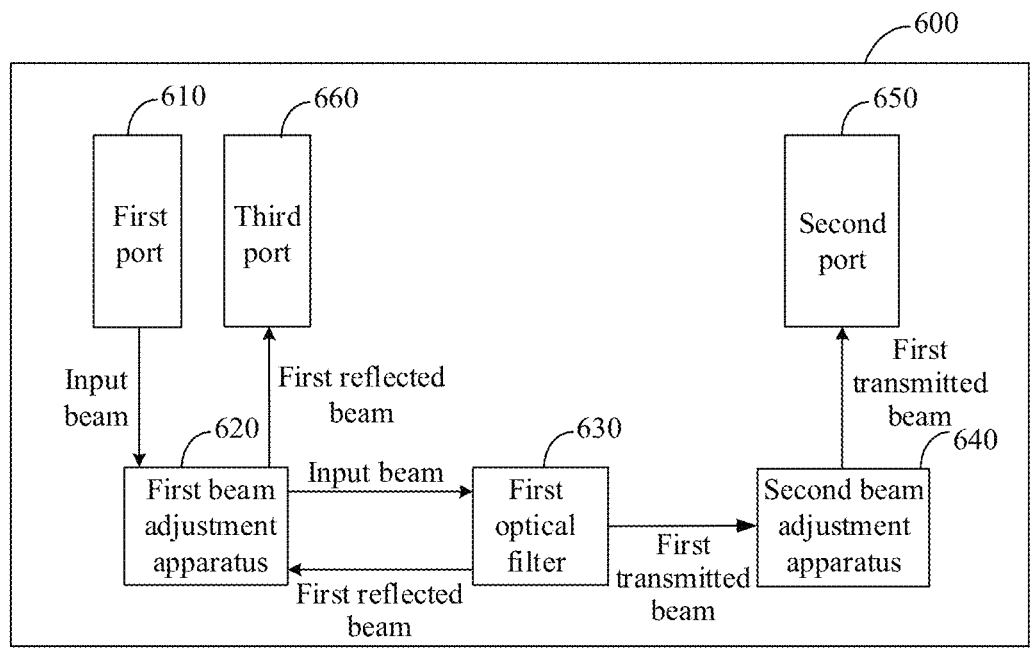
FIG. 6 is a schematic diagram of a structure of a T-OADM apparatus according to an embodiment of this application.

FIG. 6 is a schematic diagram of a structure of a T-OADM apparatus 600 according to an embodiment of this application. As shown in FIG. 6, the T-OADM apparatus 600 includes a first port 610, a first beam adjustment apparatus 620, a first optical filter 630, a second beam adjustment apparatus 640, a second port 650, and a third port 660.

The first port 610 is configured to input an input beam including at least two wavelengths.

The first beam adjustment apparatus 620 is configured to adjust a transmission direction of an input beam based on a first signal dropped (or added) by the T-OADM, so that the input beam is incident onto the first optical filter 630 at a first incident angle, where the first incident angle corresponds to a wavelength of the first signal.

Herein, the first beam adjustment apparatus 620 may dynamically adjust the transmission direction of the input beam based on a wavelength of a signal that needs to be dropped (or added) by the T-OADM apparatus 600, so as to adjust a magnitude of the first incident angle. For example, the wavelength of the signal that needs to be dropped (or added) and the first incident angle meet the foregoing formula (1).

The first optical filter 630 is configured to receive the beam that is incident at the first incident angle, and split the incident beam into a first transmitted beam including a first wavelength and a first reflected beam including at least one wavelength. The first wavelength is a wavelength of a beam selected by the first optical filter 630 when the beam is incident onto the first optical filter 630 at the first incident angle. Correspondingly, the first wavelength is a wavelength corresponding to a signal that needs to be dropped (or added) by the T-OAMD apparatus 600.

Herein, the first optical filter 630 may be fixedly disposed. In this case, a value of the first incident angle may be dynamically adjusted by using the first beam adjustment apparatus 620, so that the T-OADM apparatus 600 drops (or adds) a signal of the first wavelength.

The second beam adjustment apparatus 640 is configured to adjust a transmission direction of the first transmitted beam based on the first incident angle.

The second port 650 is configured to output the first transmitted beam.

The first beam adjustment apparatus 620 is further configured to adjust a transmission direction of the first reflected beam based on the first incident angle.

The third port 660 is configured to output the first reflected beam.

For example, in this application, the output transmitted beam may include all or a part of the output transmitted beams. This is not limited. The output reflected beam may include all or a part of the output reflected beams. This is not limited.

In some embodiments, the first beam adjustment apparatus 620 may be configured to adjust the transmission direction of the first reflected beam, so that the first reflected beam is output to the third port 660. In this case, the third port 660 is configured to output the first reflected beam.

In some other embodiments, when the OADM apparatus 600 further includes a second optical filter, the first beam adjustment apparatus 620 may be further configured to adjust the transmission direction of the first reflected beam, so that the first reflected beam is output to the second optical filter. In this case, the second optical filter may further perform optical filtering on the first reflected beam; and correspondingly, the third port 660 is configured to output a part of beams in the first reflected beam.

Therefore, in an embodiment of the application, the beam adjustment apparatus adjusts, based on the first signal that needs to be dropped (or added) by the T-OADM, the first incident angle at which the incident beam is incident onto the optical filter; and after the optical filter splits the incident beam into the transmitted beam and the reflected beam, the beam adjustment apparatus further adjusts, based on the first incident angle, the transmission direction of the transmitted beam emergent from the optical filter, and adjusts, based on the first incident angle, the transmission direction of the reflected beam emergent from the optical filter, so that the transmitted beam and the reflected beam are output to corresponding ports, thereby implementing a flexible and controllable T-OADM apparatus.

In some optional embodiments, the T-OADM apparatus 600 may further include a control unit. The control unit may be configured to:

receive an instruction, where the instruction indicates a wavelength of a first signal that needs to be dropped (or added) by the T-OADM apparatus. The control unit may be further configured to determine, based on the first wavelength, a first deflection angle of the first beam adjustment apparatus for the input beam, a second deflection angle of the second beam adjustment apparatus for the first transmitted beam, and a third deflection angle of the first beam adjustment apparatus for the first reflected beam.

Then, the control unit may be configured to: control, based on the first deflection angle, the first beam adjustment apparatus to adjust the transmission direction of the input beam; control, based on the second deflection angle, the second beam adjustment apparatus to adjust the transmission direction of the first transmitted beam; and control, based on the third deflection angle, the first beam adjustment apparatus to adjust the transmission direction of the first reflected beam.

Therefore, in an embodiment of the application, the control unit can receive the wavelength of the first signal that needs to be dropped (or added) by the T-OADM apparatus, and control, based on the wavelength of the first signal, a deflection angle of each beam adjustment apparatus for a beam, so that the wavelength of the signal that is dropped or added by the T-OADM apparatus can be flexibly controlled according to an actual requirement, thereby implementing a more flexible and controllable T-OADM apparatus.

In an embodiment, the control unit may be preconfigured to store a plurality of wavelengths of signals that can be dropped or added by the T-OADM apparatus, and deflection angles that are of the beam adjustment apparatus for the incident beam, the transmitted beam, and the reflected beam and that correspond to each wavelength. When obtaining the wavelength of the signal that needs to be dropped or added by the T-OADM apparatus, the control unit may determine, based on the preconfiguration, deflection angles that are of the beam adjustment apparatus for the incident beam, the transmitted beam, and the reflected beam and that correspond to the wavelength.

In an embodiment, the control unit may prestore a correspondence between a wavelength of a signal that can be dropped or added by the T-OADM apparatus and deflection angles of the beam adjustment apparatus for the incident beam, the transmitted beam, and the reflected beam. When obtaining the wavelength of the signal that needs to be dropped or added by the T-OADM apparatus, the control unit may determine, based on the correspondence, the angles by which the beam adjustment apparatus deflects the incident beam, the transmitted beam, and the reflected beam and that correspond to the wavelength.

In some embodiments, the first beam adjustment apparatus 620 may include an incident beam adjustment apparatus and a reflected beam adjustment apparatus. The incident beam adjustment apparatus is configured to adjust a transmission direction of an input beam, so that the input beam is incident onto the first optical filter 630 at the first incident angle; and the reflected beam adjustment apparatus is configured to adjust a transmission direction of the first reflected beam. In this way, an optical path can be set more flexibly.

For example, the incident beam adjustment apparatus and the reflected beam adjustment apparatus each may be a MEMS micro-mirror or an LCOS. This is not limited in an embodiment of the application.

In some other embodiments, the first beam adjustment apparatus 620 may include a dual-reflective-surface MEMS micro-mirror. One reflective-surface micro-mirror in the dual-reflective-surface MEMS micro-mirror is configured to adjust the transmission direction of the input beam, so that the input beam is incident onto the first optical filter 630 at the foregoing first incident angle. The other reflective-surface micro-mirror in the dual-reflective-surface MEMS micro-mirror is configured to adjust a transmission direction of the first reflected beam, so that the reflected beam is coupled to a corresponding port.

In an embodiment, deflection directions of the two reflective-surface micro-mirrors in the foregoing dual-reflective-surface MEMS micro-mirror are the same. In this case, the deflection directions of the two reflective-surface micro-mirrors may be controlled by using one MEMS driver.

In some embodiments, the second beam adjustment apparatus 640 may be implemented by a MEMS micro-mirror or an LCOS. This is not limited in an embodiment of the application.

In some embodiments, the first port 610 may be further connected to a fiber collimator, and is configured to collimate a beam emergent from the first port 610. However, this embodiment of this application is not limited thereto.

In some embodiments, the second port 650 is further configured to input an input beam of the first wavelength; and the input beam is transmitted through the first optical filter 630, and is output to the first port 610. In this case, the first port 610 is further configured to output the beam transmitted by the first optical filter 630.

In some embodiments, the third port 660 is further configured to input a beam output from another port; and the beam is reflected by the first optical filter 630 and output to the first port 610. In this case, the first port 610 is further configured to output the beam reflected by the first optical filter 630.

In an embodiment of the application, the first port 610 may be used as both an input port and an output port, and therefore may be referred to as an input/output port 610. The second port 650 may be used as both an input port and an output port, and therefore may also be referred to as a first transmission input/output port 650. The third port 660 may be used as both an input port and an output port, and therefore may also be referred to as a first reflection input/output port 660. This is not limited in this application. The following describes the T-OADM apparatus by using an example in which the first port 610 is the input/output port 610, the second port 650 is the first transmission input/output port 650, and the third port is the first reflection input/output port.

For example, when a signal of the first wavelength is added to the OADM apparatus 600, an input beam of the first wavelength may be input through the first transmission input/output port 650, and the input beam is incident onto the first optical filter 630 through the second beam adjustment apparatus 640, and is incident onto the first beam adjustment apparatus 620 by the first optical filter 630 through transparent transmission, and further reflected to the input/output port 610 by the first beam adjustment apparatus, so as to implement adding of the signal of the first wavelength.

The other port may be a reflection input/output port of another OADM apparatus, that is, another reflection input/output port. The beam output from the reflection input/output port should be transparently transmitted without being affected. In an embodiment, a beam output by the another reflection input/output port may be input to the first reflection input/output port 660. The beam input to the first reflection input/output port 660 is incident onto the first optical filter 630 through the first beam adjustment apparatus 620, then reflected to the first beam adjustment apparatus 620 by using the first optical filter 630, and then reflected to the input/output port by the first beam adjustment apparatus 620, so as to implement transparent transmission of the beam output from the another reflection input/output port.

Correspondingly, the beam output from the first reflection input/output port 660 may also be input to the another reflection input/output port, so as to implement transparent transmission of the beam output from the first reflection input/output port 660.

The following describes eight T-OADM apparatuses provided in embodiments of this application with reference to FIG. 7 to FIG. 14. Same reference numerals in FIG. 6 to FIG. 14 indicate same or similar meanings. For brevity, details are not described again. It should be noted that FIG. 7 in an embodiment of the application includes FIG. 7A, FIG. 7B, and FIG. 7C. FIG. 7A shows an example of a structure of the T-OADM apparatus, and FIG. 7B and FIG. 7C show examples of adjusting an incident angle of the T-OADM apparatus in FIG. 7A.

It should be noted that, in FIG. 7 to FIG. 14, an example in which an optical filter performs optical filtering on incident light in a polarization state is used for description. Correspondingly, the T-OADM apparatuses shown in FIG. 7 to FIG. 14 further include a polarization beam splitting device and a polarization beam combining device (which may also be referred to as a polarization multiplexing device). It may be understood that this is not limited in an embodiment of the application. For example, when the incident beam is incident onto the optical filter at a relatively small incident angle, the polarization beam splitting device and the polarization beam combining device may not be disposed. In this case, the optical filter may perform optical filtering on both beams in two different polarization states.

In the T-OADM apparatuses in FIG. 7 to FIG. 13, the first beam adjustment apparatus 620 includes an incident beam adjustment apparatus and a reflected beam adjustment apparatus. An example in which the incident beam adjustment apparatus is a first MEMS micro-mirror (denoted as a MEMS1 micro-mirror) 621, the second beam adjustment apparatus 640 is a second MEMS micro-mirror (denoted as a MEMS2 micro-mirror) 640, and the reflected beam adjustment apparatus is a third MEMS micro-mirror (denoted as an MEMS3 micro-mirror) 622 is used for description. However, this embodiment of this application is not limited thereto. For example, each beam adjustment apparatus may alternatively be implemented by another optical device such as an LCOS.

Figure 7A:
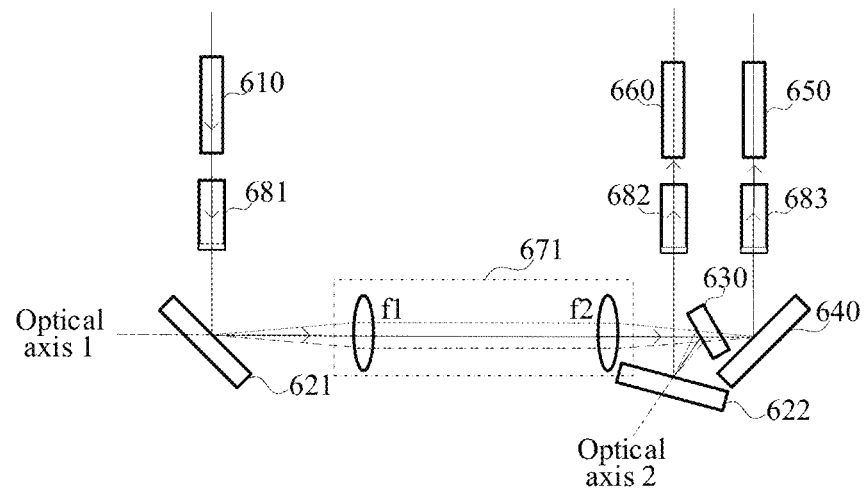
FIG. 7A shows an example of a T-OADM apparatus according to an embodiment of this application.
Figure 7B:
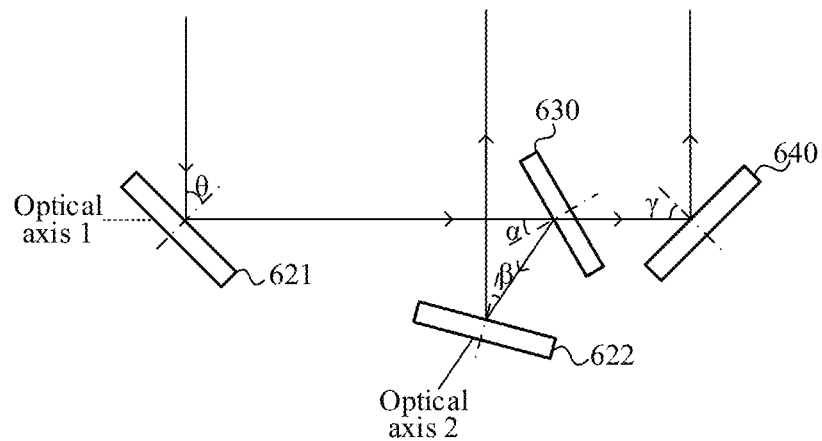
FIG. 7B is an example in which a beam is incident onto a first optical filter in a direction of an optical axis 1.
Figure 7C:
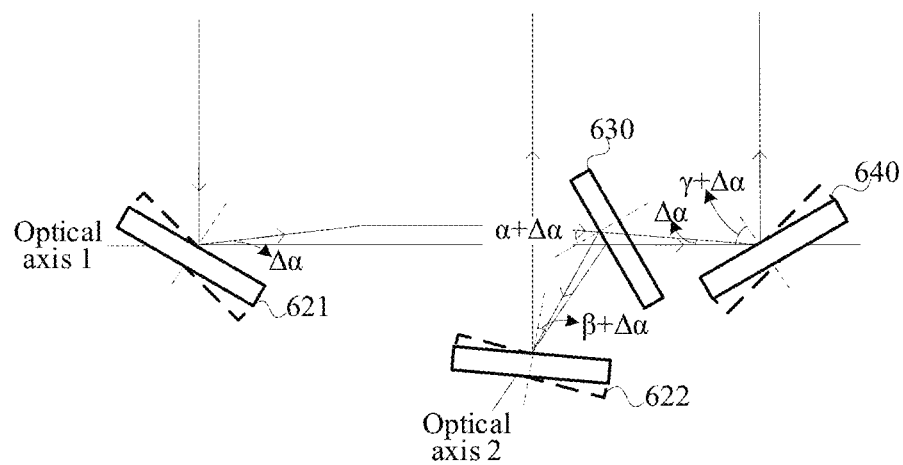
FIG. 7C is an example of adjusting an incident angle of a beam incident onto a first optical filter.
Figure 8:
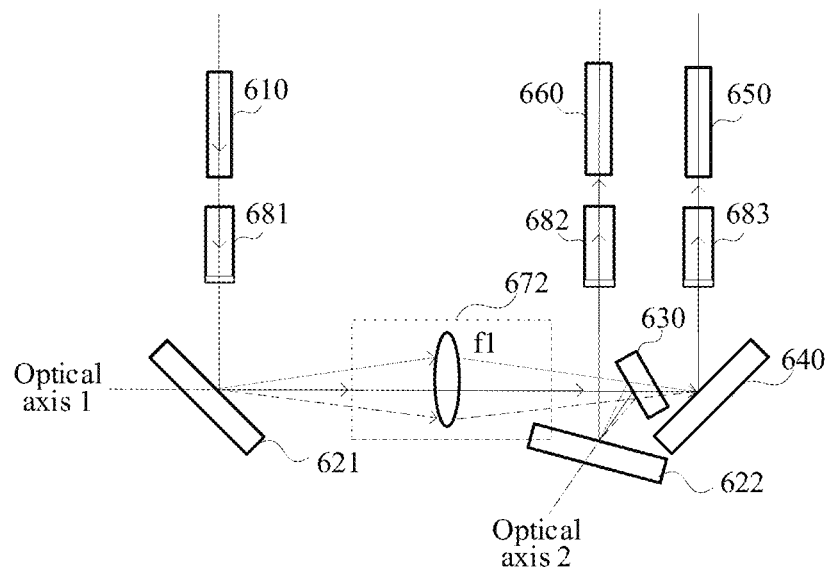
FIG. 8 shows an example of another T-OADM apparatus according to an embodiment of this application.

In FIG. 7 and FIG. 8, the T-OADM apparatus may further include a first optical apparatus. The MEMS1 micro-mirror 621, the first optical apparatus, the first optical filter 630, and the MEMS2 micro-mirror 640 are sequentially disposed on a first optical axis (for example, the optical axis 1). An included angle between a normal line of the first optical filter and the optical axis 1 is $\alpha$, and $\alpha \in [0, \pi/2]$. The first optical apparatus may be configured to guide a beam emergent from the incident beam adjustment apparatus to the first optical filter, for example, converge a beam emergent from the MEMS1 micro-mirror 621 (for example, having a different included angle with the optical axis 1) onto the MEMS2 micro-mirror 640 (for example, an intersection point between the optical axis 1 and the MEMS2 micro-mirror 640), where there is a correspondence between an included angle between the beam emergent from the MEMS1 micro-mirror 621 and the optical axis 1 and an included angle between the beam emergent from the first optical apparatus and the optical axis 1. When the beam emergent from the MEMS1 micro-mirror 621 is along a direction of an optical axis, the first optical apparatus may not adjust a direction of the beam.

It should be noted that, in an actual T-OADM apparatus, an intersection point between an optical axis and a device or an apparatus includes not only a position at which the optical axis accurately intersects the device or the apparatus, but also an area whose center is a position at which the optical axis accurately intersects the device or the apparatus, that is, a position slightly deviated from the intersection point by a distance. This is not limited in this application.

FIG. 7A shows an example of a T-OADM apparatus according to an embodiment of this application. As shown in FIG. 7A, the T-OADM apparatus includes an input/output port 610, a polarization beam splitting device 681, a MEMS1 micro-mirror 621, a first optical apparatus 671, a first filter 630, a MEMS2 micro-mirror 640, a MEMS3 micro-mirror 622, polarization beam combining devices 682 and 683, a first transmission input/output port 650, and a second transmission input/output port 660. In FIG. 7A, the first optical apparatus 671 is an optical 4f system, including a lens 1 (denoted as f1) and a lens 2 (denoted as f2). Herein, the lens 1 is an example of a front lens of the optical 4f system, and the lens 2 is an example of a rear lens of the optical 4f system.

In FIG. 7A, centers of the MEMS1 micro-mirror 621, the lens 1, the lens 2, and the MEMS2 micro-mirror 640 are all disposed on the optical axis 1. Further, the MEMS1 micro-mirror 621 may be disposed at a front focus of the lens 1, the MEMS2 micro-mirror 640 may be disposed at a rear focus that is of the lens 2 and that is on a transmission optical path of the first optical filter 630 (namely, a rear focus of the lens 2), and the MEMS3 micro-mirror 622 may be disposed at a rear focus that is of the lens 2 and that is on a reflection optical path of the first optical filter 630 (different from the rear focus of the lens 2).

It should be noted that, in an actual T-OADM apparatus, disposing a device or an apparatus at a focus of a lens includes not only accurately disposing the device or the apparatus at the focus of the lens, but also disposing the device or the apparatus near the focus of the lens, that is, a position slightly deviated from the focus by a distance. This is not limited in this application. In addition, disposing the center of the device or the apparatus on the optical axis includes not only accurately disposing the center of the device or the apparatus on the optical axis, but also disposing the center of the device or the apparatus near the optical axis, that is, a position slightly deviated from the optical axis by a distance. This is not limited in this application.

In some possible implementations, a focal length of the lens 1 in FIG. 7A may be the same as a focal length of the lens 2. In this case, an included angle between the beam emergent from the MEMS1 micro-mirror 621 and the optical axis 1 is the same as an included angle between the beam emergent from the lens 2 and the optical axis 1.

In some other possible implementations, the focal length of the lens 1 in FIG. 7A is different from the focal length of the lens 2. In this case, the included angle between the beam emergent from the MEMS1 micro-mirror 621 and the optical axis 1 is different from the included angle between the beam emergent from the lens 2 and the optical axis 1, and there is a mapping relationship between the two included angles. In an embodiment, the mapping relationship may be determined by focal lengths of the lens 1 and the lens 2.

Refer to FIG. 7A. An input beam input to a T-OADM apparatus includes channels of a plurality of wavelengths included in a WDM system. For example, one beam may include a plurality of channels, and each channel may include a beam of one wavelength. The input beam is emergent from the input/output port 610, passes through the polarization beam splitting device 681, and becomes two optical signals with the same polarization (for example, may be arranged perpendicular to a paper plane). The two optical signals (which are still referred to as the input beam in this case) with the same polarization are incident onto the MEMS1 micro-mirror 621, and the MEMS1 micro-mirror 621 may adjust the input beam (that is, the two optical signals with the same polarization) to be emergent at a required angle, so that the emergent beam (which are still referred to as the input beam in this case) is incident onto the first filter 630 through the optical 4f system consisting of the lens 1 and the lens 2. According to a relationship between a filtering center wavelength of the first optical filter 630 and an incident angle at which a beam is incident onto the first optical filter 630, a channel (beam) of a wavelength (for example, a first wavelength) in the input beams is transmitted by the first optical filter 630 to the MEMS2 micro-mirror 640, and channels (beams) other than the channel (beam) of the wavelength in the input beam are reflected by the first optical filter 630 to the MEMS3 micro-mirror 622. In this case, the channel of the first wavelength transmitted from the first optical filter 630 (that is, a beam incident onto the MEMS2 micro-mirror 640) may be referred to as a first transmitted beam, and a channel that is other than the channel of the signal of the first wavelength and that is reflected from the first optical filter 630 (that is, the beam incident onto the MEMS3 micro-mirror 622) may be referred to as a first reflected beam.

After the first transmitted light is incident onto the MEMS2 micro-mirror 640, the MEMS2 micro-mirror 640 adjusts an angle of the first transmitted light (that is, adjusts a transmission direction of the first transmitted light), so that the first transmitted light passes through the polarization beam combining device 683 for polarization recovery, and is coupled to the first transmission input/output port 650. The first transmission input/output port 650 outputs the first transmitted light, so as to implement dropping of a signal.

After the first reflected light is incident onto the MEMS3 micro-mirror 622, the MEMS3 micro-mirror 622 adjusts an angle of the first reflected light (that is, adjusts a transmission direction of the first transmitted light), so that the first reflected light passes through the polarization beam combining device 682 for polarization recovery, and then the first reflected light is coupled to the first reflection input/output port 660. The first reflection input/output port 660 outputs the first reflected light, to implement transparent transmission of a signal.

Correspondingly, so as to implement signal adding, a transparently transmitted signal emergent from the reflection input/output port may be input from the first reflection input/output port 660, and a signal that needs to be added is coupled to the first transmission input/output 650 for input. The transparently transmitted signal can be reflected to the first optical filter 630 by using the MEMS3 micro-mirror 622, then reflected to the first optical apparatus 671 by using the first optical filter 630, and then coupled to the input/output port 610 by using the MEMS1 micro-mirror 621, so that the signal is added to the WDM network. The added signal can be reflected to the first optical filter 630 through the MEMS2 micro-mirror 640, then transmitted to the first optical apparatus 671 through the first optical filter 630, and then coupled to the input/output port 610 through the MEMS2 micro-mirror 621, so that the signal is added to the WDM network.

In the T-OADM apparatus shown in FIG. 7A, when a filtering center wavelength of the first optical filter 630 (that is, a wavelength of the first transmitted beam) needs to be adjusted, the adjustment may be implemented by adjusting deflection of the MEMS1 micro-mirror 621. Correspondingly, to couple the transmitted beam and the reflected beam to corresponding ports, the MEMS2 micro-mirror 640 and the MEMS3 micro-mirror 622 also need to be correspondingly deflected.

In some embodiments, the T-OADM apparatus may further include a control unit, configured to control deflection directions and deflection angles of the MEMS1 micro-mirror 621, the MEMS2 micro-mirror 640, and the MEMS3 micro-mirror 622.

In an embodiment, the control unit may be preconfigured to store a plurality of wavelengths of signals that can be dropped or added by the T-OADM apparatus, and deflection angles of the MEMS1 micro-mirror 621, the MEMS2 micro-mirror 640, and the MEMS3 micro-mirror 622 that correspond to each wavelength. For example, a wavelength and a deflection angle of each MEMS micro-mirror corresponding to each wavelength may be stored in a table form. When receiving an instruction for adjusting a wavelength of a signal dropped or added by the T-OADM apparatus, the control unit may look up a table to obtain a deflection angle required by each MEMS micro-mirror.

In an embodiment, the control unit may prestore a mapping relationship between a wavelength and an adjustment angle of each MEMS micro-mirror. When receiving an instruction for adjusting a wavelength of a signal dropped or added by the T-OADM apparatus, the control unit may determine, based on the wavelength of the signal that needs to be dropped or added and the stored mapping relationship, a deflection angle required by each MEMS micro-mirror.

After obtaining the deflection angle of each MEMS micro-mirror, the control unit may set the reflector of each of the three MEMS micro-mirrors to an angle, to control the T-OADM apparatus to drop or add a signal of a wavelength.

For example, after determining an adjustment manner (for example, a deflection angle) of each MEMS micro-mirror, the control unit may send a control signal to a driver of each MEMS micro-mirror. The driver of the MEMS micro-mirror may adjust the MEMS micro-mirror to a corresponding angle based on the control information. The following describes an example of an adjustment manner of each MEMS micro-mirror.

Still refer to FIG. 7A. An included angle between the optical axis 1 and a normal line of the first optical filter 630 is $\alpha$. The optical axis 2 is a direction of a reflected beam of the beam emergent from the first optical filter 630 when the beam along the direction of the optical axis 1 is incident onto the first optical filter 630. It can be learned that the included angle between the optical axis 2 and the optical axis 1 is $2\alpha$.

FIG. 7B shows an example in which a beam is incident onto the first optical filter 630 in the direction of the optical axis 1. As shown in FIG. 7B, when a beam along the direction of the optical axis 1 is incident onto the first optical filter 630, an included angle between the incident beam and a normal line of the first optical filter 630 is $\alpha$. Correspondingly, an included angle between the beam and a normal line is $\theta$ when the beam is incident onto the MEMS1 micro-mirror 621. Correspondingly, a wavelength of a transmitted beam of the beam emergent from the first optical filter 630 is $\lambda 1$, and an included angle between the transmitted beam and the optical axis 1 is $0°$. In this case, the deflection angle of the MEMS2 micro-mirror 640 is adjusted, so that an included angle between the transmitted beam and the normal line of the MEMS2 micro-mirror 640 is $\gamma$, so as to couple the transmitted beam to the first transmission input/output port 650. The reflected beam of the beam emergent from the first optical filter 630 is incident onto the MEMS3 micro-mirror 622 along the optical axis 2, and an included angle between the reflected beam and the optical axis 2 is $0°$. In this case, the deflection angle of the MEMS3 micro-mirror 622 is adjusted, so that the included angle between the reflected beam and the normal line of the MEMS3 micro-mirror 622 is $\beta$, so as to couple the reflected beam to the first reflection input/output port 660.

When a wavelength of a signal that needs to be dropped or added by the T-OADM apparatus is adjusted from the wavelength $\lambda 1$ to the wavelength $\lambda 2$, that is, the filtering center wavelength of the first optical filter 630 needs to be adjusted from the wavelength $\lambda 1$ to the wavelength $\lambda 2$, it may be deduced (for example, deduced according to the foregoing formula (1) or FIG. 4) that an incident angle at which the input beam is incident onto the first optical filter 630 needs to be adjusted from $\alpha$ to $(\alpha+\Delta\alpha)$, where $\Delta\alpha>0$.

FIG. 7C shows an example of adjusting an incident angle of a beam incident onto the first optical filter 630. In FIG. 7C, an example in which a focal length of the lens 1 and a focal length of the lens 2 in the optical 4f system are the same is used to describe a deflection manner of the MEMS1 micro-mirror 621 when a filtering center wavelength of the first optical filter 630 needs to be adjusted from the wavelength $\lambda 1$ to the wavelength $\lambda 2$. In this case, an included angle between the beam emergent from the MEME1 micromirror 621 and the optical axis 1 is the same as an included angle between the beam emergent from the lens 2 and the optical axis 1. To adjust the incident angle at which the input beam is incident onto the first optical filter 630 from a to ($\alpha+\Delta\alpha$), a transmission direction of the beam emergent from the MEMS1 micro-mirror 621 needs to be rotated counterclockwise by an angle $\Delta\alpha$ (the dashed line of the MEMS1 micro-mirror 621 in the figure is a schematic diagram before rotation, and the solid line is a schematic diagram after rotation). In this case, the MEMS1 micro-mirror 621 may be rotated counterclockwise by $\lambda\alpha/2$, that is, when the filtering center wavelength of the first optical filter 630 needs to be the wavelength $\lambda 1$, on the basis that the included angle between the input beam and the normal line of the MEMS1 micro-mirror 621 is $\theta$, the MEMS1 micro-mirror 621 rotates $\lambda\alpha/2$ in the counterclockwise direction, so that an included angle between the input beam and the normal line of the MEMS1 micro-mirror 621 is ($0+\lambda\alpha/2$).

That is, after the MEMS1 micro-mirror 621 is further rotated counterclockwise by $\lambda\alpha/2$, the included angle between the beam emergent from the MEMS1 micro-mirror 621 and the optical axis 1 is $\lambda\alpha$. The input beam passes through the lens 1 and the lens 2, and the incident angle at which the input beam is incident onto the first optical filter 630 is ($\alpha+\Delta\alpha$). In this case, the wavelength of the beam transmitted from the first optical filter 630 is $\lambda 2$, so that the filtering center wavelength of the first optical filter 630 can be adjusted.

Still refer to FIG. 7C. An included angle between the transmitted beam emergent from the first optical filter 630 and the optical axis 1 is $\Delta\alpha$. In this case, a deflection angle of the MEMS2 micro-mirror 640 may be further adjusted. That is, on the basis that the included angle between the original input beam and the normal line of the MEMS2 micro-mirror 640 is $\gamma$, the MEMS2 micro-mirror 640 rotates by $\Delta\alpha/2$ in the clockwise direction (the dashed line of the MEMS2 micro-mirror 640 in the figure is a schematic diagram before rotation, and the solid line is a schematic diagram after rotation.), so that an included angle between the normal line of the MEMS2 micro-mirror 640 and the optical axis 1 is ($\gamma+\lambda\alpha/2$), so as to couple the transmitted beam to the first transmission input/output port 650.

An included angle between the reflected beam emergent from the first optical filter 630 and the optical axis 2 is $\Delta\alpha$. In this case, a deflection angle of the MEMS3 micro-mirror 622 may be further adjusted. That is, on the basis that the included angle between the original input beam and the normal line of the MEMS3 micro-mirror 622 is $\beta$, the MEMS2 micro-mirror 622 rotates by $\lambda\alpha/2$ in the counterclockwise direction (the dashed line of the MEMS3 micro-mirror 622 in the figure is a schematic diagram before rotation, and the solid line is a schematic diagram after rotation), so that an included angle between the normal line of the MEMS3 micro-mirror 622 and the optical axis 2 is ($\beta+\Delta\alpha/2$), so as to couple the reflected beam to the first reflection input/output port 660.

It should be noted that, in a case in which focal lengths of the lens 1 and the lens 2 in the optical 4f system in FIG. 7A are different, when the incident angle at which the input beam is incident onto the first optical filter 630 is adjusted from a to ($\alpha+\Delta\alpha$), a value of an angle $\Delta\alpha'$ by which a transmission direction of the beam emergent from the MEMS1 micro-mirror 621 needs to be rotated counterclockwise needs to be determined based on values of the focal lengths of the lens 1 and the lens 2. For details, refer to the conventional technology. Details are not described herein again. In this case, by rotating the MEMS1 micro-mirror 621 counterclockwise by $\Delta\alpha'/2$, the incident angle at which the input beam is incident onto the first optical filter 630 may be adjusted from a to ($\alpha+\Delta\alpha$).

It should be further noted that the foregoing adjustment manner of the MEMS micro-mirror is described based on the optical structure in FIG. 7A. When the optical structure in FIG. 7A is properly changed, an adjustment manner of the MEMS micro-mirror may be further properly adjusted based on an optical path. This falls within the protection scope of embodiments of this application.

It may be understood that, when the beam adjustment apparatus in the T-OADM apparatus is an LCOS, for example, when an LCOS1 adjusts the transmission direction of the incident beam, an LCOS2 adjusts the transmission direction of the transmitted beam, and an LCOS3 adjusts the transmission direction of the reflected beam, the control unit may be preconfigured to store a plurality of wavelengths of signals that can be dropped or added by the T-OADM apparatus, and values of voltages that are applied to the LCOS1, the LCOS2, and the LCOS3 and that correspond to each wavelength (for example, stored in a table form), or to store a mapping relationship between a signal wavelength that can be dropped or added by the T-OADM apparatus and values of voltages applied to the LCOS1, the LCOS2, and the LCOS3. In this way, after obtaining the voltage value applied to each LCOS, the control unit may apply voltages of values to the three LCOSs, so as to control the T-OADM apparatus to drop or add a signal of a wavelength.

FIG. 8 shows an example of another T-OADM apparatus according to an embodiment of this application. As shown in FIG. 8, the T-OADM apparatus includes an input/output port 610, a polarization beam splitting device 681, a MEMS1 micro-mirror 621, a first optical apparatus 672, a first filter 630, a MEMS2 micro-mirror 640, a MEMS3 micro-mirror 622, polarization beam combining devices 682 and 683, a first transmission input/output port 650, and a second transmission input/output port 660. In FIG. 8, the first optical apparatus 672 includes a lens 1 (denoted as f1). In this case, an included angle between the beam emergent from the MEMS1 micro-mirror 621 and the optical axis 1 is the same as an included angle between the beam emergent from the lens 1 and the optical axis 1.

Centers of the MEMS1 micro-mirror 621, the lens 1, and the MEMS2 micro-mirror 640 are all disposed on the optical axis 1. Further, the MEMS1 micro-mirror 621 is located at a 2× focal length on a first side (a front side) of the lens 1, the MEMS2 micro-mirror 640 is located at a 2× focal length that is on a second side (a rear side) of the lens 1 and that is on a transmission optical path of the first optical filter 630 (that is, the 2× focal length on the rear side of the lens 1), and the MEMS3 micro-mirror 622 is located at a 2× focal length that is of the lens 1 and that is on a reflection optical path (the optical path is a folded optical path) of the first optical filter 630.

It should be noted that, in an actual T-OADM apparatus, disposing a device or an apparatus at a 2× focal length of a lens includes not only accurately disposing the device or the apparatus at the 2× focal length of the lens, but also disposing the device or the apparatus near the 2× focal length of the lens, that is, a position slightly deviated from the 2× focal length by a distance. This is not limited in this application.

Refer to FIG. 8. For a process from emergence of the input beam from the input/output port 610 to emergence of the input beam from the MEMS1 micro-mirror 621, refer to the description in FIG. 7A. Details are not described herein again. The beam (which is still referred to as an input beam in this case) emergent from the MEMS1 micro-mirror 621 is incident onto the first optical filter 630 through the lens 1 in FIG. 8. In FIG. 8, because the MEMS1 micro-mirror 621 and the MEMS micro-mirror 2 are respectively disposed at the 2× focal length on both sides of the lens 1, an included angle between the beam emergent from the MEMS1 micromirror 621 and the optical axis 1 is the same as an included angle between the beam emergent from the lens 1 and the optical axis 1. The first optical filter 630 may split the incident beam into a first transmitted beam and a first reflected beam. The first transmitted beam is adjusted by using the MEMS2 micro-mirror 640, and is coupled to the first transmission input/output port 650, so as to implement signal dropping. The first reflected beam is adjusted by using the MEMS3 micro-mirror 622, and is coupled to the first reflection input/output port 660, so as to implement transparent transmission of a signal.

In an embodiment, for a process of filtering the input beam by using the first optical filter, coupling the first transmitted beam to the first transmission input/output port, and coupling the first reflected beam to the first reflection input/output port, refer to the description in FIG. 7A. Details are not described herein again.

In the T-OADM apparatus shown in FIG. 7 or FIG. 8, the first optical apparatus (671 or 672) may converge a beam emergent from the MEMS1 micro-mirror 621 at a different included angle with the optical axis 1 onto a point on the optical axis 1 (for example, the intersection point between the optical axis 1 and the MEMS2 micro-mirror 640). In addition, there is a mapping relationship between an included angle between the beam emergent from the MEMS1 micro-mirror 621 and the optical axis 1 and an included angle between the beam emergent from the first optical apparatus and the optical axis 1. In this way, deflection of the MEMS1 micro-mirror 621 can be adjusted to control a magnitude of the first incident angle at which the input beam is incident onto the first optical filter, so that a wavelength of a signal dropped or added by the T-OADM apparatus can be controlled. In addition, beams that are emergent from the MEMS1 micro-mirror 621 in different directions are converged by using the first optical apparatus 671, so that a structure of the T-OADM apparatus can be more compact, and a volume of the T-OADM apparatus can be reduced.

Figure 9:
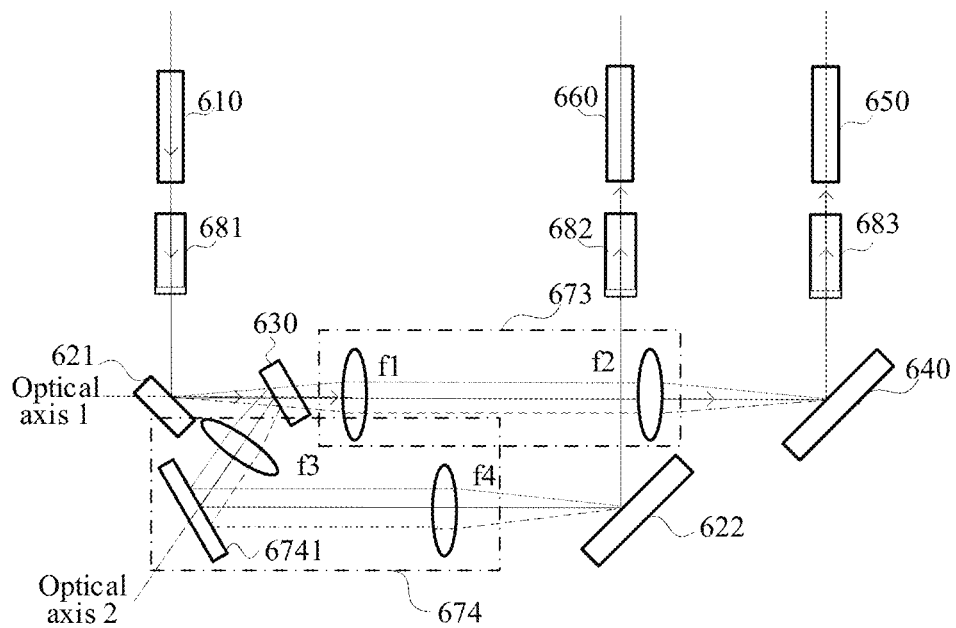
FIG. 9 shows an example of another T-OADM apparatus according to an embodiment of this application.
Figure 10:
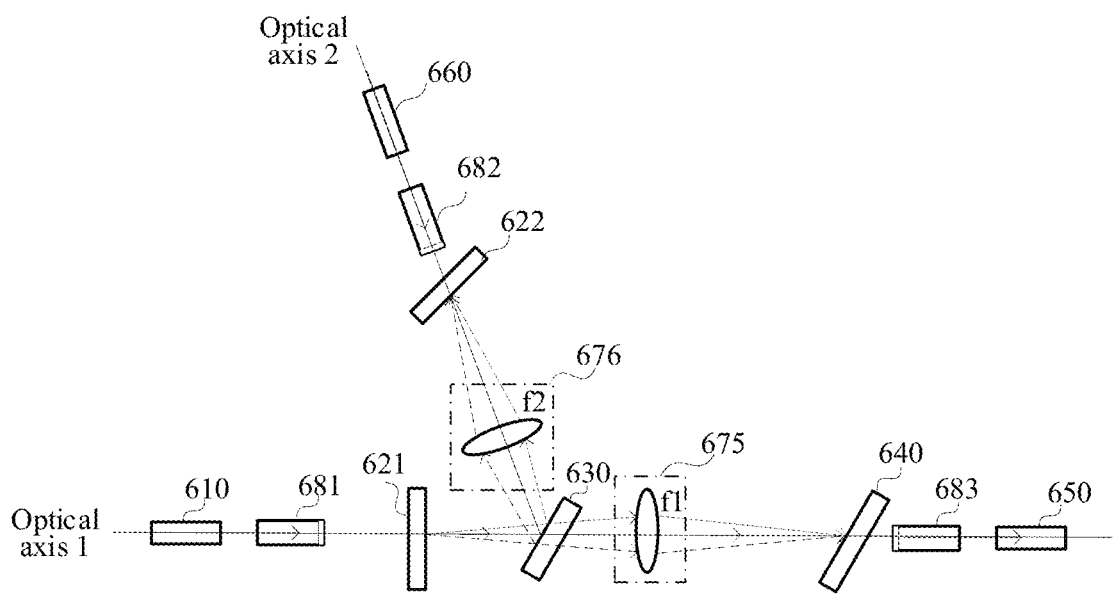
FIG. 10 shows an example of another T-OADM apparatus according to an embodiment of this application.

In FIG. 9 and FIG. 10, the T-OADM apparatus may further include a second optical apparatus and a third optical apparatus. The MEMS1 micro-mirror 621, the first optical filter 630, the second optical apparatus, and the MEMS2 micro-mirror 640 are sequentially disposed on a second optical axis (for example, the optical axis 1). The first optical filter 630, the third optical apparatus, and the MEMS2 micro-mirror 622 are sequentially disposed on a third optical axis (for example, an optical axis 2). An included angle between a normal line of the first optical filter 630 and the optical axis 1 is α, and an included angle between the optical axis 1 and the optical axis 2 is 2α.

In FIG. 9 and FIG. 10, the second optical apparatus is configured to guide a first transmitted beam emergent from the first optical filter 630 to the MEMS2 micro-mirror 640, and the third optical apparatus is configured to guide a first reflected beam emergent from the first optical filter 630 to the MEMS3 micro-mirror 622. For example, the second optical apparatus converges the first transmitted beam emergent from the first optical filter 630 (for example, having a different included angle with the optical axis 1) onto the optical axis 1 and the MEMS2 micro-mirror 640 (for example, an intersection point between the optical axis 1 and the MEMS2 micro-mirror 640), where an included angle between the beam emergent from the first optical filter 630 and the optical axis 1 one-to-one corresponds to an included angle between the beam emergent from the second optical apparatus and the optical axis 1; and the third optical apparatus converges the first reflected beam emergent from the first optical filter 630 (for example, having a different included angle with the optical axis 2) onto the MEMS3 micro-mirror 622 (for example, an intersection point between the MEMS3 micro-mirror 622 and the optical axis 2), where an included angle between the beam emergent from the first optical filter 630 and the optical axis 2 one-to-one corresponds to an included angle between the beam emergent from the third optical apparatus and the optical axis 2. When the beam is incident onto the second optical apparatus or the third optical apparatus along the direction of an optical axis, the second optical apparatus or the third optical apparatus may not adjust the beam.

FIG. 9 shows an example of another T-OADM apparatus according to an embodiment of this application. As shown in FIG. 9, the T-OADM apparatus includes an input/output port 610, a polarization beam splitting device 681, a MEMS1 micro-mirror 621, a first optical filter 630, a second optical apparatus 673, a MEMS2 micro-mirror 640, a second optical apparatus 674, a MEMS3 micro-mirror 622, polarization beam combining devices 682 and 683, a first transmission input/output port 650, and a second transmission input/output port 660. In FIG. 9, the second optical apparatus 673 is an optical 4f system, including a lens 1 (denoted as f1) and a lens 2 (denoted as f2); and the third optical apparatus 674 is also an optical 4f system, including a lens 3 (denoted as f3) and a lens 4 (denoted as f4). Herein, the lens 1 is an example of the front lens of the optical 4f system, the lens 2 is an example of the rear lens of the optical 4f system, the lens 3 is an example of the front lens of the optical 4f system, and the lens 4 is an example of the rear lens of the optical 4f system.

In an embodiment, as shown in FIG. 9, the third optical apparatus 674 may further include a reflector 6741, configured to fold an optical path, so as to reduce a device size.

In FIG. 9, centers of the MEMS1 micro-mirror 621, the first optical filter 630, the lens 1, the lens 2, and the MEMS2 micro-mirror 640 are all disposed on the optical axis 1; and centers of the MEMS1 micro-mirror 621, the first optical filter 630, the lens 3, the lens 4, and the MEMS3 micromirror 622 are all disposed on the optical axis 2 (including a folded optical axis obtained after the optical axis 2 is reflected by the first optical filter 630, and a folded optical axis that is obtained after the optical axis 2 is reflected by the reflector 6741).

Further, the MEMS1 micro-mirror 621 is disposed at a front focus of the lens 1, and the MEMS2 micro-mirror 640 may be located at a rear focus of the lens 2. In addition, the MEMS1 micro-mirror 621 is located at a front focus of an optical path (that is, a folded optical path) reflected by the first optical filter 630 of the lens 3, and the MEMS3 micro-mirror 622 is located at a rear focus of the lens 4.

In some possible implementations, a focal length of the lens 1 in FIG. 9 may be the same as a focal length of the lens 2. In this case, an included angle between the beam emergent from the MEMS1 micro-mirror 621 and the optical axis 1 is the same as an included angle between the beam emergent from the lens 2 and the optical axis 1.

In some other possible implementations, the focal length of the lens 1 in FIG. 9 is different from the focal length of the lens 2. In this case, the included angle between the beam emergent from the MEMS1 micro-mirror 621 and the optical axis 1 is different from the included angle between the beam emergent from the lens 2 and the optical axis 1, and there is a mapping relationship between the two. Specifically, the mapping relationship may be determined by focal lengths of the lens 1 and the lens 2.

In some possible implementations, a focal length of the lens 3 in FIG. 9 may be the same as a focal length of the lens 4. In this case, an included angle between the beam emergent from the MEMS1 micro-mirror 621 and the optical axis 1 is the same as an included angle between the beam emergent from the lens 4 and the optical axis 1.

In some other possible implementations, the focal length of the lens 3 in FIG. 9 is different from the focal length of the lens 4. In this case, the included angle between the beam emergent from the MEMS1 micro-mirror 621 and the optical axis 1 is different from the included angle between the beam emergent from the lens 4 and the optical axis 1, and there is a mapping relationship between the two. In an embodiment, the mapping relationship may be determined by focal lengths of the lens 3 and the lens 4.

Refer to FIG. 9. For a process from emergence of the input beam from the input/output port 610 to emergence of the input beam from the MEMS1 micro-mirror 621, refer to the description in FIG. 7A. Details are not described herein again. A beam (which is still referred to as an input beam in this case) emergent from the MEMS1 micro-mirror 621 is incident onto the first optical filter 630, and the first optical filter 630 may split the incident beam into a first transmitted beam and a first reflected beam. The first transmitted beam is incident onto the MEMS2 micro-mirror 640 through the lens 1 and the lens 2; and the MEMS2 micro-mirror 640 performs beam adjustment on the first transmitted beam, and the first transmitted beam is coupled to the first transmission input/output port 650, so as to implement signal dropping. The first reflected beam is incident onto the MEMS3 micro-mirror 622 through the lens 3, the reflector 6741 (optional), and the lens 4; and the MEMS3 micro-mirror 622 performs beam adjustment on the first reflected beam, and the first reflected beam is coupled to the first reflection input/output port 660, so as to implement transparent transmission of a signal.

FIG. 10 shows an example of another T-OADM apparatus according to an embodiment of this application. As shown in FIG. 10, the T-OADM apparatus includes an input/output port 610, a polarization beam splitting device 681, a MEMS1 micro-mirror 621, a first optical filter 630, a second optical apparatus 675, a MEMS2 micro-mirror 640, a third optical apparatus 676, a MEMS3 micro-mirror 622, polarization beam combining devices 682 and 683, a first transmission input/output port 650, and a second transmission input/output port 660. In FIG. 10, the second optical apparatus 675 includes a lens 1 (denoted as f1), and the third optical apparatus 676 includes a lens 2 (denoted as f2).

In FIG. 10, centers of the MEMS1 micro-mirror 621, the first optical filter 630, the lens 1, and the MEMS2 micro-mirror 640 are all disposed on the optical axis 1; and centers of the MEMS1 micro-mirror 621, the first optical filter 630, the lens 2, and the MEMS3 micro-mirror 622 are all disposed on the optical axis 2 (including a folded optical axis that is obtained after the optical axis 2 is reflected by the first optical filter 630).

Further, the MEMS1 micro-mirror 621 is disposed at a 2× focal length on a first side (a front side) of the lens 1, and the MEMS2 micro-mirror 640 may be located at a 2× focal length on a second side (a rear side) of the lens 1, the MEMS1 micro-mirror 621 is located a 2× focal length of the folded optical path reflected by the first optical filter 630 of the lens 2, and the MEMS3 micro-mirror 622 is located a 2× focal length on the rear side of the lens 2. In this way, an included angle between the beam emergent from the MEMS1 micro-mirror 621 and the optical axis 1 is the same as an included angle between the beam emergent from the lens 1 and the optical axis 1, and an included angle between the beam emergent from the MEMS1 micro-mirror 621 and the optical axis 1 is the same as an included angle between the beam emergent from the lens 2 and the optical axis 2.

Refer to FIG. 10. For a process in which the input beam is emergent from the input/output port 610 to the first optical filter 630, refer to the description in FIG. 9. Details are not described herein again. The first optical filter 630 may split the incident beam into a first transmitted beam and a first reflected beam. The first transmitted beam is incident onto the MEMS2 micro-mirror 640 through the lens 1; and the MEMS2 micro-mirror 640 performs beam adjustment on the first transmitted beam, and the first transmitted beam is coupled to the first transmission input/output port 650, so as to implement signal dropping. The first reflected beam is incident onto the MEMS3 micro-mirror 622 through the lens 2; and the MEMS3 micro-mirror 622 performs beam adjustment on the first reflected beam, and the first reflected beam is coupled to the first reflection input/output port 660, so as to implement transparent transmission of a signal.

It should be noted that, in FIG. 9, an example in which both the second optical apparatus 673 and the third optical apparatus 674 include an optical 4f system is used for description; and in FIG. 10, an example in which both the second optical apparatus 675 and the third optical apparatus 676 include a lens is used for description. However, an embodiment of the application is not limited thereto. For example, in FIG. 9, the second optical apparatus 673 may include a lens (in this case, the MEMS1 micro-mirror 621 may be disposed at a 2× focal length on a front side of the lens, and the MEMS2 micro-mirror 640 may be disposed at a 2× focal length on a rear side of the lens), and the third optical apparatus 674 includes an optical 4f system. For another example, in FIG. 9, the second optical apparatus 673 may include an optical 4f system, and the fourth optical apparatus 674 includes one lens (in this case, the MEMS1 micro-mirror 621 may be disposed at a 2× focal length on a refracted optical path reflected by the first optical filter 630 of the lens, and the MEMS3 micro-mirror 622 may be disposed at a 2× focal length on the refracted optical path reflected by the reflector 622). The T-OADM apparatus in FIG. 10 may be transformed in a manner similar to that of the T-OADM apparatus in FIG. 9, and details are not described again.

In the T-OADM apparatus shown in FIG. 9 or FIG. 10, the second optical apparatus (673 or 675) may converge the first transmitted beam emergent from the first optical filter 630 (for example, emergent at a different included angle with the optical axis 1) onto the MEMS2 micro-mirror 640 (for example, an intersection point between the MEMS2 micro-mirror 640 and the optical axis 1). In addition, there is a mapping relationship between an included angle between the transmitted beam emergent from the first optical filter 630 and the optical axis 1 and an included angle between the beam emergent from the second optical apparatus and the optical axis 1. The third optical apparatus (674 or 676) may converge the first reflected beam that is emergent from the first optical filter 630 and that has a different included angle with the optical axis 2 onto the MEMS3 micro-mirror 622 (for example, an intersection point between the MEMS3 micro-mirror 622 and the optical axis 2). In addition, there is a mapping relationship between an included angle between the reflected beam emergent from the first optical filter 630 and the optical axis 2 and an included angle between the beam emergent from the third optical apparatus and the optical axis 2.

In this way, deflection of the MEMS1 micro-mirror 621 can be adjusted to control a magnitude of the first incident angle at which the input beam is incident onto the first optical filter, so that a wavelength of a signal dropped or added by the T-OADM apparatus can be controlled. In addition, beams that are emergent from the MEMS1 micro-mirror 621 in different directions are converged by using the second optical apparatus and the third optical apparatus, so that a structure of the T-OADM apparatus can be more compact, and a volume of the T-OADM apparatus can be reduced.

Figure 11:
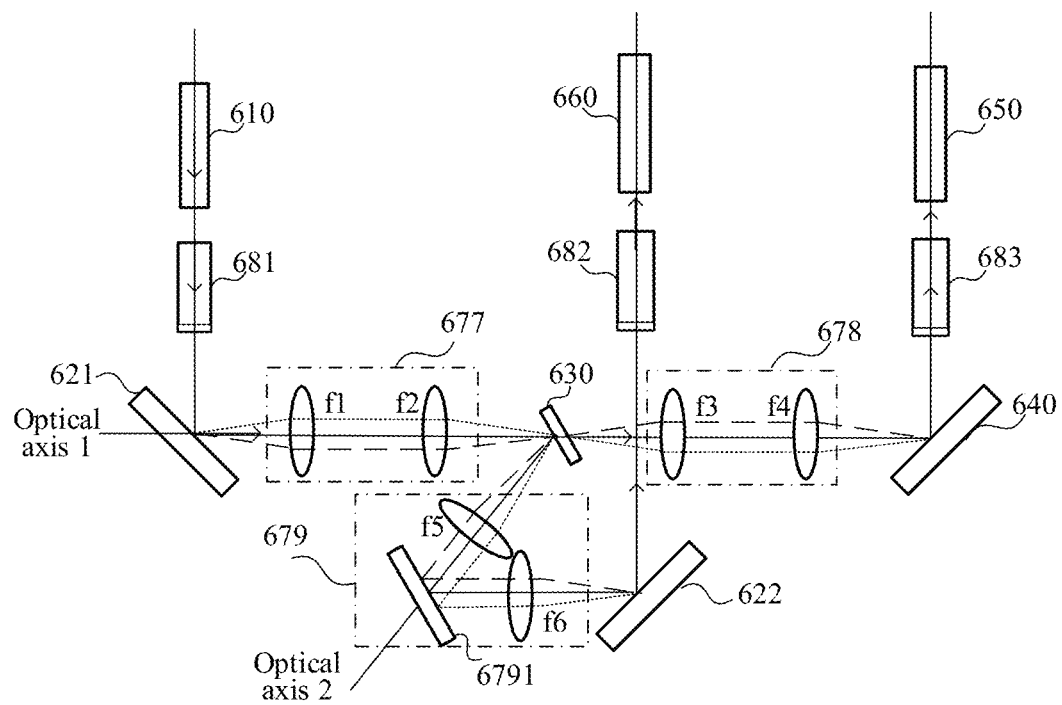
FIG. 11 shows an example of another T-OADM apparatus according to an embodiment of this application.
Figure 12:
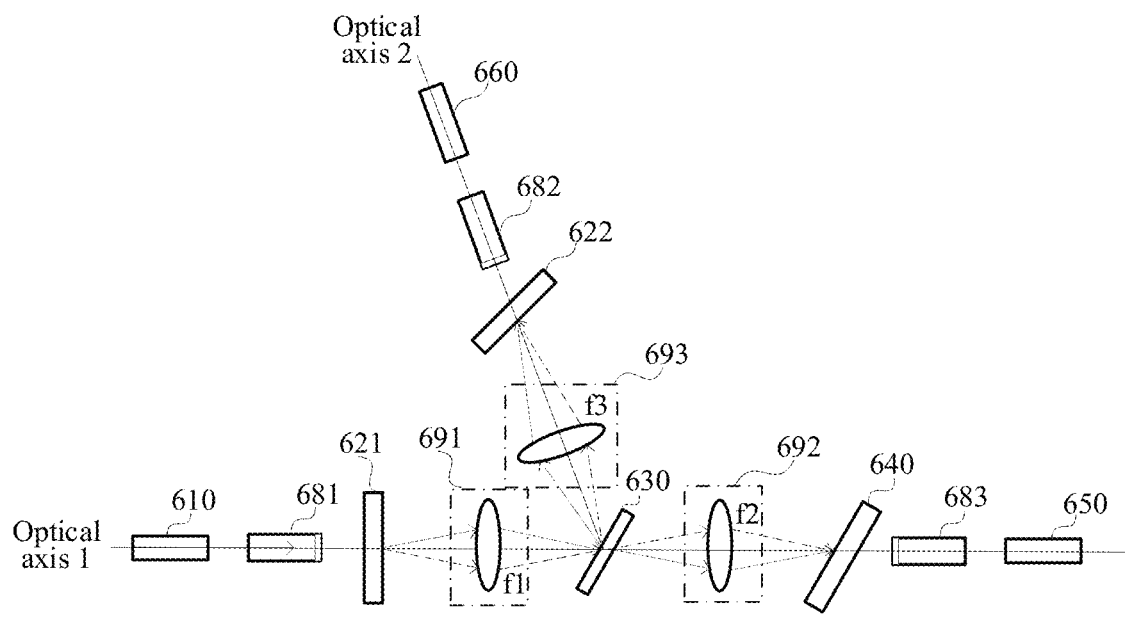
FIG. 12 shows an example of another T-OADM apparatus according to an embodiment of this application.

In FIG. 11 and FIG. 12, the T-OADM apparatus may further include a fourth optical apparatus, a fifth optical apparatus, and a sixth optical apparatus. The MEMS1 micro-mirror 621, the fourth optical apparatus, the first optical filter 630, the fifth optical apparatus, and the MEMS2 micro-mirror 622 are sequentially disposed on a fourth optical axis (for example, the optical axis 1). The first optical filter 630, the sixth optical apparatus, and the MEMS3 micro-mirror 622 are sequentially disposed on a fifth optical axis (for example, the optical axis 2). An included angle between a normal line of the first optical filter 630 and the optical axis 1 is α, and an included angle between the optical axis 1 and the optical axis 2 is 2α.

In FIG. 11 and FIG. 12, the fourth optical apparatus is configured to guide a beam emergent from the MEMS1 micro-mirror 621 to the first optical filter 630, the fifth optical apparatus is configured to guide a first transmitted beam emergent from the first optical filter 630 to the MEMS2 micro-mirror 640, and the sixth optical apparatus is configured to guide a first reflected beam emergent from the first optical filter 630 to the MEMS3 micro-mirror 622. For example, the fourth optical apparatus converges the beam emergent from the MEMS1 micro-mirror 621 (for example, having a different included angle with the optical axis 1) onto the first optical filter 630 (for example, an intersection point between the first optical filter 630 and the optical axis 1), where an included angle between the beam emergent from the MEMS1 micro-mirror 621 and the optical axis 1 one-to-one corresponds to an included angle between the beam emergent from the fourth optical apparatus and the optical axis 1; the fifth optical apparatus converges the first transmitted beam emergent from the first optical filter 630 (for example, having a different included angle with the optical axis 1) onto the MEMS2 micro-mirror 640 (for example, an intersection point between the MEMS2 micro-mirror 640 and the optical axis 1), where an included angle between the beam emergent from the first optical filter 630 and the optical axis 1 one-to-one corresponds to an included angle between the beam emergent from the fifth optical apparatus and the optical axis 1; and the sixth optical apparatus converges the first reflected beam emergent from the first optical filter 630 (for example, having a different included angle with the optical axis 1) onto the MEMS3 micro-mirror 622 (for example, an intersection point between the MEMS3 micro-mirror 622 and the optical axis 2), where an included angle between the beam emergent from the first optical filter 630 and the optical axis 2 one-to-one corresponds to an included angle between the beam emergent from the sixth optical apparatus and the optical axis 2. When the beam is incident onto the fourth optical apparatus, the fifth optical apparatus, or the sixth optical apparatus along the direction of an optical axis, the fourth optical apparatus, the fifth optical apparatus, or the sixth optical apparatus may not adjust the beam.

FIG. 11 shows an example of another T-OADM apparatus according to an embodiment of this application. As shown in FIG. 11, the T-OADM apparatus includes an input/output port 610, a polarization beam splitting device 681, a MEMS1 micro-mirror 621, a fourth optical apparatus 677, a first optical filter 630, a fifth optical apparatus 678, a MEMS2 micro-mirror 640, a sixth optical apparatus 679, a MEMS3 micro-mirror 622, polarization beam combining devices 682 and 683, a first transmission input/output port 650, and a second transmission input/output port 660. In FIG. 11, the fourth optical apparatus 677 is an optical 4f system, including a lens 1 (denoted as f1) and a lens 2 (denoted as f2); the fifth optical apparatus 678 is also an optical 4f system, including a lens 3 (denoted as f3) and a lens 4 (denoted as f4); and the sixth optical apparatus 679 is also an optical 4f system, including a lens 5 (denoted as f5) and a lens 6 (denoted as f6). Herein, the lens 1 is an example of the front lens of the optical 4f system, the lens 2 is an example of the rear lens of the optical 4f system, the lens 3 is an example of the front lens of the optical 4f system, the lens 4 is an example of the rear lens of the optical 4f system, the lens 5 is an example of the front lens of the optical 4f system, and the lens 6 is an example of the rear lens of the optical 4f system.

In an embodiment, as shown in FIG. 11, the sixth optical apparatus 679 may further include a reflector 6791, configured to fold an optical path, so as to reduce a device size.

In FIG. 11, centers of the MEMS1 micro-mirror 621, the lens 1, the lens 2, the first optical filter 630, the lens 3, the lens 4, and the MEMS2 micro-mirror 640 are all disposed on the optical axis 1; and centers of the MEMS1 micro-mirror 621, the lens 1, the lens 2, the first optical filter 630, the lens 3, the lens 4, and the MEMS3 micro-mirror 622 are all disposed on the optical axis 2 (including a folded optical axis obtained after the optical axis 2 is reflected by the first optical filter 630, and a folded optical axis that is obtained after the optical axis 2 is reflected by the reflector 6791).

Further, the MEMS1 micro-mirror 621 is disposed at a front focus of the lens 1, the first optical filter 630 is located at a rear focus of the lens 2 and at a front focus of the lens 3, the MEMS2 micro-mirror 640 may be located at a rear focus of the lens 4, the first optical filter 630 is located at a front focus of the lens 5, and the MEMS3 micro-mirror 622 is located at a rear focus of the lens 6.

In some possible implementations, in FIG. 11, a focal length of the lens 1 may be the same as or different from a focal length of the lens 2, a focal length of the lens 3 may be the same as or different from a focal length of the lens 4, and a focal length of the lens 5 may be the same as or different from a focal length of the lens 6. This is not limited in this application.

Refer to FIG. 11. The input beam is emergent from the input/output port 610 to the MEMS1 micro-mirror 621, and is adjusted and incident onto the fourth optical apparatus 677 by the MEMS1 micro-mirror 621. A beam (which is still referred to as an input beam in this case) emergent from the fourth optical apparatus 677 is incident onto the first optical filter 630, and the first optical filter 630 may split the incident beam into a first transmitted beam and a first reflected beam. The first transmitted beam is incident onto the MEMS2 micro-mirror 640 through the fifth optical apparatus 678; and the MEMS2 micro-mirror 640 performs beam adjustment on the first transmitted beam, and the first transmitted beam is coupled to the first transmission input/output port 650, so as to implement signal dropping. The first reflected beam is incident onto the MEMS3 micro-mirror 622 through the sixth optical apparatus 679; and the MEMS3 micro-mirror 622 performs beam adjustment on the first reflected beam, and the first reflected beam is coupled to the first reflection input/output port 660, so as to implement transparent transmission of a signal.

FIG. 12 shows an example of another T-OADM apparatus according to an embodiment of this application. As shown in FIG. 12, the T-OADM apparatus includes an input/output port 610, a polarization beam splitting device 681, a MEMS1 micro-mirror 621, a fourth optical apparatus 691, a first optical filter 630, a fifth optical apparatus 692, a MEMS2 micro-mirror 640, a sixth optical apparatus 693, a MEMS3 micro-mirror 622, polarization beam combining devices 682 and 683, a first transmission input/output port 650, and a second transmission input/output port 660. In FIG. 10, the fourth optical apparatus 691 includes a lens 1 (denoted as f1), the fifth optical apparatus 692 includes a lens 2 (denoted as f2), and the sixth optical apparatus 693 includes a lens 3 (denoted as f3).

In FIG. 12, centers of the MEMS1 micro-mirror 621, the lens 1, the first optical filter 630, the lens 2, and the MEMS2 micro-mirror 640 are all disposed on the optical axis 1; and centers of the MEMS1 micro-mirror 621, the lens 1, the first optical filter 630, the lens 3, and the MEMS3 micro-mirror 622 are all disposed on the optical axis 2 (including the folded optical axis that is obtained after the optical axis 2 is reflected by the first optical filter 630).

Further, the MEMS1 micro-mirror 621 is located at a 2× focal length on a first side (a front side) of the lens 1, and the first optical filter 630 is located at a 2× focal length on a second side (a rear side) of the lens 1 and at a 2× focal length on a first side (a front side) of the lens 2, the MEMS2 micro-mirror 640 may be located at a 2× focal length on a second side (a rear side) of the lens 2, the first optical filter 630 may be located at a 2× focal length on a first side (a front side) of the lens 3, and the MEMS3 micro-mirror 622 may be located at a 2× focal length on a rear side of the lens 2. In this way, an included angle between the beam incident onto the lens 1 and the optical axis 1 is the same as an included angle between the beam emergent from the lens 1 and the optical axis 1, an included angle between the beam incident onto the lens 2 and the optical axis 1 is the same as an included angle between the beam emergent from the lens 2 and the optical axis 1, and an included angle between the beam incident onto the lens 3 and the optical axis 1 is the same as an included angle between the beam emergent from the lens 3 and the optical axis 1.

Refer to FIG. 12. The input beam is emergent from the input/output port 610 to the MEMS1 micro-mirror 621, and is adjusted and incident onto the fourth optical apparatus 691 by the MEMS1 micro-mirror 621. A beam (which is still referred to as an input beam in this case) emergent from the fourth optical apparatus 691 is incident onto the first optical filter 630, and the first optical filter 630 may split the incident beam into a first transmitted beam and a first reflected beam. The first transmitted beam is incident onto the MEMS2 micro-mirror 640 through the fifth optical apparatus 692; and the MEMS2 micro-mirror 640 performs beam adjustment on the first transmitted beam, and the first transmitted beam is coupled to the first transmission input/output port 650, so as to implement signal dropping. The first reflected beam is incident onto the MEMS3 micro-mirror 622 through the sixth optical apparatus 693; and the MEMS3 micro-mirror 622 performs beam adjustment on the first reflected beam, and the first reflected beam is coupled to the first reflection input/output port 660, so as to implement transparent transmission of a signal.

It should be noted that, in FIG. 11, an example in which the fourth optical apparatus 677, the fifth optical apparatus 678, and the sixth optical apparatus 679 each include an optical 4f system is used for description; and in FIG. 12, an example in which the fourth optical apparatus 691, the fifth optical apparatus 692 and the sixth optical apparatus 693 each include one lens is used for description. However, this embodiment of this application is not limited thereto. For example, in FIG. 11, one or more of the fourth optical apparatus 677, the fifth optical apparatus 678, and the sixth optical apparatus 679 may include a lens. The T-OADM apparatus in FIG. 12 may be transformed in a manner similar to that of the T-OADM apparatus in FIG. 11, and details are not described again.

In the T-OADM apparatus shown in FIG. 11 or 12, the fourth optical apparatus (677 or 691) may converge the beam emergent from the MEMS1 621 at a different included angle with the optical axis 1 onto an point on the optical axis 1 (for example, an intersection point between the optical axis 1 and the first optical filter 630), and there is a mapping relationship between an included angle between the beam emergent from the MEMS1 micro-mirror 621 and the optical axis 1 and an included angle between the beam emergent from the fourth optical apparatus and the optical axis 1; the fifth optical apparatus (678 or 692) may converge the first transmitted beam emergent from the first optical filter 630 at a different included angle with the optical axis 1 onto a point on the optical axis 1 (for example, an intersection point between the optical axis 1 and the MEMS2 micro-mirror 640), and there is a mapping relationship between an included angle between the transmitted beam emergent from the first optical filter 630 and the optical axis 1 and an included angle between the beam emergent from the fifth optical apparatus and the optical axis 1; and the sixth optical apparatus (679 or 693) may converge the first reflected beam emergent from the first optical filter 630 at an included angle different from the optical axis 2 onto a point on the optical axis 2 (for example, an intersection point between the optical axis 2 and the MEMS2 micro-mirror 640), and there is a mapping relationship between an included angle between the reflected beam emergent from the first optical filter 630 and the optical axis 2 and an included angle between the beam emergent from the sixth optical apparatus and the optical axis 2. In this way, deflection of the MEMS1 micro-mirror 621 can be adjusted to control a magnitude of a first incident angle at which an input beam is incident onto the first optical filter, so that a wavelength of a signal dropped or added by the T-OADM apparatus can be controlled. In addition, the fourth optical apparatus is configured to converge the beams that are emergent from the MEMS1 621 and that have different included angles with the optical axis 1 onto an intersection point between the optical axis 1 and the first optical filter 630, which can reduce a spot size of an input beam incident onto the first optical filter 630, and further reduce an area of the first optical filter 630.

Figure 13:
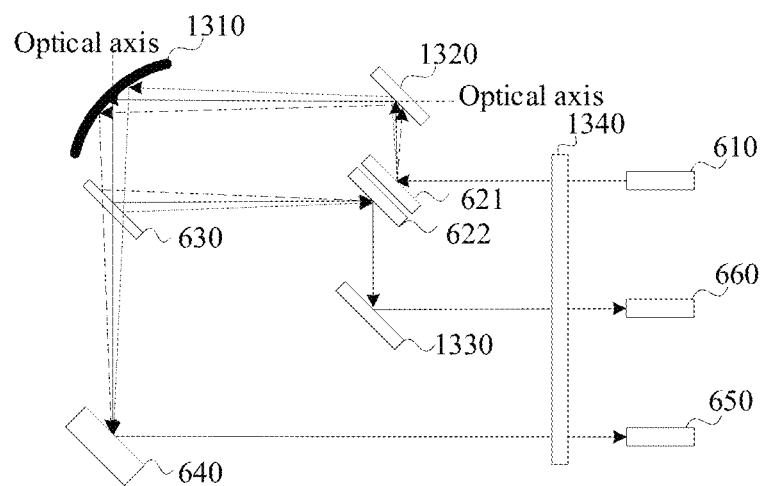
FIG. 13 shows an example of another T-OADM apparatus according to an embodiment of this application.

FIG. 13 shows an example of another T-OADM apparatus according to an embodiment of this application. In FIG. 13, the T-OADM apparatus may further include a spherical reflector 1310, configured to guide a beam (that is, an input beam) emergent from the MEMS1 micro-mirror 621 to the first optical filter 630, for example, configured to converge a beam that is emergent from the MEMS1 micro-mirror 621 and has a different included angle with the optical axis onto an intersection point between the optical axis and the MEMS2 micro-mirror 640, where an included angle between the beam emergent from the MEMS1 micro-mirror 621 and the optical axis one-to-one corresponds to an included angle between the beam emergent from the spherical reflector 1310 and the optical axis, for example, the two included angles are the same.

As shown in FIG. 13, the T-OADM apparatus includes an input/output port 610, a polarization multiplexer 1340, a MEMS1 micro-mirror 621, a spherical reflector 1310, a first optical filter 630, a MEMS2 micro-mirror 640, a MEMS3 micro-mirror 622, a first transmission input/output port 650, and a second transmission input/output port 660. In an embodiment, in FIG. 13, the T-OADM apparatus may further include reflectors 1320 and 1330, where the reflectors 1320 and 1330 are configured to fold optical paths, so that a structure of the T-OADM apparatus can be more compact, and a size of the apparatus can be reduced.

In FIG. 13, the MEMS1 micro-mirror 621 is disposed at a 2× focal length (for example, the 2× focal length of the folded light path reflected by the reflector 1320) on a first side (for example, a front side) of the spherical reflector 1310; the MEMS2 micro-mirror 640 is located at a 2× focal length (that is, the 2× focal length on a second side) that is of the optical path transmitted by the first optical filter 630 and that is on a second side (a rear side) of the spherical reflector 1310; and the MEMS3 micro-mirror 622 is located at a 2× focal length that is of an optical path (that is, a folded optical path) reflected by the first filter 630 and that is on the spherical reflector 4310.

Refer to FIG. 13. The input beam is emergent from the input/output port 610 to the MEMS1 micro-mirror 621, and is adjusted by the MEMS1 micro-mirror 621 to be incident onto the spherical reflector 1310 (in an embodiment, the input beam may be reflected to the spherical reflector 1310 through the reflector 1320). The spherical reflector 1310 may further reflect the input beam, so that the input beam is incident onto the first optical filter 630. The first optical filter 630 may split the incident beam into a first transmitted beam and a first reflected beam. The first transmitted beam is incident onto the MEMS2 micro-mirror 640; and the MEMS2 micro-mirror 640 performs beam adjustment on the first transmitted beam, and the first transmitted beam is coupled to the first transmission input/output port 650, so as to implement signal dropping. The first reflected beam is incident onto the MEMS3 micro-mirror 622; and the MEMS3 micro-mirror 622 performs beam adjustment on the first reflected beam, and the first reflected beam is coupled (in an embodiment, the beam emergent from the MEMS3 micro-mirror 622 may be reflected and coupled by the reflector 1330) to the first reflection input/output port 660, so as to implement transparent transmission of a signal.

Similar to FIG. 7A, in FIG. 8 to FIG. 13, when a wavelength of a signal to be dropped or added by the T-OADM needs to be adjusted (that is, adjusting the filtering center wavelength of the first optical filter 630), the adjustment may be implemented by adjusting deflection of the MEMS1 micro-mirror 621. Correspondingly, to couple the transmitted beam and the reflected beam to corresponding ports, the MEMS2 micro-mirror 640 and the MEMS3 micro-mirror 622 also need to be correspondingly deflected. Correspondingly, the T-OADM apparatuses in FIG. 8 to FIG. 13 may further include a control unit to control deflection directions and deflection angles of the MEMS1 micro-mirror 621, the MEMS2 micro-mirror 640, and the MEMS3 micro-mirror 622. In an embodiment, refer to the descriptions in FIG. 7A, FIG. 7B, and FIG. 7C. Details are not described herein again.

Figure 14:
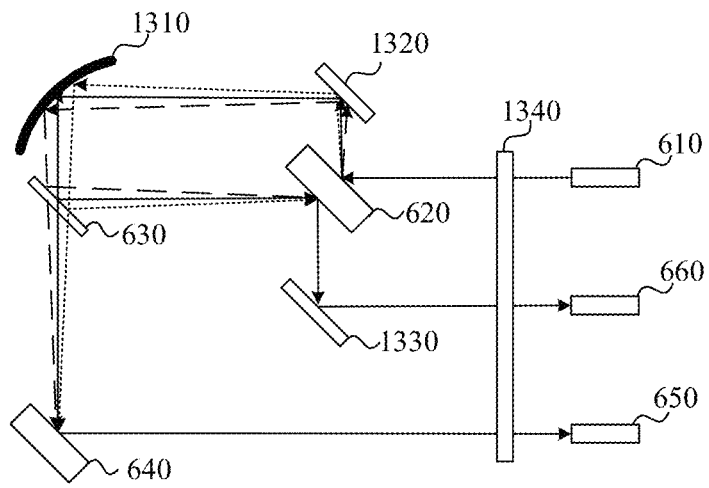
FIG. 14 shows an example of another T-OADM apparatus according to an embodiment of this application.

FIG. 14 shows an example of another T-OADM apparatus according to an embodiment of this application. Different from FIG. 13, in FIG. 14, for a first beam adjustment apparatus 620, a dual-reflective-surface MEMS micro-mirror 620 may be used to implement functions of two MEMS micro-mirrors (for example, the MEMS1 micro-mirror 621 and the MEMS3 micro-mirror 622 in FIG. 13). In other words, an input beam emergent from one reflective surface of the dual-reflective-surface MEMS micro-mirror is reflected to a first optical filter 630 sequentially through a reflector 1320 and a spherical reflector 1310; and the first reflected beam emergent from the first optical filter 630 is incident onto the other reflective surface of the dual-reflective-surface MEMS micro-mirror, and is reflected to a first reflection input/output port 660 through the reflective surface, so as to implement transparent transmission of a signal.

The dual-reflective-surface MEMS micro-mirror may include two reflective surfaces and one MEMS driver, where the MEMS driver may control the two reflective surfaces to perform the same deflection simultaneously.

Similar to FIG. 7A, in FIG. 14, when a wavelength of a signal to be dropped or added by the T-OADM needs to be adjusted (that is, adjusting the filtering center wavelength of the first optical filter 630), the adjustment may be implemented by adjusting deflection of the dual-reflective-surface MEMS micro-mirror 620. Due to the use of the dual-reflective-surface MEMS micro-mirror 620, the reflected beam can also be coupled to the corresponding port when polarization is performed on the MEMS micro-mirror 620. Further, to couple the transmitted beam to a corresponding port, corresponding deflection needs to be performed on the MEMS2 micro-mirror 640. Correspondingly, the T-OADM apparatuses in FIG. 14 may further include a control unit to control deflection directions and deflection angles of the MEMS1 micro-mirror 621, the MEMS2 micro-mirror 640, and the MEMS3 micro-mirror 622. In an embodiment, refer to the descriptions in FIG. 7A, FIG. 7B, and FIG. 7C. Details are not described herein again.

In FIG. 13 and FIG. 14, because the spherical reflector 1310 can fold an optical path, a structure of the T-OADM apparatus can be more compact, and a volume of the T-OADM apparatus can be reduced.

Therefore, in an embodiment of the application, when a deflection angle of the first optical filter is kept unchanged, an incident angle at which an input beam is incident onto the first optical filter may be dynamically changed by using a beam adjustment apparatus (for example, a MEMS micro-mirror or an LCOS), to change a filtering center wavelength of the first optical filter; and a beam transmitted by the first optical filter and a beam reflected by the first optical filter are adjusted by using a beam adjustment apparatus (for example, a MEMS micro-mirror or an LCOS), so that the beams are coupled to corresponding ports, so as to implement dynamic adjustment of a wavelength of a signal dropped or added by the T-OADM apparatus. In an embodiment of the application, wavelengths of signals added and dropped by the T-OADM apparatus can be dynamically adjusted, wavelength-level service switching is supported, a network structure is flexible, and operation and maintenance are simple, which facilitates intelligent control of an optical network.

In addition, in an embodiment of the application, a beam adjustment apparatus (for example, a MEMS micro-mirror or an LCOS) may further adjust a degree of coupling of a beam to a transmission input/output port, so that strength of an emergent transmitted beam can be adjusted, that is, strength of a signal dropped by the T-OADM apparatus can be adjusted.

In the T-OADM apparatuses shown in FIG. 6 to FIG. 14, each T-OADM apparatus includes an optical filter and a transmission input/output port, so that a beam of one wavelength can be dropped or added, and a size of the wavelength can be dynamically adjusted by using a beam adjustment apparatus. To enable the T-OADM apparatus to simultaneously drop or add signals of two or more wavelengths (and make each wavelength dynamically adjustable), one or more optical filters may be additionally cascaded in the T-OADM apparatus, and each optical filter may implement dropping or adding of one wavelength. The following describes a T-OADM apparatus of this type in detail with reference to FIG. 15 to FIG. 18.

Figure 15:
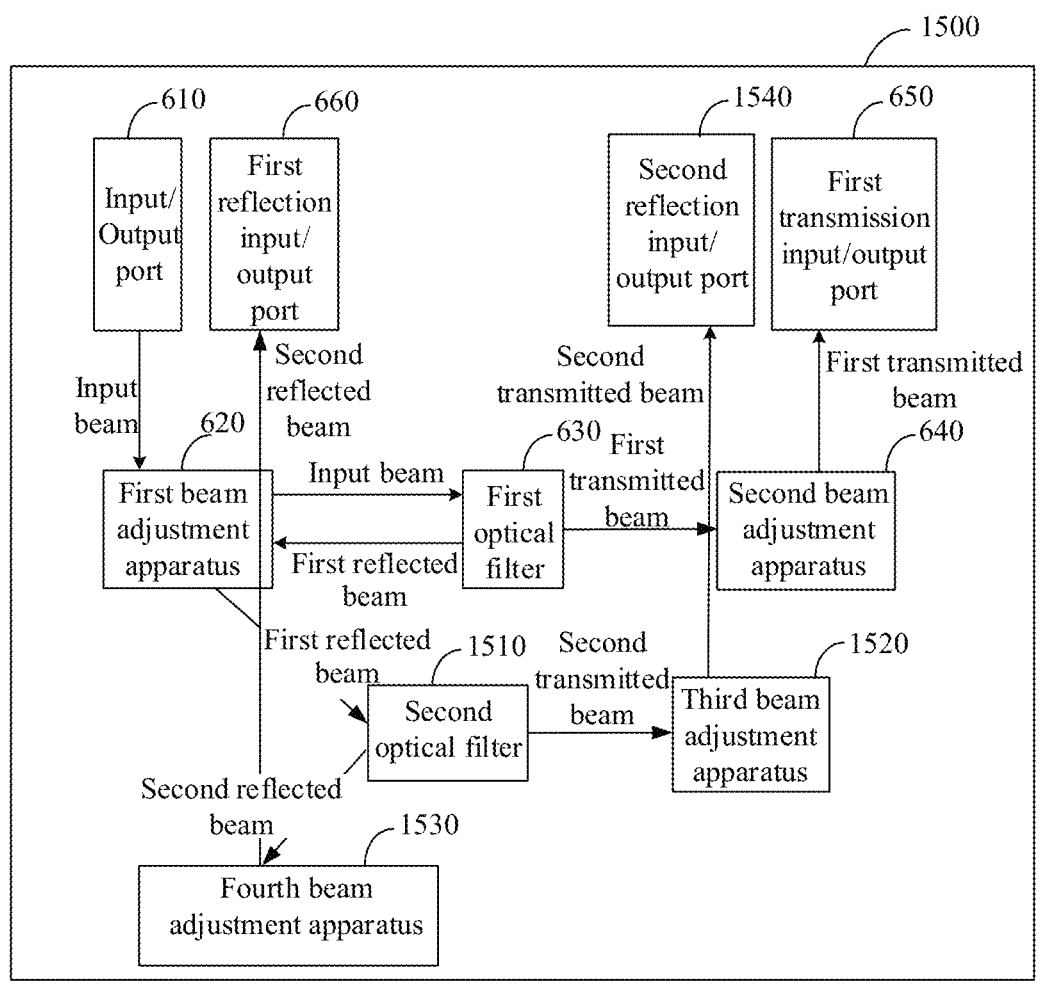
FIG. 15 is a schematic diagram of a structure of another T-OADM apparatus according to an embodiment of this application.

FIG. 15 is a schematic diagram of a structure of a T-OADM apparatus 1500 according to an embodiment of this application. As shown in FIG. 15, the T-OADM apparatus 1500 includes an input/output port 610, a first beam adjustment apparatus 620, a first optical filter 630, a second beam adjustment apparatus 640, a first transmission input/output port 650, a first reflection input/output port 660, a second optical filter 1510, a third beam adjustment apparatus 1520, a fourth beam adjustment apparatus 1530, and a second transmission input/output port 1540. Same reference numerals in FIG. 15 to FIG. 6 indicate same or similar meanings. Herein, the second transmission input/output port 1540 may also be referred to as a fourth port 1540. This is not limited in this application.

For the input/output port 610, the first beam adjustment apparatus 620, the first optical filter 630, the second beam adjustment apparatus 640, the first transmission input/output port 650, and the first reflection input/output port 660, refer to the description in FIG. 6. Details are not described again.

In FIG. 15, the first beam adjustment apparatus 620 is configured to adjust a transmission direction of a first reflected beam, so that the first reflected beam is incident onto the second optical filter 1510 at a second incident angle.

In some embodiments, when the first beam adjustment apparatus 620 includes an incident beam adjustment apparatus and a reflected beam adjustment apparatus, the reflected beam adjustment apparatus adjusts the transmission direction of the first reflected beam.

Herein, the first beam adjustment apparatus 620 may dynamically adjust a magnitude of the second incident angle based on a wavelength of a second signal that needs to be dropped (or added) by the T-OADM apparatus 1500. For example, the wavelength of the signal that needs to be dropped (or added) and the second incident angle meet the foregoing formula (1).

The second optical filter 1510 is configured to receive the beam that is incident at the second incident angle, and split the beam incident onto the second optical filter 1510 into a second transmitted beam including a second wavelength and a second reflected beam including at least one wavelength. The second wavelength is a wavelength of a beam that is transmitted through the second optical filter 1510 when the beam is incident onto the second optical filter 1510 at the second incident angle. Herein, the second reflected light may be considered as some of beams in the first reflected light.

Herein, the second optical filter 1510 may be fixedly disposed. In this case, the magnitude of the second incident angle may be dynamically adjusted by using the first beam adjustment apparatus 620, so that the T-OADM apparatus 1500 can drop (or add) a signal of a second wavelength while dropping (or adding) a signal of the first wavelength.

The third beam adjustment apparatus 1520 is configured to adjust a transmission direction of the second transmitted beam, so that the second transmitted beam is output to the second transmission input/output port 1540.

The second transmission input/output port 1540 is configured to output the second transmitted beam.

The fourth beam adjustment apparatus 1530 is configured to adjust a transmission direction of the second reflected beam.

The first reflection input/output port 660 is configured to output the second reflected beam.

In some embodiments, the fourth beam adjustment apparatus 1530 may be configured to adjust a transmission direction of the second reflected beam, so that the second reflected beam is output to the first reflection input/output port 660. In this case, the first reflection input/output port 660 is configured to output the second reflected beam.

In some other embodiments, when the OADM apparatus 600 further includes a third optical filter, the fourth beam adjustment apparatus 1530 may be further configured to adjust a transmission direction of the second reflected beam, so that the second reflected beam is output to the third optical filter. In this case, the third optical filter may further perform optical filtering on the second reflected beam; and correspondingly, the first reflection input/output port 660 is configured to output some of beams in the second reflected beam.

Therefore, in an embodiment of the application, the beam adjustment apparatus may be used to change the transmission direction of the first reflected beam emergent from the first optical filter, so that the first reflected beam is incident onto the second optical filter. Further, the beam adjustment apparatus may be used to change an incident angle at which the beam is incident onto the second optical filter, and adjust transmission directions of the transmitted beam and the reflected beam of the second wavelength that are emergent from the second optical filter, so that the transmitted beam and the reflected beam emergent from the optical filter are output to corresponding ports. In this way, the T-OADM apparatus can drop (or add) a signal of the second wavelength while dropping (or adding) a signal of the first wavelength.

For example, the third beam adjustment apparatus 1520 and the fourth beam adjustment apparatus 1530 each may be a MEMS micro-mirror or an LCOS. This is not limited in an embodiment of the application.

In some embodiments, the second transmission input/output port 1540 is further configured to input an input beam of the second wavelength; and the input beam is transmitted by using the second optical filter 1510, and is output to the input/output port 610. In this case, the input/output port 610 is further configured to output the beam transmitted by the second optical filter 1510. Therefore, in an embodiment of the application, a signal of the second wavelength can be added.

Figure 16:
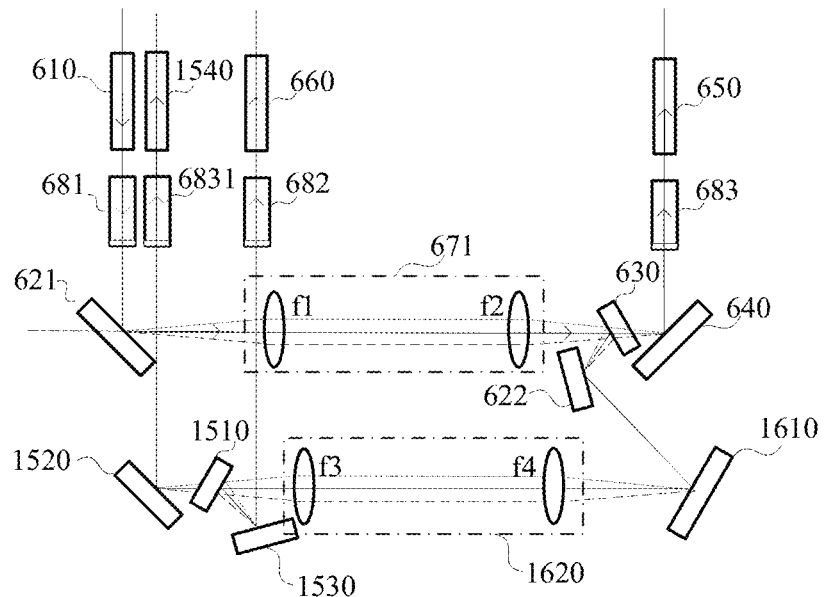
FIG. 16 shows an example of another T-OADM apparatus according to an embodiment of this application.
Figure 17:
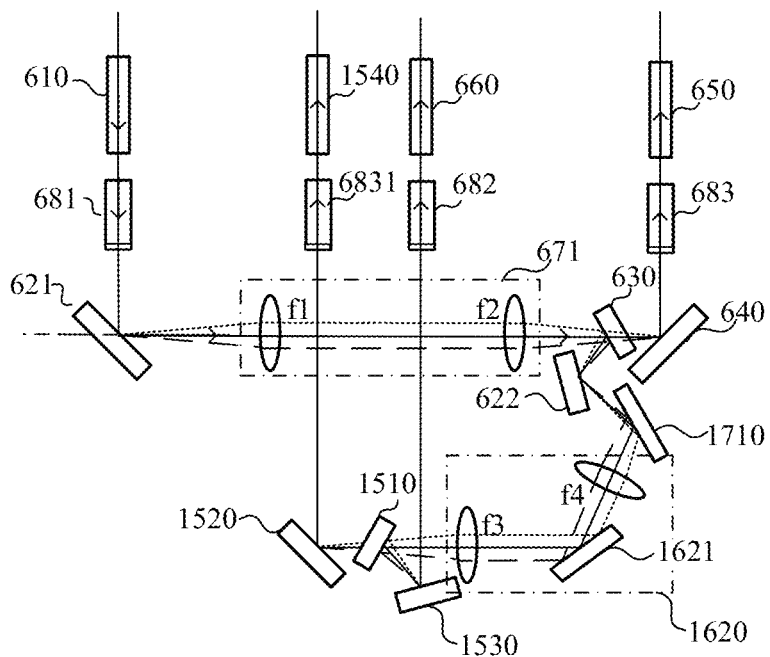
FIG. 17 shows an example of another T-OADM apparatus according to an embodiment of this application.
Figure 18:
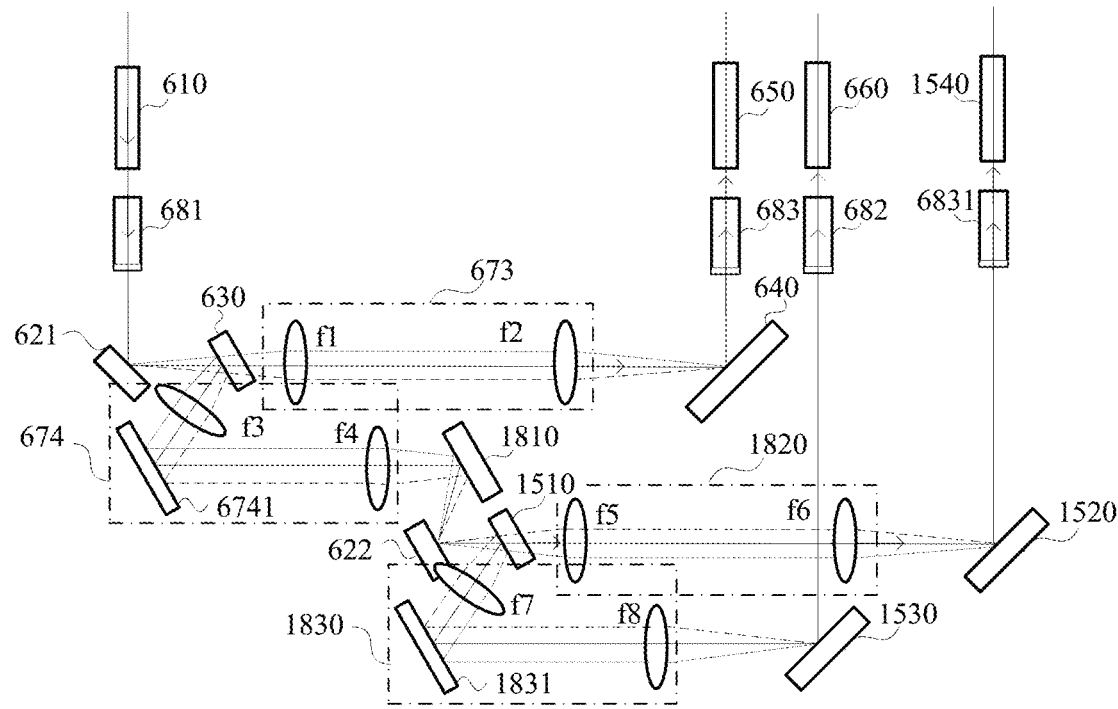
FIG. 18 shows an example of another T-OADM apparatus according to an embodiment of this application.

The following describes three T-OADM apparatuses provided in embodiments of this application with reference to FIG. 16 to FIG. 18. Same reference numerals in FIG. 15 to FIG. 18 indicate same or similar meanings. For brevity, details are not described again.

It should be noted that, in FIG. 16 to FIG. 18, an example in which an optical filter performs optical filtering on incident light in a polarization state is used for description. Correspondingly, the T-OADM apparatuses shown in FIG. 16 to FIG. 18 further include a polarization beam splitting device and a polarization beam combining device (which may also be referred to as a polarization multiplexing device).

In the T-OADM apparatus in FIG. 16 to FIG. 18, an example in which the third beam adjustment apparatus 1520 is a fourth MEMS micro-mirror (denoted as a MEMS4 micro-mirror) 1520 and the fourth beam adjustment apparatus 1530 is a fifth MEMS micro-mirror (denoted as a MEMS5 micro-mirror) 1530 is used an example for description, but this embodiment of this application is not limited thereto.

FIG. 16 shows an example of another T-OADM apparatus according to an embodiment of this application. Based on the T-OADM apparatus in FIG. 7A, the second optical filter 1510, the MEMS4 micro-mirror 1520, the MEMS5 micro-mirror 1530, and the second transmission input/output port 1540 are further added to the T-OADM apparatus in FIG. 16. In an embodiment, FIG. 16 may further include a MEMS micro-mirror 1610, an optical apparatus 1620, and a polarization beam combining device 6831. The MEMS micro-mirror 1610 may be configured to further adjust a transmission direction of the first reflected beam emergent from the MEMS3 micro-mirror 622, so that the first reflected beam is incident onto the optical apparatus 1620. In addition, the MEMS micro-mirror 1610 may be further configured to fold an optical path, so that a structure of the T-OADM apparatus can be more compact, and a device volume can be reduced. The optical apparatus 1620 is configured to guide the first reflected beam to the second optical filter 1510. In an embodiment, for the optical apparatus 1620, refer to the description about the optical apparatus 671. Details are not described herein again.

In an embodiment, for locations of the MEMS3 micro-mirror 622, the MEMS micro-mirror 1610, the optical apparatus 1620, the MEMS4 micro-mirror 1520, and the MEMS5 micro-mirror 1530, refer to the foregoing descriptions about the MEMS1 micro-mirror, the first optical apparatus 671, the MEMS2 micro-mirror 640, and the MEMS3 micro-mirror 622. Details are not described herein again.

It should be understood that, in FIG. 16, an example in which the optical apparatus 1620 is an optical 4f system including a lens 3 (denoted as f3) and a lens 4 (denoted as f4) is used for description. In some other embodiments, the optical apparatus 1620 may further include a lens. In this case, for locations of the lens, the second optical filter 1510, the MEMS4 micro-mirror 1520, and the MEMS5 micro-mirror 1530, refer to the foregoing descriptions about the lens, the first optical filter, and the MEMS micro-mirror. Details are not described herein again.

FIG. 17 shows an example of another T-OADM apparatus according to an embodiment of this application. Different from FIG. 16, the MEMS micro-mirror 1610 is not used in FIG. 17. In this case, the first reflected beam emergent from the MEMS3 micro-mirror 622 may be incident onto the optical apparatus 1620.

In an embodiment, as shown in FIG. 17, a reflector 1710 may be disposed between the optical apparatus 1620 and the MEMS3 micro-mirror 622 to fold an optical path, so that a structure of the T-OADM apparatus can be more compact, and a device volume can be reduced.

In an embodiment, as shown in FIG. 17, a reflector 1621 may be further disposed between the lens 3 and the lens 4 in the optical apparatus 1620 to fold an optical path, so that the structure of the T-OADM apparatus can be more compact, and the device volume can be reduced.

FIG. 18 shows an example of another T-OADM apparatus according to an embodiment of this application. Based on the T-OADM apparatus in FIG. 9, the second optical filter 1510, the MEMS4 micro-mirror 1520, the MEMS5 micro-mirror 1530, and the second transmission input/output port 1540 are further added to the T-OADM apparatus in FIG. 18. In an embodiment, an optical apparatus 1820, an optical apparatus 1830, and a polarization beam combining device 6831 may be further included in FIG. 18. The MEMS3 micro-mirror 622 adjusts a transmission direction of the first reflected beam, so that the first reflected beam is incident onto the second optical filter 1510. The second transmitted beam emergent from the second optical filter 1510 is incident onto the optical apparatus 1820. The optical apparatus 1820 guides the second transmitted beam to the MEMS4 micro-mirror 1520, and the second transmitted beam is coupled to the second transmission input/output port, so as to implement dropping of a signal of the second wavelength. The second reflected beam emergent from the second optical filter 1510 is incident onto the optical apparatus 1830; and the optical apparatus 1830 guides the second reflected beam to the MEMS5 micro-mirror 1530, and further couples the second reflected beam to the first reflection input/output port, so as to implement transparent transmission of a signal. In an embodiment, for the optical apparatus 1820, refer to the description about the optical apparatus 673; and for the optical apparatus 1830, refer to the description about the optical apparatus 674. Details are not described again.

For example, the optical apparatuses 1820 and 1830 each may be an optical 4f system, where the optical apparatus 1820 may include a lens 5 (denoted as f5) and a lens 6 (denoted as f6), and the optical apparatus 1830 may include a lens 7 (denoted f7) and a lens 8 (denoted f8).

In an embodiment, the T-OADM apparatus in FIG. 18 may further include a reflector 1810. The reflector 1810 may be located between the lens 4 and the MEMS3 micro-mirror 622, and is configured to fold an optical path, so that a structure of the T-OADM apparatus can be more compact, and a device volume can be reduced.

In an embodiment, for locations of the MEMS3 micro-mirror 622, the second optical filter 1510, the optical apparatus 1820, the MEMS4 micro-mirror 1520, the optical apparatus 1830, and the MEMS5 micro-mirror 1530, refer to the descriptions about the MEMS1 micro-mirror, the first optical filter 630, the first optical apparatus 671, the MEMS2 micro-mirror 640, the second optical apparatus 674, and the MEMS3 micro-mirror 622. Details are not described herein again.

It should be understood that, in FIG. 18, an example in which the optical apparatuses 1820 and 1830 each are an optical 4f system used for description. In some other embodiments, the optical apparatus 1820 or 1830 may further include a lens. In this case, for locations of the lens, the second optical filter 1510, the MEMS4 micro-mirror 1520, and the MEMS5 micro-mirror 1530 in the optical apparatus 1820 or 1830, refer to the foregoing descriptions about the lens, the first optical filter, and the MEMS micro-mirror. Details are not described herein again.

Similar to FIG. 7A, in FIG. 16 to FIG. 18, when a signal of the second wavelength to be dropped or added by the T-OADM apparatus needs to be adjusted (that is, adjusting the filtering center wavelength of the second optical filter 1510), the adjustment may be implemented by adjusting deflection of the MEMS3 micro-mirror 622. Correspondingly, to couple the transmitted beam and the reflected beam to corresponding ports, the MEMS4 micro-mirror 1520 and the MEMS5 micro-mirror 1530 also need to be correspondingly deflected. In an embodiment, refer to the description in FIG. 7A. An adjustment manner in FIG. 7A may further need to be properly adjusted, and the adjustment falls within the protection scope of embodiments of this application.

It should be noted that, in FIG. 16 to FIG. 18, an example in which the T-OADM apparatus implements dropping (or adding) of signals of two wavelengths is used for description. According to the foregoing embodiment, more optical filters and more beam adjustment apparatuses may be added, so that the T-OADM apparatus can simultaneously drop (or add) signals of more wavelengths, which falls within the protection scope of embodiments of this application.

Therefore, in an embodiment of the application, when the deflection angles of the first optical filter and the second optical filter are kept unchanged, an incident angle at which an input beam is incident onto the first optical filter and/or the second optical filter may be dynamically changed by using a beam adjustment apparatus (for example, a MEMS micro-mirror or an LCOS), to change a filtering center wavelength of the first optical filter and/or the second optical filter. Further, the beam adjustment apparatus (for example, a MEMS micro-mirror or an LCOS) is used to adjust the beam that is transmitted by the first optical filter and the beam that is transmitted and reflected by the second optical filter, so that the beam is coupled to a corresponding port, and to adjust the beam reflected by the first optical filter, so that the reflected beam is incident onto the second optical filter. In this way, the T-OADM apparatus can drop or add signals of different wavelengths, and the different wavelengths can be dynamically adjusted. In an embodiment of the application, wavelengths of signals added and dropped by the T-OADM apparatus can be dynamically adjusted, wavelength-level service switching is supported, a network structure is flexible, and operation and maintenance are simple, which facilitates intelligent control of an optical network.

In addition, in an embodiment of the application, a beam adjustment apparatus (for example, a MEMS micro-mirror or an LCOS) may also be used to adjust degrees of coupling of different transmitted beams to corresponding transmission input/output ports, so that strength of all transmitted beams can be consistent, so as to ensure consistent strength of signals of a plurality of different wavelengths dropped by the T-OADM apparatus, thereby ensuring strength flatness of optical signals of different wavelengths that are dropped locally.

In some embodiments, the input beam (that is, the beam incident onto the optical filter) may be kept unchanged, and the incident angle at which the incident beam is incident onto the optical filter may be changed by dynamically changing the deflection angle of the optical filter, so that wavelengths of the transmitted beam and the reflected beam that are emergent through the optical filter can be dynamically adjusted, and then a wavelength of a beam that is dropped or added by the T-OADM apparatus can be dynamically adjusted.

Figure 19:
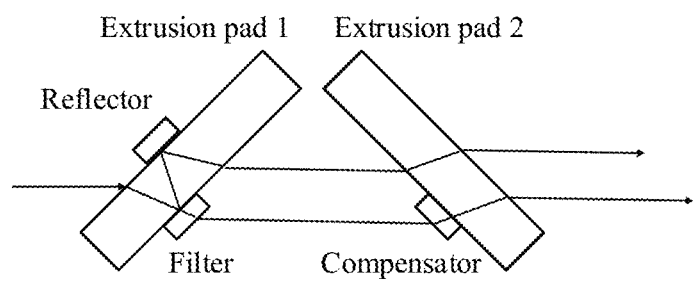
FIG. 19 is a schematic diagram of an existing T-OADM apparatus.

FIG. 19 shows an existing T-OADM apparatus, including a dielectric thin film filter and a reflector that are attached to an extrusion pad 1 and a compensator that is attached to an extrusion pad 2. As shown in FIG. 19, when the incident beam is kept unchanged, an incident angle between the dielectric thin film filter and the incident beam can be changed by adjusting deflection of the extrusion pad 1, and then a filtering center wavelength of the filter can be changed, thereby implementing a dynamical adjustment of the OADM. In addition, the extrusion pad 2 deflects a corresponding angle in the opposite direction based on the deflection of the extrusion pad 1, so as to compensate the displacement problem of the transmitted beam and the reflected beam caused by the deflection of the extrusion pad 1, so that the beam is more effectively coupled to the corresponding port, so as to drop (or add) and transparently transmit signals. To eliminate the problem of beam displacement caused by the deflection filter, a corresponding compensation device is added to the apparatus, so that the entire apparatus includes a large quantity of devices and has a complex structure.

Based on this, an embodiment of this application provides a T-OADM apparatus. In the T-OADM apparatus, an optical filter may maintain a fixed included angle from a reflector; the rotating component drives deflection of the optical filter to change an incident angle at which an incident beam is incident onto the optical filter; and a corresponding reflector deflects with the deflection of the optical filter, so as to couple a reflected beam emergent from the optical filter to a reflection input/output port.

Figure 20:
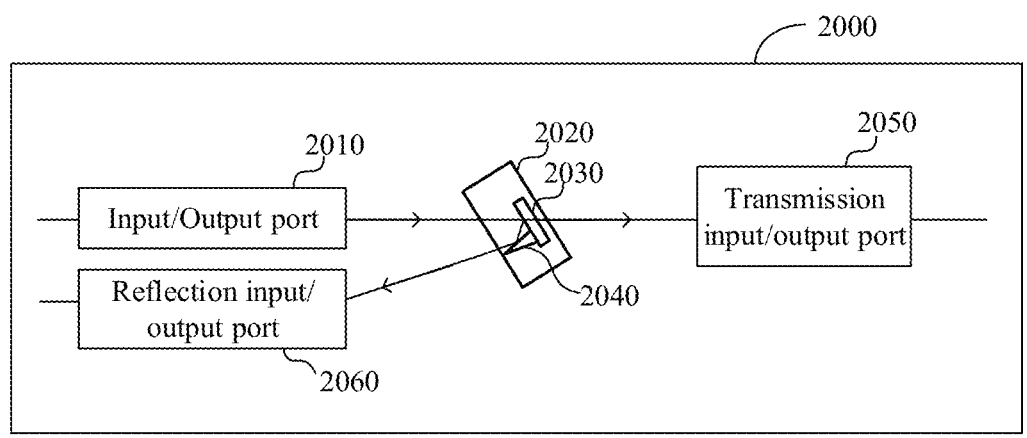
FIG. 20 is a schematic diagram of a structure of another T-OADM apparatus according to an embodiment of this application.

FIG. 20 is a schematic diagram of a structure of a T-OADM apparatus 2000 according to an embodiment of this application. As shown in FIG. 20, the T-OADM apparatus 2000 includes an input/output port 2010, a rotating component 2020, an optical filter 2030, a reflector 2040, a transmission input/output port 2050, and a reflection input/output port 2060. Herein, the input/output port 2010 may also be referred to as the first port 2010, the transmission input/output port 2050 may also be referred to as the transmission port 2050, and the reflection input/output port 2060 may also be referred to as the reflection port 2060. This is not limited in this application.

The rotating component 2020 is connected to both the optical filter 2030 and the reflector 2040, the optical filter 2030 is connected to the reflector 2040, and there is a fixed included angle between the optical filter 2030 and a reflective surface of the reflector 2040.

The input/output port 2050 is configured to input an input beam including at least two wavelengths.

The rotating component 2020 is configured to rotate to adjust tilt angles of the optical filter 2030 and the reflector 2040, so that the input beam is incident onto the optical filter 2030 at a first incident angle.

Herein, the rotating component 2020 may dynamically adjust deflection (that is, a tilt angle) of the optical filter 2030 based on a wavelength of a signal that needs to be dropped (or added) by the T-OADM apparatus 2000, to adjust a magnitude of the first incident angle. For example, the wavelength of the signal that needs to be dropped (or added) and the first incident angle meet the foregoing formula (1).

The optical filter 2030 is configured to receive a beam that is incident at the first incident angle, and split the incident beam into a transmitted beam including a first wavelength and a reflected beam including at least one wavelength, where the first wavelength is the wavelength of the beam passing through the optical filter 2030 when the beam is incident onto the optical filter 2030 at the first incident angle. Herein, the first wavelength is a wavelength corresponding to a signal that needs to be dropped (or added) by the T-OAMD apparatus 2000.

The reflector 2040 is configured to reflect the reflected beam, so that the reflected beam is output to the reflection input/output port.

The transmission input/output port 2050 is configured to output the transmitted beam.

The first reflection input/output port 2060 is configured to output the reflected beam.

Therefore, in an embodiment of the application, the optical filter and the reflector are disposed to be connected to the rotating component, a fixed angle is maintained between the optical filter and the rotating component, and the rotating component rotates to change the tilt angle of the optical filter, so as to change an incident angle at which an incident beam is incident onto the optical filter. In addition, after the optical filter splits the incident beam into the transmitted beam and the reflected beam, the emergent reflected beam is further reflected to the reflection input/output port by using the reflector that has a fixed angle with the optical filter. In an embodiment of the application, a fixed angle is set between the optical filter and the reflector, so that the reflected beam can be coupled to the reflection input/output port by using the reflector. Therefore, complexity of the T-OADM apparatus can be reduced in an embodiment of the application.

In some embodiments, the T-OADM apparatus may further include a control unit, configured to control, based on a wavelength of a signal that needs to be dropped (or added) by the T-OADM apparatus 2000, the rotating component to rotate, so as to adjust a first incident angle at which a beam is incident onto the first optical filter. In this way, a wavelength of a signal that needs to be dropped (or added) by the T-OADM apparatus is adjusted.

For example, the control unit may be configured to receive an instruction, where the instruction indicates a wavelength of the first signal dropped (or added) by the T-OADM.

The control unit may further determine a rotation angle of the rotating component based on the first wavelength, and control, based on the rotation angle, the rotating component to rotate.

In an embodiment, the control unit may be preconfigured to store a plurality of wavelengths of signals that can be dropped or added by the T-OADM apparatus, and a rotation angle that is of a rotating component and that corresponds to each wavelength. When obtaining the wavelength of the signal that needs to be dropped or added by the T-OADM apparatus, the control unit may determine, based on the preconfiguration, the rotation angle that is of the rotating component and that corresponds to the wavelength.

In an embodiment, the control unit may send a control signal to the driver of the rotating component, to control the rotating component to rotate.

For example, the rotating component may be a motor or a MEMS rotating component. This is not limited in this embodiment of this application.

In some embodiments, the transmission input/output port 2050 is further configured to input an input beam of a first wavelength; and the input beam is transmitted through the optical filter 2030, and is output to the input/output port 2010. In this case, the input/output port 2010 is further configured to output the beam transmitted through the optical filter 2030. In this way, the signal of the first wavelength can be added.

In some embodiments, the reflection input/output port 2060 is further configured to input a beam output from the second reflection input/output port; and the beam is reflected by the reflector 2040 and the optical filter 2030 and output to the input/output port 2010. In this case, the input/output port 2010 is further configured to output a beam reflected by the optical filter 2030.

Herein, the second reflection input/output port may be a reflection input/output port of another OADM apparatus. As mentioned above, the beam output from the second reflection input/output port should be transparently transmitted without being affected. In an embodiment, the beam output by the second reflection input/output port may be input to the reflection input/output port 2060, and the beam input to the reflection input/output port 2060 is reflected to the input/output port by using the reflector 2040 and the optical filter 2030, so as to implement transparent transmission of the beam output from the second reflection input/output port.

Correspondingly, the beam output from the reflection input/output port 2060 may also be input to another reflection input/output port (for example, a third reflection input/output port), so as to implement transparent transmission of the beam output from the reflection input/output port 2060.

With reference to FIG. 21 to FIG. 24, the following describes two T-OADM apparatuses provided in embodiments of this application. Same reference numerals in FIG. 21 to FIG. 24 indicate same or similar meanings. For brevity, details are not described again.

It should be noted that, in FIG. 21 to FIG. 24, an example in which an optical filter performs optical filtering on incident light in a polarization state is used for description. Correspondingly, the T-OADM apparatuses shown in FIG. 21 to FIG. 24 further include a polarization beam splitting device and a polarization beam combining device (which may also be referred to as a polarization multiplexing device), but this embodiment of this application is not limited thereto.

Figure 21:
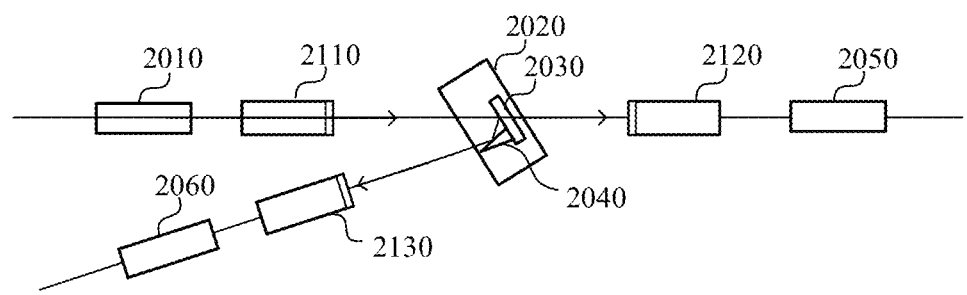
FIG. 21 shows an example of another T-OADM apparatus according to an embodiment of this application.

FIG. 21 shows an example of a T-OADM apparatus according to an embodiment of this application. As shown in FIG. 21, the T-OADM apparatus includes an input/output port 2010, a polarization beam splitting device 2110, a rotating component 2020, an optical filter 2030, a reflector 2040, polarization beam combining devices 2120 and 2130, a transmission input/output port 2050, and a reflection input/output port 2060. In FIG. 21, an angle between the optical filter 2030 and the reflective surface of the reflector 2040 is not limited.

Refer to FIG. 21. An input beam input to the T-OADM apparatus includes channels of a plurality of wavelengths included in a WDM system. The input beam is emergent from the input/output port 2010, passes through the polarization beam splitting device 2110, and becomes two optical signals with the same polarization (for example, may be arranged perpendicular to a paper plane). The two optical signals (which are still referred to an input beam in this case) with the same polarization are incident onto the filter 2030. According to a relationship between a filtering center wavelength of the optical filter 2030 and an incident angle at which a beam is incident onto the optical filter 2030, a channel (beam) of a wavelength (for example, a first wavelength) in the input beam is transmitted through the optical filter 2030, and channels (beams) other than the channel (beam) of the wavelength in the input beams are reflected by the optical filter 2030 to the reflector 2040. The transmitted beam emergent from the optical filter 2030 passes through the polarization beam combining device 2120 for polarization recovery, and is coupled to the transmission input/output port 2050, so as to implement signal dropping. The reflected beam emergent from the first optical filter 630 is reflected by the reflector 2040 to the polarization beam combining device 2130 for polarization recovery, and then is coupled to the reflection input/output port 2060, so as to implement transparent transmission of a signal.

Figure 22:
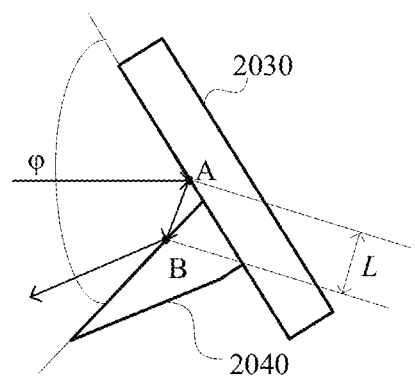
FIG. 22 shows example locations of an optical filter and a reflector.

FIG. 22 shows an example of the locations of the optical filter 2030 and the reflector 2040. An angle Φ between the optical filter 2030 and the reflective surface of the reflector 2040 may be set within a range of 40° to 120°. This is not limited in this application.

Still refer to FIG. 22. A length L of an optical path between a position A of a beam spot formed by the beam on the optical filter 2030 and a position B of a beam spot formed by the beam on the reflective surface of the reflector 2040 may be controlled within 80 mm. This is not limited in this application.

Figure 23:
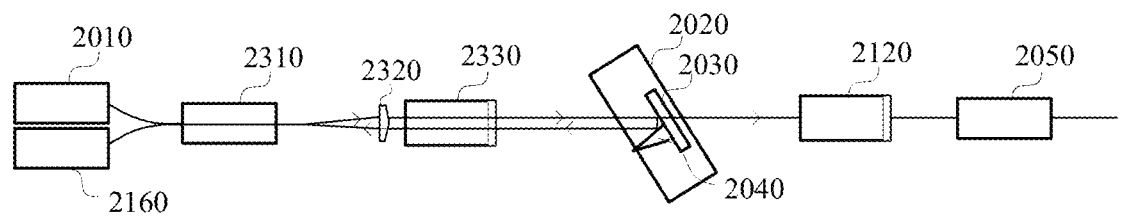
FIG. 23 shows an example of another T-OADM apparatus according to an embodiment of this application.

FIG. 23 shows an example of a T-OADM apparatus according to an embodiment of this application. As shown in FIG. 23, the T-OADM apparatus includes an input/output port 2010, a dual-fiber collimator 2310, a first prism 2320, a polarization multiplexer 2330, a rotating component 2020, an optical filter 2030, a reflector 2040, a polarization beam combining device 2120, a transmission input/output port 2050, and a reflection input/output port 2060. In FIG. 23, the optical filter 2030 and the reflective surface of the reflector 2040 are disposed perpendicular to each other, that is, an angle between the optical filter 2030 and the reflective surface of the reflector 2040 is 90°.

It should be noted that, in an actual T-OADM apparatus, disposing the optical filter 2030 and the reflective surface of the reflector 2040 perpendicular to each other not only includes disposing the two strictly perpendicular to each other, that is, an angle between the two is accurately set to 90°, but also includes disposing the two almost perpendicular to each other, that is, the angle between the two is set to be close to 90° or slightly greater than 90°. This is not limited in this application.

Refer to FIG. 23. An input beam is emergent from the input/output port 2010 to one fiber of the dual-fiber collimator 2310 for collimation, and the collimated beam is incident onto the polarization multiplexing device 2330 through the first prism 2320 and becomes two optical signals with the same polarization (for example, may be arranged perpendicular to a paper plane). The two optical signals (which are still referred to an input beam in this case) with the same polarization are incident onto the filter 2030. The transmitted beam emergent from the optical filter 2030 passes through the polarization beam combining device 2120 for polarization recovery, and is coupled to the transmission input/output port 2050, so as to implement signal dropping. The reflected beam emergent from the optical filter 2030 is incident onto the polarization multiplexing device 2330 through the reflector 2040 for polarization recovery, and then is coupled to the first prism 2320. After being emergent from the first prism, the reflected beam is incident onto the dual-fiber collimator 2310, and then is coupled to the reflection input/output port 2060, so as to implement transparent transmission of a signal.

For example, the first prism 2320 may be a roof prism. This is not limited in this application.

Different from the T-OADM apparatus in FIG. 21, in FIG. 23, because the optical filter 2030 is disposed perpendicular to the reflective surface of the reflector 2040, a beam incident onto the filter 2030 and a reflected beam emergent from the reflector 2040 are parallel to each other, and there is a spacing between the two beams. In this case, the first prism 2320 may be used to refract the input beam emergent from the dual-fiber collimator 2310 to the polarization multiplexing device 2330, and refract the beam reflected by the polarization multiplexing device 2330 to the dual-fiber collimator 2310, so that the reflected beam is coupled to the reflection input/output port 2060.

In the T-OADM apparatus shown in FIG. 21 or FIG. 22, when the filtering center wavelength of the optical filter 2030 needs to be adjusted (that is, the wavelength of the first transmitted beam needs to be adjusted), the adjustment may be implemented by controlling the rotating component 2020 to rotate. In this case, because the reflective surfaces of the optical filter 2030 and the reflector 2040 can continue to maintain a set fixed angle, a transmitted beam and a reflected beam can be coupled to corresponding ports.

In some embodiments, a second prism may be disposed between the optical filter 2030 and the transmission input/output port. When the optical filter is deflected, a transmitted beam is displaced to a certain extent. In this case, the second prism can be used to reduce a displacement of the transmitted beam, so as to reduce impact of the displacement on coupling of the transmitted beam to a corresponding port.

In some embodiments, a third prism may be disposed between the reflector 2040 and the reflection input/output port. When the optical filter and the reflector are deflected, the reflected beam is displaced to a certain extent. In this case, the third prism can be used to reduce a displacement of the reflected beam, so as to reduce impact of the displacement on coupling of the reflected beam to a corresponding port.

Figure 24:
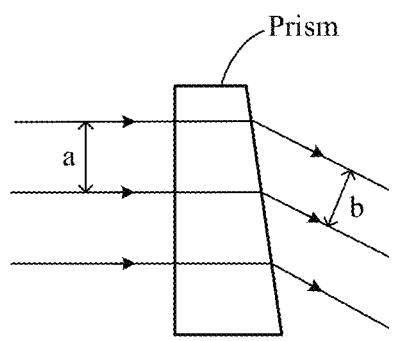
FIG. 24 shows an example of compressing a displacement of a beam by a prism.

FIG. 24 shows an example of compressing a displacement of a beam by a prism. As shown in FIG. 24, the displacement of the beam before passing through the prism is $\alpha$. After the beam passes through the prism, the displacement of the beam is reduced to b.

An embodiment of this application further provides a T-OADM apparatus, including an input/output port, a driving component, an optical filter, a transmission input/output port, and a reflection input/output port. The optical filter includes at least two regions having different filter bandwidths. The driving component is connected to an optical filter, and is configured to drive the optical filter to move, so that an input beam is incident onto a first region in the at least two regions of the optical filter, and further, the optical filter receives an incident beam through the first region, and splits the incident beam into a transmitted beam including a signal of a first wavelength and a reflected beam including at least one wavelength by using the first region. The first wavelength is a wavelength of a beam that is transmitted through the optical filter when the beam is incident onto the first region at a first incident angle.

In an embodiment, the T-OADM may further include a control unit, where the control unit is configured to control the driving component to move, so that a beam is incident onto different regions of the first optical filter, so as to adjust a wavelength of a signal that needs to be dropped (or added) by the T-OADM apparatus.

Figure 25:
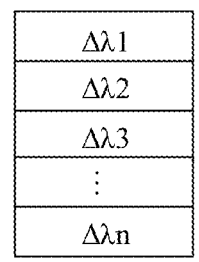
FIG. 25 shows an example of an optical filter.

FIG. 25 shows an example of an optical filter. As shown in FIG. 25, different regions of the optical filter may be designed and processed as filters with different filter bandwidths, so that the optical filter includes a plurality of regions with different filter bandwidths. For example, filter bandwidths of the optical filters in the figure are sequentially $\Delta\lambda 1, \Delta\lambda 2, \Delta\lambda 3, \ldots, \Delta\lambda n$ from top to bottom. When different filter bandwidths are required, a driving component (for example, a driver) may be used to change a position at which a beam is incident onto the optical filter, so that a filtering center wavelength of the optical filter can be dynamically adjusted, and a wavelength of a dropped (or added) signal can be dynamically adjusted by the T-OADM apparatus.

In some optional embodiments, the optical filter in the foregoing embodiments may alternatively be replaced with the optical filter that includes regions of different filter bandwidths. Correspondingly, the foregoing embodiments may further include a driving component connected to the optical filter, and the driving component can be used to change the position at which the beam is incident onto the optical filter, so that the filtering center wavelength of the optical filter is dynamically adjusted.

Figure 26:
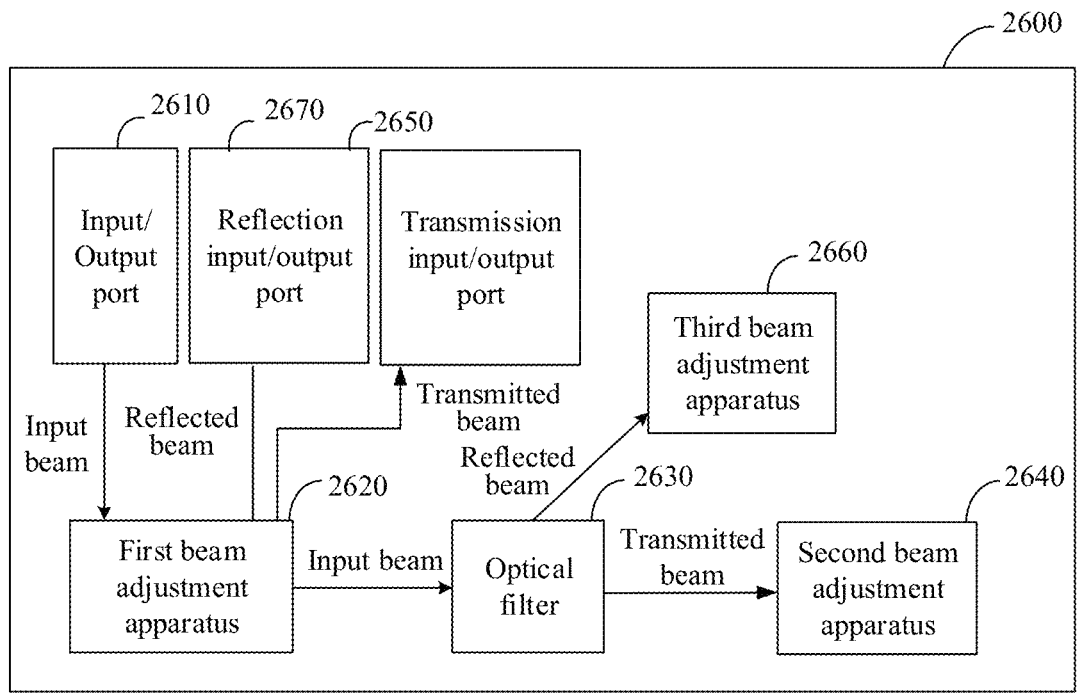
FIG. 26 is a schematic diagram of a structure of another T-OADM apparatus according to an embodiment of this application.

An embodiment of this application further provides a T-OADM apparatus. As shown in FIG. 26, the T-OADM apparatus 2600 includes an input/output port 2610, a first beam adjustment apparatus 2620, an optical filter 2630, a second beam adjustment apparatus 2640, and a transmission input/output port 2650, a third beam adjustment apparatus 2660, and a reflection input/output port 2670. Herein, the input/output port 2610 may also be referred to as a first port 2610, the reflection input/output port 2670 may also be referred to as a reflection port 2670, and the transmission input/output port 2650 may also be referred to as a transmission port 2650. This is not limited in this application.

The input/output port 2610 is configured to input an input beam including at least two wavelengths.

The first beam adjustment apparatus 2620 is configured to adjust a transmission direction of the input beam, so that the input beam is incident onto the optical filter 2630 at a first incident angle.

The optical filter 2630 is configured to receive a beam that is incident at the first incident angle, and split the incident beam into a transmitted beam including a first wavelength and a reflected beam including at least one wavelength, where the first wavelength is the wavelength of the beam passing through the optical filter 2630 when the beam is incident onto the optical filter 2630 at the first incident angle.

The second beam adjustment apparatus 2640 is configured to adjust a transmission direction of the transmitted beam, so that the transmitted beam is output to the transmission input/output port 2650 through the optical filter 2630 and the first beam adjustment apparatus 2620.

The transmission input/output port 2650 is configured to output the transmitted beam.

The third beam adjustment apparatus 2660 is configured to adjust a transmission direction of the reflected beam, so that the reflected beam is output to the reflection input/output port 2670 through the optical filter 2630 and the first beam adjustment apparatus 2620.

The reflection input/output port 2670 is configured to output the reflected beam.

For example, for the first beam adjustment apparatus 2620, refer to the foregoing description about the incident beam adjustment apparatus; and for the optical filter 2630, refer to the description about the first optical filter in FIG. 6. Details are not described herein again.

Therefore, in an embodiment of the application, the first beam adjustment apparatus changes the incident angle of the incident beam to the optical filter; after the optical filter splits the incident beam into the transmitted beam and the reflected beam, the second beam adjustment apparatus reflects the transmitted beam emergent from the optical filter to the optical filter; then the first beam adjustment apparatus outputs the transmitted beam to the transmission input/output port; then the third beam adjustment apparatus reflects the reflected beam emergent from the optical filter to the optical filter; and then the first beam adjustment apparatus outputs the reflected beam to the reflection input/output port.

In some embodiments, the T-OADM apparatus may further include a control unit to control the first beam adjustment apparatus to adjust a deflection direction and a deflection angle of the incident beam, to adjust the first incident angle at which the beam is incident onto a first optical filter, so as to adjust the wavelength of the signal that needs to be dropped (or added) by the T-OADM apparatus.

In an embodiment, for a manner in which the control unit controls the first beam adjustment apparatus, refer to the foregoing related description. Details are not described herein again.

In some embodiments, the transmission input/output port 2650 is further configured to input an input beam of a first wavelength; and the input beam is transmitted through the optical filter 2630, and is output to the input/output port 2610. The input/output port 2610 is further configured to output a beam transmitted through the optical filter, so as to add a signal of the first wavelength.

In some embodiments, the reflection input/output port 2670 is further configured to input a beam, where the beam is reflected by the optical filter 2630 and output to the input/output port 2610. The input/output port 2610 is further configured to output a beam reflected by the optical filter 2630, so as to implement transparent transmission of a signal.

Figure 27A:
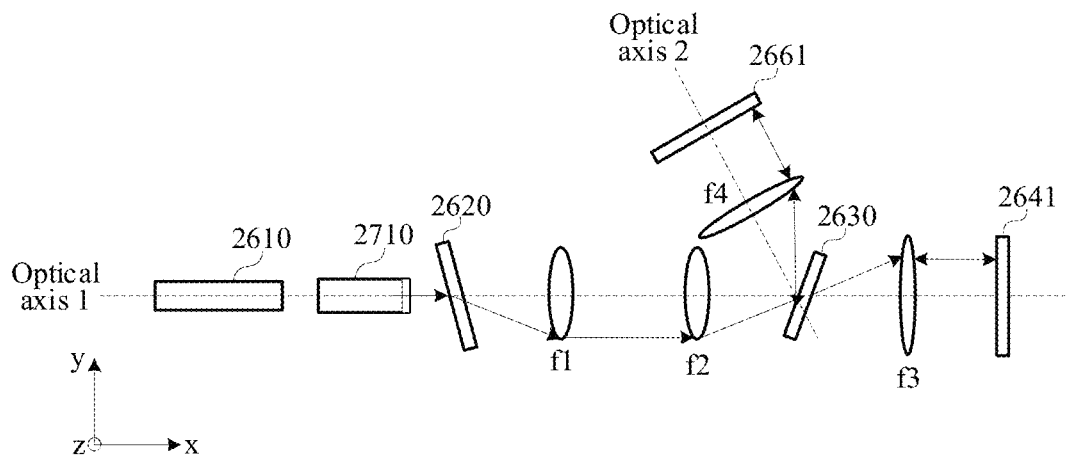
FIG. 27A is a top view of another T-OADM apparatus according to an embodiment of this application.
Figure 27B:
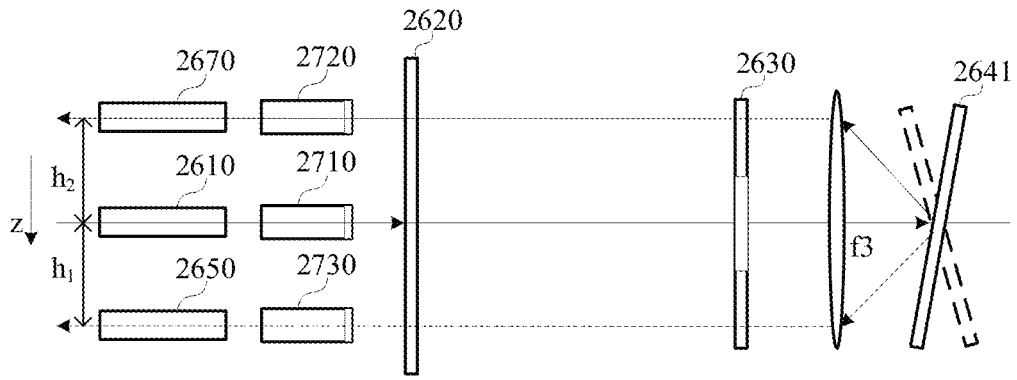
FIG. 27B is a side view of another T-OADM apparatus according to an embodiment of this application.
Figure 28A:
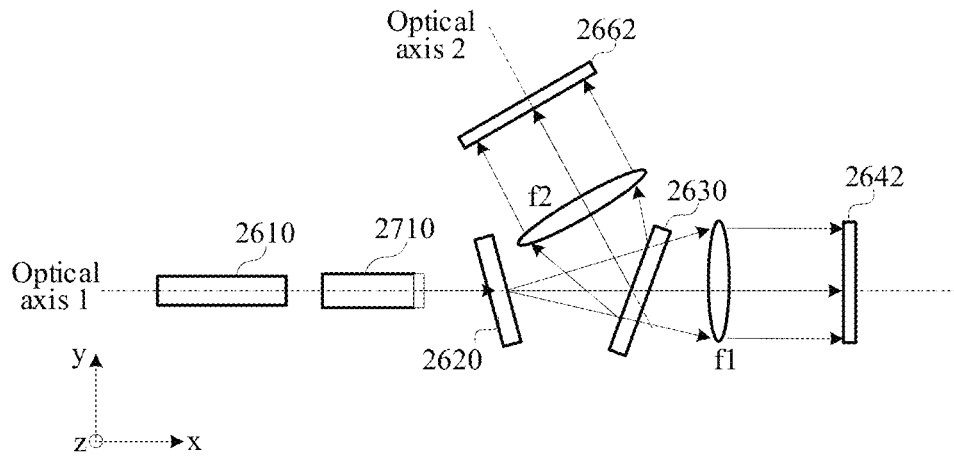
FIG. 28A is a top view of another T-OADM apparatus according to an embodiment of this application.
Figure 28B:
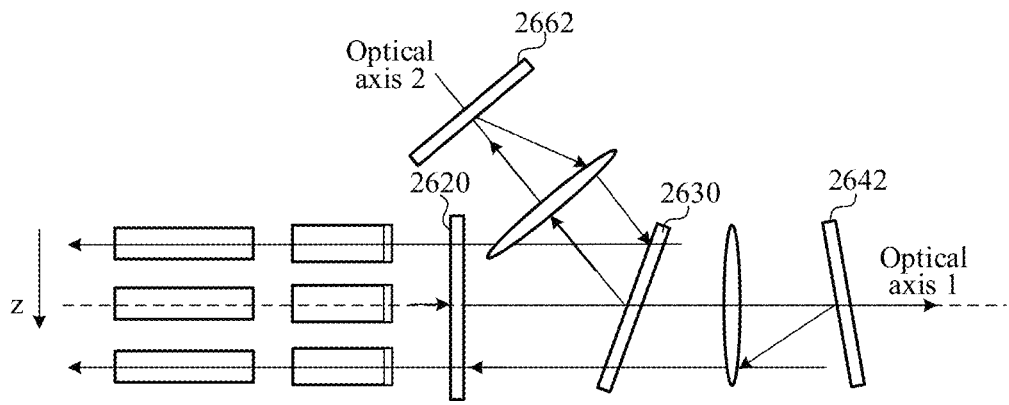
FIG. 28B is a side view of another T-OADM apparatus according to an embodiment of this application.

The following describes two T-OADM apparatuses provided in embodiments of this application with reference to FIG. 27 and FIG. 28. Same reference numerals in FIG. 26 to FIG. 28 indicate same or similar meanings. For brevity, details are not described again. In an embodiment of the application, FIG. 27 includes FIG. 27A and FIG. 27B. FIG. 27A is a top view of a T-OADM apparatus according to an embodiment of this application; and FIG. 27B is a side view of the T-OADM apparatus in FIG. 27A. FIG. 28 includes FIG. 28A and FIG. 28B. FIG. 28A is a top view of a T-OADM apparatus according to an embodiment of this application; and FIG. 28B is a side view of the T-OADM apparatus in FIG. 28A.

It should be noted that, in FIG. 27 and FIG. 28, an example in which an optical filter performs optical filtering on incident light in a polarization state is used for description. Correspondingly, the T-OADM apparatuses shown in FIG. 27 to FIG. 28 further include a polarization beam splitting device and a polarization beam combining device (which may also be referred to as a polarization multiplexing device). It may be understood that this is not limited in this embodiment of this application.

In the T-OADM apparatuses in FIG. 27 and FIG. 28, an example in which the first beam adjustment apparatus is a MEMS micro-mirror (denoted as a MEMS micro-mirror) 2620 is used for description. However, this embodiment of this application is not limited thereto. For example, the first beam adjustment apparatus 2620 may alternatively be implemented by another optical device such as an LCOS.

FIG. 27A is a top view of a T-OADM apparatus according to an embodiment of this application. As shown in FIG. 27A, the T-OADM apparatus includes an input/output port 2610, a polarization beam splitting device 2710, a MEMS micro-mirror 2620, an optical 4f system consisting of a lens 1 (denoted as f1) and a lens 2 (denoted as f2), an optical filter 2630, a lens 3 (denoted as f3), a reflector 2641, a lens 4 (denoted as f4), and a reflector 2661. A unit consisting of the lens 3 and the reflector 2641 may be used as an example of the second beam adjustment apparatus 2640; and a unit consisting of the lens 4 and the reflector 2661 may be used as an example of the third beam adjustment apparatus 2660.

In FIG. 27A, centers of the MEMS micro-mirror 2620, the lens 1, the lens 2, the optical filter 2630, the lens 3, and the reflector 2641 are all disposed on the optical axis 1. Further, the MEMS micro-mirror 2620 may be disposed at a front focus of the lens 1, the optical filter 2630 may be disposed at a rear focus of the lens 2, the optical filter 2630 may be disposed at a front focus of the lens 3, and the reflector 2641 may be disposed at a rear focus of the lens 3. Centers of the optical filter 2630, the lens 4, and the reflector 2661 are all disposed on the optical axis 2. Further, the optical filter 2630 may be disposed at a front focus of the lens 4, and the reflector 2661 may be disposed at a rear focus of the lens 4. An included angle between a normal line of the optical filter 2630 and the optical axis 1 is α, and an included angle between the optical axis 1 and the optical axis 2 is 2α.

Still refer to FIG. 27A. A space rectangular coordinate system xyz is shown. In the rectangular coordinate system xyz, a direction of an x axis is a direction of the optical axis 1, and a direction of a z axis is a direction of the first transmission input/output port relative to the input/output port. In addition, a space rectangular coordinate system x'y'z' may be set, where a direction of an x' axis is a direction of the optical axis 2, and a direction of a z' axis is a direction of the reflection input/output port relative to the input/output port. The direction of the z axis of the rectangular coordinate system xyz and the direction of the z' axis of the rectangular coordinate system x'y'z' are the same, and the two may be replaced with each other.

The lens 3 is disposed in the yz plane of the space rectangular coordinate system xyz; the optical filter 2630 is parallel to the z axis and has an included angle with the yz plane; and the reflector 2641 is parallel to the y axis in the space rectangular coordinate system xyz and has an included angle $\alpha_1$ with the yz plane.

The lens 4 is disposed in the y'z' plane of the space rectangular coordinate system x'y'z'; the optical filter 2630 is parallel to the z' axis and has an included angle with the y'z' plane; and the reflector 2661 is parallel to the y' axis in the space rectangular coordinate system x'y'z and has an included angle $\alpha_2$ with the y'z' plane.

The lens 3 is configured to collimate a transmitted beam emergent from the optical filter 2630, so that the transmitted beam is incident onto the reflector 2641 along an optical axis 1 (that is, the x-axis direction). The reflector 2641 is configured to reflect the transmitted beam to the transmission input/output port 2650 through the lens 3, the optical filter 2630, and the MEMS micro-mirror 2620 and at a first lateral offset $h_1$ in the z-axis direction.

$$\tan\alpha_1 = \frac{h_1}{f_1},$$

where $f_1$ represents a focal length of the lens 3.

The lens 4 is configured to collimate a reflected beam emergent from the optical filter 2630, so that the reflected beam is incident onto the second reflector 2661 along the optical axis 2 (that is, in the x'-axis direction). The reflector 2661 is configured to reflect the reflected beam to the reflection input/output port through the lens 4, the optical filter 2630, and the MEMS micro-mirror 2620 and at a second lateral offset $h_2$ in the z-axis direction.

$$\tan\alpha_2 = \frac{h_2}{f_2},$$

where f2 represents a focal length of the lens 4.

For example, in FIG. 27A, focal lengths of the lens 3 and the lens 4 may be the same or different. This is not limited in this application.

Refer to FIG. 27B. The reflector 2641 is disposed parallel to the y axis in the space rectangular coordinate system xyz and has an included angle $\alpha_1$ with the yz plane, and a distance between the transmission input/output port 2650 and the input/output port 2610 along the z-axis direction is set to $h_1$, so that the transmitted beam can be output to the transmission input/output port, so as to implement signal dropping. The reflector 2661 is disposed parallel to the y' axis in the space rectangular coordinate system x'y'z and has an included angle $\alpha_2$ with the y'z' plane, and a distance between the reflection input/output port 2670 and the input/output port 2610 along the z-axis direction is set to $h_2$, so that the reflected beam can be output to the reflection input/output port, so as to implement transparent transmission of the beam. For example, the transmission input/output port 2650 and the reflection input/output port 2670 may be disposed in two directions of the input/output port 2610, or may be disposed in one direction, but values of $h_1$ and $h_2$ are different.

In FIG. 27A, the optical 4f system is used to converge the input beams that are emergent from the MEMS micro-mirror 2620 and that have different included angles with the optical axis 1 onto the optical filter 2630. In addition, there is a mapping relationship between an included angle between the beam emergent from the MEMS micro-mirror 2620 and the optical axis 1 and an included angle between the beam emergent from the optical 4f system and the optical axis 1. In this way, deflection of the MEMS micro-mirror 2620 can be adjusted to control a magnitude of an incident angle at which the input beam is incident onto the optical filter 2630, so that a wavelength of a signal dropped or added by the T-OADM apparatus can be controlled. In addition, the input beam is converged by using the optical 4f system, so that a structure of the T-OADM apparatus can be more compact, and a volume of the T-OADM apparatus can be reduced.

In some other embodiments, the optical 4f system in FIG. 27 may be alternatively replaced with a lens. In this case, the MEMS micro-mirror 2620 and the optical filter 2630 may be located at a 2× focal length on a front side of the lens and at a 2× focal length on a rear side of the lens, respectively, so that input beams that are emergent from the MEMS micro-mirror 2620 and that have different included angles with the optical axis 1 are converged onto the optical filter 2630.

In the T-OADM apparatuses shown in FIG. 27A and FIG. 27B, when a filtering center wavelength of the optical filter 2630 needs to be adjusted, the adjustment may be implemented by adjusting deflection of the MEMS micro-mirror 2620. In an embodiment, for an adjustment manner of the MEMS micro-mirror 2620, refer to the foregoing description in FIG. 7A. Details are not described herein again.

FIG. 28A is a top view of a T-OADM apparatus according to an embodiment of this application, and FIG. 28B is a side view of the T-OADM apparatus. Different from FIG. 27A, in FIG. 28A, a unit consisting of the lens 1 (denoted as f1) and the reflector 2642 is used as an example of the second beam adjustment apparatus; and a unit consisting of the lens 2 (denoted as f2) and the reflector 2662 is used as an example of the third beam adjustment apparatus. The MEMS micro-mirror 2620 is disposed at a front focus of the lens 1, and the optical filter 2630 is located between the MEMS micro-mirror 2620 and the lens 1. In addition, the MEMS micro-mirror 2620 is disposed at a focus of a folded optical path of the lens 2 that is reflected by the optical filter 2630.

For example, in FIG. 28A, focal lengths of the lens 1 and the lens 2 may be the same or different. This is not limited in this application.

Therefore, in an embodiment of the application, the beam adjustment apparatus (for example, a lens and a reflector disposed at a focus of the lens) may be used to reflect the beam transmitted through the optical filter, so that the beam is output to the transmission input/output port through the optical filter and at a lateral offset, and the beam is reflected by the optical filter. In this way, the beam is output to the reflection input/output port through the optical filter and at a lateral offset, and the transmitted beam and the reflected beam are coupled to corresponding ports, thereby implementing dynamic adjustment of a wavelength of a signal dropped or added by the T-OADM apparatus. In an embodiment of the application, wavelengths of signals added and dropped by the T-OADM apparatus can be dynamically adjusted, wavelength-level service switching is supported, a network structure is flexible, and operation and maintenance are simple, which facilitates intelligent control of an optical network.

In some optional embodiments, the optical filter in the T-OADM apparatus in FIG. 27 or FIG. 28 may alternatively be replaced with an optical filter that includes regions with different filter bandwidths and that is shown in FIG. 25. Correspondingly, FIG. 27 or FIG. 28 may further include a driving component connected to the optical filter, and the driving component can be used to change a position at which a beam is incident onto the optical filter, so as to dynamically adjust a filtering center wavelength of the optical filter.

Figure 29:
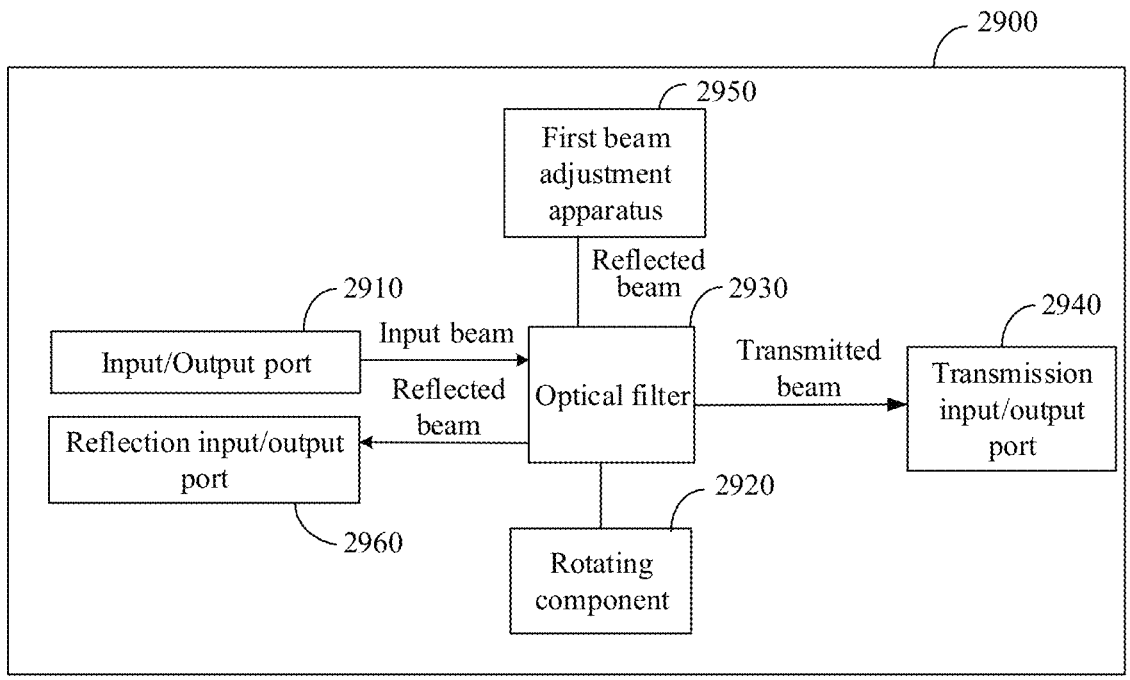
FIG. 29 is a schematic diagram of a structure of another T-OADM apparatus according to an embodiment of this application.

An embodiment of this application further provides a T-OADM apparatus. As shown in FIG. 29, the T-OADM apparatus 2900 includes an input/output port 2910, a rotating component 2920, an optical filter 2930, a beam adjustment apparatus 2950, a transmission input/output port 2940, and a reflection input/output port 2960. Herein, the input/output port 2910 may also be referred to as a first port 2910, the reflection input/output port 2960 may also be referred to as a reflection port 2960, and the transmission input/output port 2940 may also be referred to as a transmission port 2940. This is not limited in this application.

The input/output port 2910 is configured to input an input beam including at least two wavelengths.

The rotating component 2920 is connected to the optical filter 2930, and is configured to rotate to adjust a tilt angle of the optical filter 2930, so that the input beam is incident onto the optical filter 2930 at a first incident angle.

The optical filter 2930 is configured to receive a beam that is incident at the first incident angle, and split the incident beam into a transmitted beam including a first wavelength and a reflected beam including at least one wavelength, where the first wavelength is the wavelength of the beam passing through the optical filter 2930 when the beam is incident onto the optical filter 2930 at the first incident angle.

Herein, the rotating component 2920 may dynamically adjust deflection (that is, a tilt angle) of the optical filter 2930 based on a wavelength of a signal that needs to be dropped (or added) by the T-OADM apparatus 2900, to adjust a magnitude of the first incident angle. For example, the wavelength of the signal that needs to be dropped (or added) and the first incident angle meet the foregoing formula (1).

The beam adjustment apparatus 2950 is configured to adjust a transmission direction of a reflected beam, so that the reflected beam is output to the reflection input/output port through the optical filter 2930.

The transmission input/output port 2940 is configured to output the transmitted beam.

The reflection input/output port 2960 is configured to output the reflected beam.

Therefore, in an embodiment of the application, the rotating component rotates to change the tilt angle of the optical filter, so as to change the incident angle of the incident beam to the optical filter. In addition, after the optical filter splits the incident beam into the transmitted beam and the reflected beam, the emergent reflected beam is reflected by the beam adjustment apparatus, and is transmitted to the reflection input/output port through the optical filter 2930.

In some embodiments, the T-OADM apparatus may further include a control unit to control the rotating component to rotate, to adjust the first incident angle at which the beam is incident onto the first optical filter, so as to adjust the wavelength of the signal that needs to be dropped (or added) by the T-OADM apparatus.

In an embodiment, for a manner in which the control unit controls the rotating component to rotate, refer to the foregoing related description. Details are not described herein again.

In some embodiments, the transmission input/output port 2940 is further configured to input an input beam of a first wavelength; and the input beam is transmitted through the optical filter 2930, and is output to the input/output port 2610. The input/output port 2910 is further configured to output a beam transmitted through the optical filter, so as to add a signal of the first wavelength.

In some embodiments, the reflection input/output port 2960 is further configured to input a beam, where the beam is reflected by the optical filter 2930 and output to the input/output port 2910. The input/output port 2910 is further configured to output a beam reflected by the optical filter, so as to implement transparent transmission of a signal.

Figure 30A:
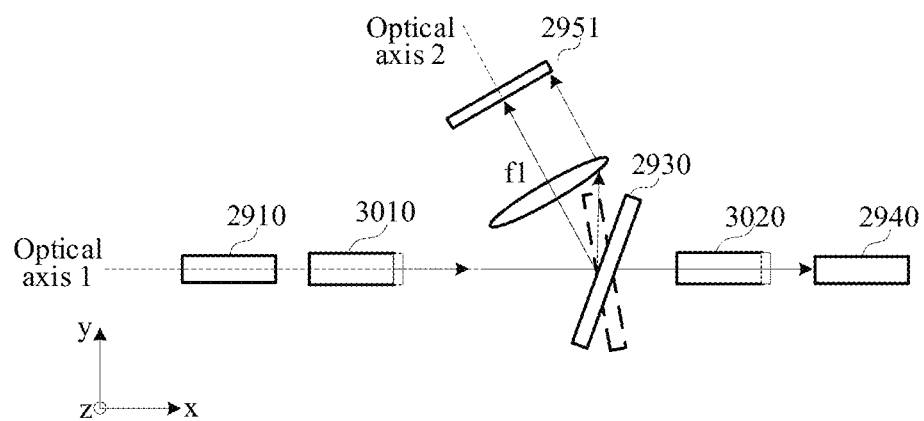
FIG. 30A is a top view of another T-OADM apparatus according to an embodiment of this application.
Figure 30B:
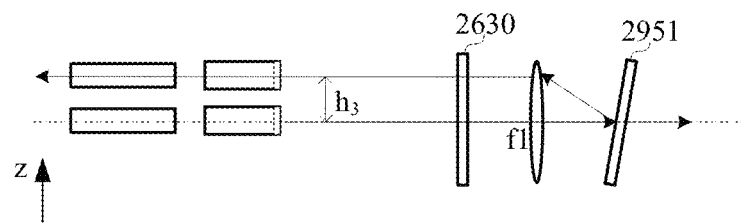
FIG. 30B is a side view of another T-OADM apparatus according to an embodiment of this application.
Figure 31:
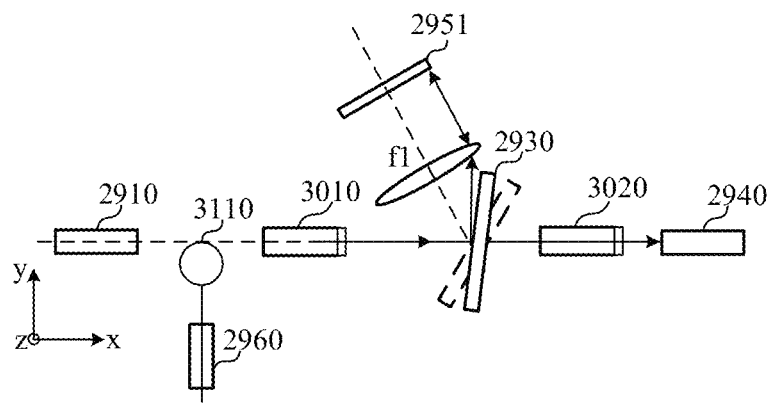
FIG. 31 shows an example of another T-OADM apparatus according to an embodiment of this application.
Figure 32:
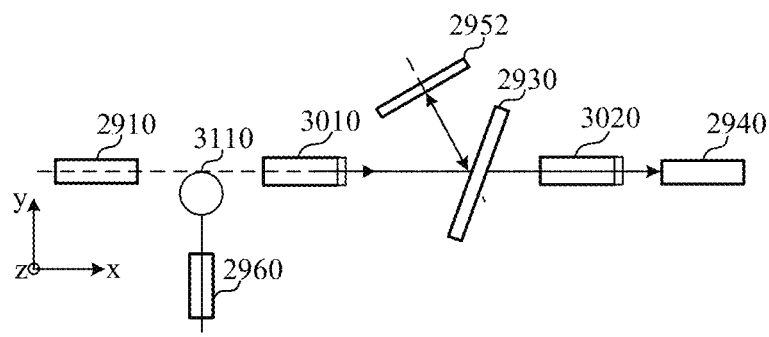
FIG. 32 shows an example of another T-OADM apparatus according to an embodiment of this application.

The following describes three T-OADM apparatuses provided in embodiments of this application with reference to FIG. 30 and FIG. 32. Same reference numerals in FIG. 29 to FIG. 32 indicate same or similar meanings. For brevity, details are not described again. In an embodiment of the application, FIG. 30 includes FIG. 30A and FIG. 30B. FIG. 30A is a top view of a T-OADM apparatus according to an embodiment of this application; and FIG. 30B is a side view of the T-OADM apparatus in FIG. 30A.

It should be noted that, in FIG. 30 and FIG. 32, an example in which an optical filter performs optical filtering on incident light in a polarization state is used for description. Correspondingly, the T-OADM apparatuses shown in FIG. 30 to FIG. 32 further include a polarization beam splitting device and a polarization beam combining device (which may also be referred to as a polarization multiplexing device). It may be understood that this is not limited in this embodiment of this application.

In the T-OADM apparatuses in FIG. 30 to FIG. 32, no rotating component is shown. It may be understood that the optical filter in each of the T-OADM apparatuses implements angle deflection under rotation of the rotating component. When a filtering center wavelength of the optical filter 2930 needs to be adjusted, the adjustment may be implemented by adjusting rotation of the rotating component to deflect the optical filter 2930.

FIG. 30A shows an example of a top view of a T-OADM apparatus according to an embodiment of this application. As shown in FIG. 30A, the T-OADM apparatus includes an input/output port 2910, a polarization beam splitting device 3010, an optical filter 2930, a rotating component (not shown) connected to the optical filter 2930, a lens 1 (denoted as f1), a reflector 2951, a polarization beam combining device 3020, and a transmission input/output port 2940. A unit consisting of the lens 1 and the reflector 2951 may be used as an example of the beam adjustment apparatus 2950.

In FIG. 30A, an optical filter 2930 may be disposed at a front focus of the lens 1, and a reflector 2951 may be disposed at a rear focus of the lens 1.

Refer to FIG. 30A. A transmitted beam emergent from the optical filter 2930 may continue to propagate along an incident direction of the beam to the optical filter 2930, and is output to a polarization beam combining device 3020 to implement polarization beam combining, and then is output to a transmission output port 2940, so as to download signals.

FIG. 30B shows an example of a side view of the T-OADM apparatus in FIG. 30A. FIG. 30B sequentially shows a reflection input/output port and a transmission input/output port of the T-OADM apparatus from top to bottom.

FIG. 30A also shows a space rectangular coordinate system xyz. In the rectangular coordinate system xyz, a direction of the x axis is a direction in which an input beam is incident onto the optical filter 2930, and a direction of the z axis is a direction in which the reflection input/output port is relative to the input/output port. In addition, a space rectangular coordinate system x'y'z' may be set, where a direction of an x' axis is a direction of the optical axis 2, and a direction of a z' axis is a direction of the reflection input/output port relative to the input/output port. The direction of the z axis of the rectangular coordinate system xyz and the direction of the z' axis of the rectangular coordinate system x'y'z' are the same, and the two may be replaced with each other.

The lens 1 is disposed in the y'z' plane of the space rectangular coordinate system x'y'z'; the optical filter 2930 is parallel to the z' axis and has an included angle with the y'z' plane; and the reflector 2951 is parallel to the y' axis in the space rectangular coordinate system x'y'z and has an included angle $\alpha_3$ with the y'z' plane.

The lens 1 is configured to collimate a reflected beam emergent from the optical filter 2930, so that the reflected beam is incident onto the second reflector 2951 along the optical axis 2 (that is, in the x'-axis direction). The reflector 2951 is configured to reflect the reflected beam to the reflection input/output port through the lens 1 and the optical filter 2930 and at a third lateral offset $h_3$ in the z-axis direction.

$$\tan\alpha_3 = \frac{h_3}{f_3},$$

where $f_3$ represents a focal length of the lens 1.

Refer to FIG. 30B. The reflector 2951 is disposed parallel to the y' axis in the space rectangular coordinate system x'y'z and has an included angle $a_3$ with the y'z' plane, and a distance between the reflection input/output port 2960 and the input/output port 2910 along the z-axis direction is set to $h_3$, so that the reflected beam can be output to the reflection input/output port, so as to implement transparent transmission of the beam.

Therefore, in an embodiment of the application, the rotating component rotates to change the tilt angle of the optical filter, so as to change the incident angle of the incident beam to the optical filter. In addition, after the optical filter splits the incident beam into the transmitted beam and the reflected beam, the beam reflected by the optical filter is reflected, so that the beam is output to the reflection input/output port through the optical filter and at a lateral shift, so as to couple the transmitted beam and the reflected beam to corresponding ports, thereby implementing dynamic adjustment of a wavelength of a signal dropped or added by the T-OADM apparatus. In an embodiment of the application, wavelengths of signals added and dropped by the T-OADM apparatus can be dynamically adjusted, wavelength-level service switching is supported, a network structure is flexible, and operation and maintenance are simple, which facilitates intelligent control of an optical network.

FIG. 31 shows an example of a T-OADM apparatus according to an embodiment of this application. As shown in FIG. 31, the T-OADM apparatus includes an input/output port 2910, a polarization beam splitting device 3010, an optical filter 2930, a rotating component (not shown) connected to the optical filter 2930, a lens 1 (denoted as f1), a reflector 2951, a polarization beam combining device 3020, a transmission input/output port 2940, a circulator 3110, and a reflection input/output port 2960. A unit consisting of the lens 1 and the reflector 2951 may be used as an example of the beam adjustment apparatus 2950.

In FIG. 31, the optical filter 2930 may be disposed at a front focus of the lens 1, the reflector 2951 may be disposed at a rear focus of the lens 1, and a plane in which the reflector 2951 is located is perpendicular to an optical axis of the lens 1. The lens 1 is configured to collimate a reflected beam emergent from the optical filter 2930, so that the reflected beam is perpendicular to the reflector 2951. The reflector 2951 is configured to further reflect an incident reflected beam, so that the reflected beam is reflected to the polarization beam combining device 3020 through the lens 1 and the optical filter 2930 and along the z-axis direction, and then is incident onto the circulator 3110. The circulator is configured to transmit an incident reflected beam to the reflection input/output port 2960, so as to implement transparent transmission of a signal.

A transmitted beam emergent from the optical filter 2930 may continue to propagate along an incident direction of the beam to the optical filter 2930, and is output to a polarization beam combining device 3020 to implement polarization beam combining, and then is output to a transmission output port 2940, so as to download signals.

FIG. 32 shows an example of a T-OADM apparatus according to an embodiment of this application. Different from the T-OADM apparatus in FIG. 31, in FIG. 32, the beam adjustment apparatus 2650 may be implemented by a MEMS micro-mirror 2952. When the reflected beam is incident onto the MEMS micro-mirror 2952, deflection of the MEMS micro-mirror 2952 may be adjusted, so that the reflected beam returns along an original path; that is, the reflected beam is reflected to the optical filter 2930, and then is reflected by the optical filter 2930, so that the reflected beam is incident sequentially to the polarization beam combining device 3010 and the circulator 3110, and finally output to the reflection input/output port, so as to implement transparent transmission of a signal.

In some optional embodiments, the MEMS micro-mirror 2952 may alternatively be replaced with an LCOS. This is not limited in embodiments of this application.

In some optional embodiments, the optical filter in the T-OADM apparatus in FIG. 30 to FIG. 32 may alternatively be replaced with an optical filter that includes regions with different filter bandwidths and that is shown in FIG. 25. Correspondingly, FIG. 30 to FIG. 32 may further include a driving component connected to the optical filter, and the driving component can be used to change a position at which a beam is incident onto the optical filter, so as to dynamically adjust a filtering center wavelength of the optical filter.

Therefore, in an embodiment of the application, the rotating component rotates to change the tilt angle of the optical filter, so as to change the incident angle of the incident beam to the optical filter. In addition, after the optical filter splits the incident beam into the transmitted beam and the reflected beam, the beam reflected by the optical filter is reflected, so that the beam is transmitted to a circulator through the optical filter, and then transmitted to a reflection input/output port by using the circulator, so as to couple the transmitted beam and the reflected beam to corresponding ports, thereby implementing dynamic adjustment of a wavelength of a signal dropped or added by the T-OADM apparatus. In an embodiment of the application, wavelengths of signals added and dropped by the T-OADM apparatus can be dynamically adjusted, wavelength-level service switching is supported, a network structure is flexible, and operation and maintenance are simple, which facilitates intelligent control of an optical network.

It should be noted that, in the T-OADM apparatus shown above, an example in which the optical filter is a band-pass optical filter is used for description. It may be understood that, in an embodiment of the application, a band-stop optical filter may also be used to select a wavelength of a signal that needs to be dropped or added by the T-OADM apparatus.

When the optical filter is a band-pass optical filter, the optical filter may split an incident beam into a transmitted beam including a first wavelength and a reflected beam including at least one wavelength, where the first wavelength is a wavelength of a beam selected by the optical filter when the beam is incident onto the optical filter at the first incident angle. Correspondingly, the signal output by the transmission input/output port is a signal dropped by the T-OADM apparatus, and the signal output by the reflection input/output port is a signal transparently transmitted by the T-OADM apparatus.

When the optical filter is a band-stop optical filter, the optical filter may split an incident beam into a reflected beam including a first wavelength and a transmitted beam including at least one wavelength, where the first wavelength is a wavelength of a beam selected by the optical filter when the beam is incident onto the optical filter at the first incident angle. Correspondingly, the signal output by the reflection input/output port is a signal dropped by the T-OADM apparatus, and the signal output by the transmission input/output port is a signal transparently transmitted by the T-OADM apparatus.

It should be understood that FIG. 7 to FIG. 32 are structural block diagrams of the T-OADM apparatus. However, these structures or components are used as an example, and impose no limitation on the T-OADM apparatus in embodiments of this application.

FIG. 33 is a schematic flowchart of a control method 3300 according to an embodiment of this application. The method 3300 may be applied to a tunable optical add/drop multiplexer T-OADM. The T-OADM includes an input/output port, a first beam adjustment apparatus, a first optical filter, a second beam adjustment apparatus, a second port, a third port, and a control unit.

The input/output port is configured to input an input beam including at least two wavelengths.

The first optical filter is configured to: receive a beam that is incident at the first incident angle, and split the incident beam into a first transmitted beam and a first reflected beam, where a wavelength of a beam included in the first transmitted beam is different from a wavelength of a beam included in the first reflected beam.

The second port is configured to output the first transmitted beam.

The third port is configured to output the first reflected beam.

For example, the T-OADM apparatus may be any T-OADM apparatus described in FIG. 6 to FIG. 14. This is not limited in an embodiment of the application.

The method 3300 is performed by a control unit, and includes the following operations.

3310. Receive an instruction, where the instruction indicates a wavelength of a first signal dropped by the T-OADM.

3320. Determine, based on the wavelength of the first signal, a first deflection angle of the first beam adjustment apparatus for an input beam, a second deflection angle of the second beam adjustment apparatus for the first transmitted beam, and a third deflection angle of the first beam adjustment apparatus for the first reflected beam.

3330. Control, based on the first deflection angle, the first beam adjustment apparatus to adjust a transmission direction of the input beam, so that the input beam is incident onto the first optical filter at a first incident angle, where the first incident angle corresponds to the wavelength of the first signal.

3340. Control, based on the second deflection angle, the second beam adjustment apparatus to adjust a transmission direction of the first transmitted beam, so that the first transmitted beam is output to the second port.

3350. Control, based on the third deflection angle, the first beam adjustment apparatus to adjust a transmission direction of the first reflected beam, so that the first reflected beam is output to the third port.

Therefore, in an embodiment of the application, the wavelength of the first signal that needs to be dropped (or added) by the T-OADM apparatus is received, and a deflection angle of a beam of each beam adjustment apparatus is controlled based on the wavelength of the first signal, so that the wavelength of the signal that is dropped or added by the T-OADM apparatus can be flexibly controlled according to an actual requirement, thereby implementing a more flexible and controllable T-OADM apparatus.

For example, the control unit may separately send a control signal to the first beam adjustment apparatus and the second beam adjustment apparatus, so that the first beam adjustment apparatus and the second beam adjustment apparatus may separately adjust a transmission direction of a beam based on the control signal.

In an embodiment, a plurality of wavelengths of signals that can be dropped or added by the T-OADM apparatus can be preconfigured, and deflection angles that are of the beam adjustment apparatus for the incident beam, the transmitted beam, and the reflected beam and that correspond to each wavelength may be preconfigured. When an instruction of a wavelength of a signal that needs to be dropped or added by the T-OADM apparatus is obtained, deflection angles that are of the beam adjustment apparatus for the incident beam, the transmitted beam, and the reflected beam and that correspond to the wavelength may be determined based on the preconfiguration.

In an embodiment, a correspondence between a wavelength of a signal that can be dropped or added by the T-OADM apparatus and deflection angles of the incident beam, the transmitted beam, and the reflected beam may be prestored. When the instruction of the wavelength of the signal that needs to be dropped or added by the T-OADM apparatus is obtained, deflection angles that are of the beam adjustment apparatus for the incident beam, the transmitted beam, and the reflected beam and that correspond to the wavelength may be determined based on the correspondence.

Embodiments in this application may be used independently, or may be used jointly. This is not limited herein.

It should be understood that numbers such as "first", "second", and "third" in embodiments of this application are merely for differentiation for ease of description, and are not intended to limit the scope of embodiments of this application. For example, different beam adjustment apparatuses, different ports, different wavelengths, and the like are distinguished.

It should be understood that sequence numbers of the foregoing processes do not mean execution sequences in various embodiments of this application. The execution sequences of the processes should be determined based on functions and internal logic of the processes, and should not be construed as any limitation on the implementation processes of embodiments of this application.

It should also be understood that the term "and/or" describes an association relationship for describing associated objects and represents that three relationships may exist. For example, A and/or B may represent the following three cases: Only A exists, both A and B exist, and only B exists. The character "/" usually indicates an "or" relationship between associated objects. The term "at least one" means one or more. The term "at least one of A and B", similar to the term "A and/or B", describes an association relationship between the associated objects and represents that three relationships may exist. For example, at least one of A and B may represent the following three cases: Only A exists, both A and B exist, and only B exists.

One of ordinary skill in the art may be aware that, in combination with the examples described in embodiments disclosed in this specification, units and algorithm operations may be implemented by electronic hardware or a combination of computer software and electronic hardware. Whether the functions are implemented by hardware or software depends on applications and design constraints of the technical solutions. One of ordinary skill in the art may use different methods to implement the described functions for applications, but it should not be considered that the implementation goes beyond the scope of this application.

One of ordinary skill in the art can clearly understand that for convenience and conciseness of description, for working processes of the foregoing described system, apparatus and unit, reference can be made to the corresponding processes in the foregoing method embodiments, and details are not described herein.

In several embodiments provided in this application, it should be understood that the disclosed system, apparatus, and method may be implemented in another manner. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, and may be located in one position, or may be distributed on a plurality of network units. Some or all of the units may be selected based on actual requirements to achieve the objectives of the solutions of embodiments.

In addition, functional units in embodiments of this application may be integrated into one processing unit, or each of the units may exist alone physically, or two or more units are integrated into one unit.

The foregoing descriptions are merely implementations of this application, but are not intended to limit the protection scope of this application. Any variation or replacement readily figured out by one of ordinary skill in the art within the technical scope disclosed in this application shall fall within the protection scope of this application. Therefore, the protection scope of this application shall be subject to the protection scope of the claims.

What is claimed is:

1. A tunable optical add/drop multiplexer (T-OADM), comprising:
   a first port configured to input an input beam comprising at least two wavelengths,
   a first beam adjustment apparatus configured to adjust a transmission direction of the input beam based on a first signal dropped by the T-OADM, so that the input beam is incident onto a first optical filter at a first incident angle corresponding to a wavelength of the first signal,
   the first optical filter configured to:
      receive a beam that is incident at the first incident angle, and
      split an incident beam into a first transmitted beam and a first reflected beam, wherein a wavelength of a beam comprised in the first transmitted beam is different from a wavelength of a beam comprised in the first reflected beam,
   a second beam adjustment apparatus configured to adjust a transmission direction of the first transmitted beam based on the first incident angle,
   a second port configured to output the first transmitted beam, and
   a third port configured to output the first reflected beam, wherein;
   the first beam adjustment apparatus is further configured to adjust a transmission direction of the first reflected beam based on the first incident angle.

2. The T-OADM according to claim 1, wherein the first beam adjustment apparatus comprises:
   an incident beam adjustment apparatus configured to adjust a transmission direction of the input beam, and
   a reflected beam adjustment apparatus configured to adjust a transmission direction of the first reflected beam.

3. The T-OADM according to claim 2, further comprising:
   a first optical apparatus, wherein the incident beam adjustment apparatus, the first optical filter, and the second beam adjustment apparatus sequentially located on a first optical axis, and
   the first optical apparatus configured to converge a beam emergent from the incident beam adjustment apparatus onto the second beam adjustment apparatus, wherein an included angle between the beam emergent from the incident beam adjustment apparatus and the first optical axis one-to-one correspond to an included angle between the beam emergent from the first optical apparatus and the first optical axis.

4. The T-OADM according to claim 3, wherein the first optical apparatus comprises a first optical 4f system, wherein the incident beam adjustment apparatus is located at a front focus of a front lens of the first optical 4f system, and the second beam adjustment apparatus is located at a rear focus of an optical path transmitted by the first optical filter of a rear lens of the first optical 4f system, and the reflected beam adjustment apparatus is located at a rear focus of an optical path reflected by the first optical filter of the rear lens of the first optical 4f system.

5. The T-OADM according to claim 3, wherein the first optical apparatus comprises a first lens, wherein the incident beam adjustment apparatus is located at a 2z× focal length on a first side of the first lens, the second beam adjustment apparatus is located at a 2× focal length of an optical path transmitted by the first optical filter on a second side of the first lens, and the reflected beam adjustment apparatus is located at a 2× focal length of an optical path reflected by the first optical filter of the first lens.

6. The T-OADM according to claim 2, further comprising:
a spherical reflector, configured to converge a beam emergent from the incident beam adjustment apparatus onto the second beam adjustment apparatus, wherein an included angle between the beam emergent from the incident beam adjustment apparatus one-to-one corresponds to an included angle between the beam emergent from the spherical reflector and an optical axis.

7. The T-OADM according to claim 2, further comprising:
a second optical apparatus configured to converge the first transmitted beam emergent from the first optical filter onto the second beam adjustment apparatus, wherein an included angle between a beam emergent from the incident beam adjustment apparatus and a second optical axis one-to-one corresponds to an included angle between a beam emergent from the second optical apparatus and the second optical axis; and
a third optical apparatus configured to converge the first reflected beam emergent from the first optical filter onto the reflected beam adjustment apparatus, wherein the included angle between the beam emergent from the incident beam adjustment apparatus and the second optical axis one-to-one corresponds to an included angle between the beam emergent from the third optical apparatus and a third optical axis.

8. The T-OADM according to claim 7, wherein the second optical apparatus comprises:
a second optical 4f system, wherein the incident beam adjustment apparatus is located at a front focus of a front lens of the second optical 4f system, and the second beam adjustment apparatus is located at a rear focus of a rear lens of the second optical 4f system.

9. The T-OADM according to claim 7, wherein the third optical apparatus comprises:
a third optical 4f system, wherein the incident beam adjustment apparatus is located at a front focus of an optical path that is reflected by the first optical filter and that is of a front lens of the third optical 4f system, and the reflected beam adjustment apparatus is located at a rear focus of a rear lens of the third optical 4f system.

10. The T-OADM according to claim 2, further comprising:
a fourth optical apparatus configured to converge a beam emergent from the incident beam adjustment apparatus onto the first optical filter, wherein an included angle between the beam emergent from the incident beam adjustment apparatus and a fourth optical axis one-to-one corresponds to an included angle between the beam emergent from the fourth optical apparatus and the fourth optical axis.

11. The T-OADM according to claim 10, wherein the fourth optical apparatus comprises:
a fourth optical 4f system, wherein the incident beam adjustment apparatus is located at a front focus of a front lens of the fourth optical 4f system, and the first optical filter is located at a rear focus of a rear lens of the fourth optical 4f system.

12. The T-OADM according to claim 1, wherein the first optical filter comprises:
at least two regions having different filter bandwidths, wherein the T-OADM further comprises a driving component connected to the first optical filter configured to drive the first optical filter to move, so that the input beam is incident onto a first region in the at least two regions, wherein a filtering wavelength of the first region is the same as the wavelength of the first signal.

13. The T-OADM according to claim 1, wherein the first optical filter is a band-pass optical filter or a band-stop optical filter, wherein
when the first optical filter is a band-pass optical filter, the first optical filter splits the incident beam into the first transmitted beam comprising a first wavelength and the first reflected beam comprising at least one wavelength, wherein the first wavelength is selected by the first optical filter when the beam is emitted to the first optical filter at the first incident angle.

14. The T-OADM according to claim 7, wherein the second optical apparatus comprises:
a second lens, wherein the incident beam adjustment apparatus is located at a 2× focal length on a first side of the second lens, and the second beam adjustment apparatus is located at a 2× focal length on a second side of the second lens.

15. The T-OADM according to claim 7, wherein the third optical apparatus comprises:
a third lens, wherein the incident beam adjustment apparatus is located at a 2× focal length of an optical path reflected by the first optical filter on a first side of the third lens, and the reflected beam adjustment apparatus is located at a 2× focal length on a second side of the third lens.

16. The T-OADM according to claim 10, wherein the fourth optical apparatus comprises:
a fourth lens, wherein the incident beam adjustment apparatus is located at a 2× focal length on a first side of the fourth lens, and the first optical filter is located at a 2× focal length on a second side of the fourth lens.

17. The T-OADM according to claim 1, wherein the first optical filter is a band-pass optical filter or a band-stop optical filter, wherein
when a first filter is a band-stop optical filter, the first optical filter splits the incident beam into the first reflected beam comprising a first wavelength and the first transmitted beam comprising at least one wavelength, wherein the first wavelength is selected by the first optical filter when the beam is emitted to the first optical filter at the first incident angle.

18. The T-OADM according to claim 7, wherein the first beam adjustment apparatus, the first optical filter, the second optical apparatus, and the second beam adjustment apparatus are sequentially located on the second optical axis, and wherein the first optical filter, the third optical apparatus, and the reflected beam adjustment apparatus are located on the third optical axis.

19. The T_OADM according to claim 10, further comprising:
- a fifth optical apparatus configured to converge the first transmitted beam emergent from the first optical filter onto the second beam adjustment apparatus, wherein an included angle between the first transmitted beam emergent from the first optical filter and the fourth optical axis one-to-one corresponds to an included angle between the beam emergent from the fifth optical apparatus and the fourth optical axis.

20. The T_OADM according to claim 19, further comprising:
- a sixth optical apparatus configured to converge the first reflected beam emergent from the first optical filter onto the reflected beam adjustment apparatus, wherein an included angle between the first reflected beam emergent from the first optical filter and a fifth optical axis one-to-one corresponds to an included angle between the beam emergent from the sixth optical apparatus and the fifth optical axis, wherein the incident beam adjustment apparatus, wherein
- the fourth optical apparatus, the first optical filter, the fifth optical apparatus, and the second beam adjustment apparatus are sequentially disposed on the fourth optical axis, and
- the first optical filter, the sixth optical apparatus, and the reflected beam adjustment apparatus are sequentially disposed on the fifth optical axis.

\* \* \* \* \*